United States Patent
Yamamoto et al.

(10) Patent No.: US 12,479,190 B2
(45) Date of Patent: Nov. 25, 2025

(54) Fe-BASED ELECTROPLATED STEEL SHEET AND GALVANNEALED STEEL SHEET, AND METHODS OF PRODUCING SAME

(71) Applicant: JFE STEEL CORPORATION, Tokyo (JP)

(72) Inventors: Shunsuke Yamamoto, Tokyo (JP); Yusuke Okumura, Tokyo (JP); Katsutoshi Takashima, Tokyo (JP); Mai Aoyama, Tokyo (JP); Tomomi Kanazawa, Tokyo (JP); Katsuya Hoshino, Tokyo (JP); Yoichi Makimizu, Tokyo (JP); Takashi Kawano, Tokyo (JP); Takako Yamashita, Tokyo (JP); Hiroshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/251,244

(22) PCT Filed: Nov. 5, 2021

(86) PCT No.: PCT/JP2021/040876
§ 371 (c)(1),
(2) Date: May 1, 2023

(87) PCT Pub. No.: WO2022/097738
PCT Pub. Date: May 12, 2022

(65) Prior Publication Data
US 2024/0009962 A1 Jan. 11, 2024

(30) Foreign Application Priority Data
Nov. 6, 2020 (JP) .................. 2020-186210

(51) Int. Cl.
*B32B 15/01* (2006.01)
*C21D 6/00* (2006.01)
(Continued)

(52) U.S. Cl.
CPC ............ *B32B 15/011* (2013.01); *B32B 15/01* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS 5,326,648 A * 7/1994 Kato .................. C25D 5/50
428/659
5,447,802 A   9/1995 Tobiyama et al.
(Continued)

FOREIGN PATENT DOCUMENTS

CA     3063835 A1   12/2018
CN   104024464 A    9/2014
(Continued)

OTHER PUBLICATIONS

Jan. 11, 2022, International Search Report issued in the International Patent Application No. PCT/JP2021/040876.
(Continued)

*Primary Examiner* — Louis J Rufo
(74) *Attorney, Agent, or Firm* — KENJA IP LAW PC

(57) ABSTRACT

To provide an Fe-based electroplated steel sheet that not only has excellent chemical convertibility or excellent coating appearance when subjected to hot-dip galvanizing, but also has excellent resistance to cracking in resistance welding. Disclosed is an Fe-based plated steel sheet including: a cold-rolled steel sheet having a chemical composition con-
(Continued)

taining Si in an amount of 0.1 mass % or more and 3.0 mass % or less; and an Fe-based electroplating layer formed on one or both surfaces of the cold-rolled steel sheet with a coating weight per surface of 1.0 g/m² or more, in which a thickness of an internal oxidation layer is 2.00 μm or less, and an average value of C concentration in a range of 10 μm to 20 μm in a thickness direction from the surface of the Fe-based electroplating layer is 0.10 mass % or less.

19 Claims, 13 Drawing Sheets

(51) Int. Cl.
*C21D 8/02* (2006.01)
*C21D 9/46* (2006.01)
*C22C 33/04* (2006.01)
*C22C 38/00* (2006.01)
*C22C 38/02* (2006.01)
*C22C 38/04* (2006.01)
*C22C 38/06* (2006.01)
*C22C 38/08* (2006.01)
*C22C 38/12* (2006.01)
*C22C 38/14* (2006.01)
*C22C 38/16* (2006.01)
*C22C 38/28* (2006.01)
*C22C 38/32* (2006.01)
*C22C 38/38* (2006.01)
*C23C 2/02* (2006.01)
*C23C 2/06* (2006.01)
*C23C 2/28* (2006.01)
*C23F 17/00* (2006.01)
*C25D 3/20* (2006.01)
*C25D 5/50* (2006.01)

(52) U.S. Cl.
CPC ............ *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 33/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/32* (2013.01); *C22C 38/38* (2013.01); *C23C 2/02* (2013.01); *C23C 2/0224* (2022.08); *C23C 2/024* (2022.08); *C23C 2/06* (2013.01); *C23C 2/28* (2013.01); *C23F 17/00* (2013.01); *C25D 3/20* (2013.01); *C25D 5/50* (2013.01)

(56) References Cited

U.S. PATENT DOCUMENTS

2014/0363697 A1 12/2014 Kim et al.
2020/0325554 A1* 10/2020 Takeda .................. C21D 6/001

FOREIGN PATENT DOCUMENTS

| EP | 2840161 A1 * | 2/2015 | ........... B32B 15/013 |
|----|----|----|----|
| EP | 3913106 A1 | 11/2021 | |
| JP | S5441218 A | 4/1979 | |
| JP | H04214895 A | 8/1992 | |
| JP | 2013087314 A | 5/2013 | |
| JP | 2015504976 A | 2/2015 | |
| JP | 6025867 B2 | 11/2016 | |
| JP | 2019173144 A | 10/2019 | |
| WO | 9320254 A1 | 10/1993 | |
| WO | 2019116531 A1 | 6/2019 | |
| WO | 2020148944 A1 | 7/2020 | |

OTHER PUBLICATIONS

Nov. 29, 2022, Notification of Reasons for Refusal issued by the Japan Patent Office in the corresponding Japanese Patent Application No. 2022-519972 with English language Concise Statement of Relevance.

Dec. 16, 2024, the Extended European Search Report issued by the European Patent Office in the corresponding European Patent Application No. 21889290.9.

Sep. 25, 2024, the Partial Supplementary European Search Report issued by the European Patent Office in the corresponding European Patent Application No. 21889290.9.

Jan. 24, 2025, Office Action issued by the China National Intellectual Property Administration in the corresponding Chinese Patent Application No. 202180074581.1 with English language search report.

Jul. 10, 2025, Office Action issued by the China National Intellectual Property Administration in the corresponding Chinese Patent Application No. 202180074581.1 with English language search report.

Jul. 10, 2025, Office Action issued by the Korean Intellectual Property Office in the corresponding Korean Patent Application No. 10-2023-7018524 with English language concise statement of relevance.

Yoichi Tobiyama et al., Improvement of Galvanizability of Silicon-bearing Steel by Electrodeposited Iron Coating Containing Oxygen, ISIJ International, 2012, pp. 115-120, vol. 52, No. 1.

Sep. 30, 2025, Notification of Reasons for Refusal issued by the Japan Patent Office in the corresponding Japanese Patent Application No. 2023-012353 with English language concise statement of relevance.

* cited by examiner

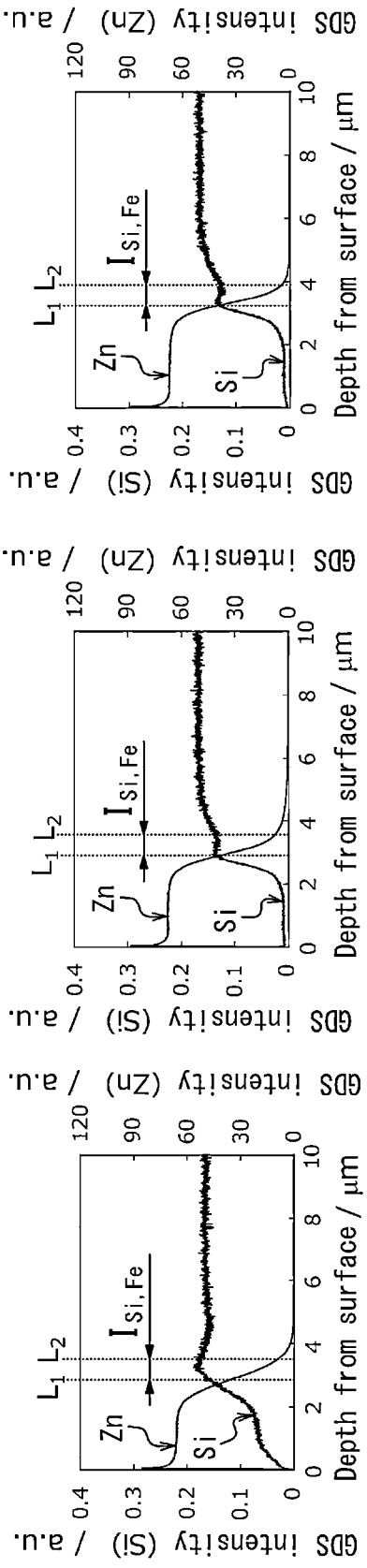

FIG. 10A
Example 1 (CR, Table 4)
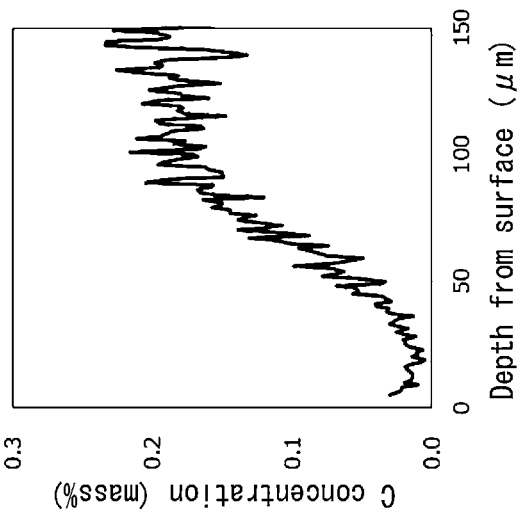
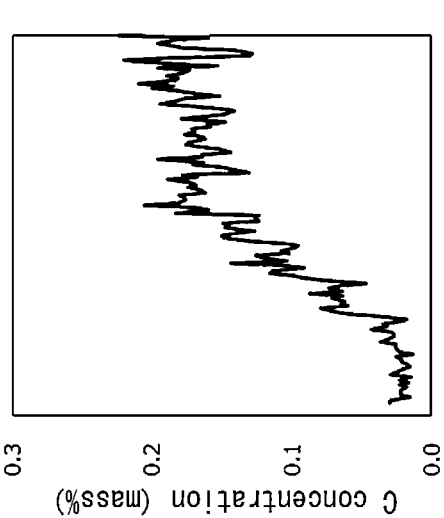
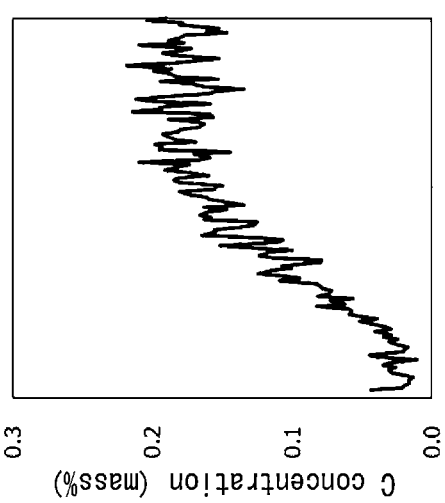

FIG. 10B
Example 1 (CR, Table 4)
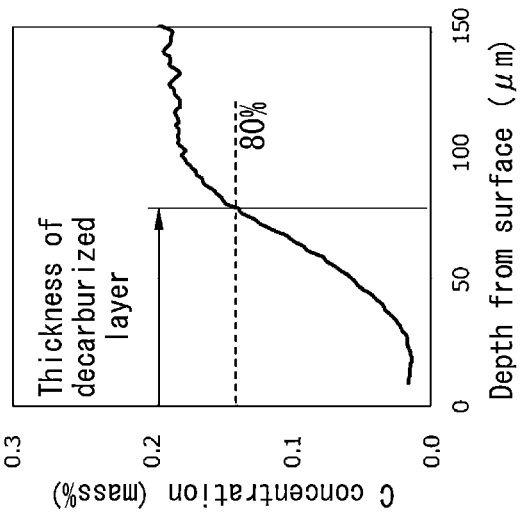
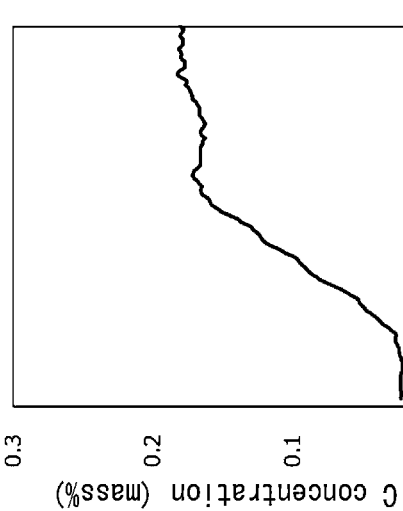

Example 1 (GA, Table 2)

Fe-BASED ELECTROPLATED STEEL SHEET AND GALVANNEALED STEEL SHEET, AND METHODS OF PRODUCING SAME

TECHNICAL FIELD

This disclosure relates to an Fe-based electroplated steel sheet and a galvannealed steel sheet, and methods of producing the same. As used herein, an "Fe-based electroplated steel sheet" includes both (i) a simple Fe-based electroplated steel sheet that is obtained by subjecting a cold-rolled steel sheet to Fe-based electroplating (hereinafter, also referred to as a "CR") and (ii) a hot-dip galvanized steel sheet with an unalloyed hot-dip galvanized layer that is obtained by subjecting the simple Fe-based electroplated steel sheet in item (i) to hot-dip galvanizing (hereinafter, also referred to as a "GI"). As used herein, a "galvannealed steel sheet" means a galvannealed steel sheet that is obtained by heating and alloying the hot-dip galvanized layer of the hot-dip galvanized steel sheet in item (ii) (hereinafter, also referred to as a "GA").

BACKGROUND

In recent years, enhancement of fuel efficiency of automobiles has become an important issue from the viewpoint of global environment protection. Therefore, there is a growing trend to reduce the weight of automotive bodies by increasing the strength and reducing the thickness of the steel sheets used as the raw material of the automotive components. However, since increasing the strength of steel sheets leads to a decrease in formability, it is desirable to develop steel sheets that combine high strength with high formability.

One way to increase the strength of steel sheets without significantly compromising their formability is to add Si to the steel sheets for solid solution strengthening. However, Si, which is added to increase the strength of a steel sheet, forms oxides on the steel sheet surface during annealing. When the steel sheet is used without subjection to hot-dip galvanizing, these oxides degrade the chemical convertibility. When the steel sheet is subjected to hot-dip galvanizing to produce a hot-dip galvanized steel sheet, these oxides degrade the wettability between the molten zinc and the steel sheet, leaving non-coated parts. For the purpose of ensuring proper chemical convertibility and proper coating appearance when hot-dip galvanizing is applied, techniques are known to apply Fe-based electroplating (Fe-based pre-plating) to the steel sheet surface before annealing of the steel sheet.

JP 6025867 B (PTL 1) describes a method of manufacturing a hot-dip galvanized steel sheet, comprising: preparing a base steel sheet; forming an Fe-plated layer on the prepared base steel sheet with a coating weight of 0.2 g/m$^2$ to 2 g/m$^2$; oxidation heating the steel sheet having the Fe-plated layer formed thereon at a temperature ranging from 600° C. to 800° C.; maintaining the heated steel sheet at a temperature ranging from 750° C. to 900° C. for 5 seconds or more in a reducing atmosphere with a dew point of between −30° C. to 5° C. including 20 ppm or less of oxygen, 1 vol. % to 20 vol. % of H$_2$, and N$_2$ as well as unavoidable gases as a remainder; cooling the maintained steel sheet; and plating the cooled steel sheet by dipping in a hot-dip galvanizing bath at a temperature ranging from 445° C. to 480° C. (claim 1)".

WO 2019/116531 A (PTL 2) describes a steel sheet wherein the steel sheet has, from a surface of the base metal to a depth of 5.0 μm or more, an internal oxidized layer in which at least one part of a crystal grain boundary is covered with oxides, and wherein in a region from the surface of the base metal to a depth of 5.0 μm, a grain boundary coverage ratio of the oxides is 60% or more (claim 1).

CITATION LIST

Patent Literature

PTL 1: JP 6025867 B
PTL 2: WO 2019/116531 A

SUMMARY

Technical Problem

In the manufacture of automotive parts, press-formed parts are often combined by resistance welding (spot welding). If at least one of the parts to be subjected to resistance welding contains a hot-dip galvanized steel sheet, there is concern that during resistance welding, liquid metal embrittlement (LME) may occur during resistance welding when residual stresses are generated in the vicinity of a welded portion and the zinc in the coated layer melts and diffuses into crystal grain boundaries of the steel sheet constituting the parts, resulting in intergranular cracking (or LME cracking) in the steel sheet. In particular, if welding is performed with the welding electrode at an angle to the steel sheet in question, residual stresses may increase and cracks may form. Residual stresses are expected to increase with higher strength of the steel sheet, and thus there is concern about LME cracking associated with an increase in the strength of the steel sheet by the addition of Si.

However, the present inventors found that the method of manufacturing a hot-dip galvanized steel sheet described in PTL 1 may prevent the occurrence of non-coated parts and ensure satisfactory surface appearance and coating or plating adhesion, but is insufficient in terms of resistance to cracking in resistance welding. In addition, the present inventors found that in the steel sheet described in PTL 2, the depth of the internal oxidation layer, or grain boundary oxidation, is too large, and the resistance to cracking in resistance welding is also insufficient.

It would thus be helpful to provide an Fe-based electroplated steel sheet that not only has excellent chemical convertibility or excellent coating appearance when subjected to hot-dip galvanizing, but also has excellent resistance to cracking in resistance welding, together with a suitable method of producing the same. It would also be helpful to provide a galvannealed steel sheet with not only excellent coating appearance but also excellent resistance to cracking in resistance welding, together with a suitable method of producing the same.

Solution to Problem

In order to solve the above issues, the present inventors conducted intensive studies and found the following. When an Fe-based electroplating layer is formed with a predetermined coating weight A for the purpose of ensuring proper chemical convertibility or proper coating appearance when hot-dip galvanizing is applied, the sum of the coating weight A and a dew point B during the subsequent annealing correlates to the resistance to cracking in resistance welding.

Specifically, when A+B is equal to or greater than a predetermined value, excellent resistance to cracking in resistance welding can be achieved.

The predetermined value of A+B is equivalent for CRs and GIs. In the case of CRs and GIs, a soft, Fe-based electroplating layer is formed to relieve stresses applied to the surface of the cold-rolled steel sheet during welding. On the other hand, in the case of GAs, the predetermined value of A+B increases because the Fe-based electroplating layer is incorporated into the hot-dip galvanized layer during the alloying process.

First, CR and GI cases will be described in detail below. In order to satisfy a high level of resistance to cracking in resistance welding at a welded portion, it is important to form an Fe-based electroplating layer on a cold-rolled steel sheet with a coating weight A, and then perform an annealing process under the conditions satisfying the relation of A+B≥3.0 to form internal oxides inside the Fe-based electroplating layer so that the depth of the internal oxidation layer from 0.10 μm below the surface of the Fe-based electroplating layer towards the cold-rolled steel sheet is within 2.00 μm. When the relation of A+B≥3.0 is satisfied, Si that diffuses from the cold-rolled steel sheet into the Fe-based electroplating layer during annealing can form oxides inside the Fe-based electroplating layer. By forming oxides inside the Fe-based electroplating layer partially in this way, the depth of the internal oxidation layer from 0.10 μm below the surface of the Fe-based electroplating layer towards the cold-rolled steel sheet can be within 2.00 μm. Therefore, when the zinc reaches crystal grain boundaries of the cold-rolled steel sheet, the penetration of the zinc into the depth direction of the cold-rolled steel sheet can be minimized, and the resistance to cracking in resistance welding at a welded portion can be improved.

Furthermore, in the annealing process, an average value of C concentration in a range of 10 μm to 20 μm in the thickness direction from the surface of the Fe-based electroplating layer of the Fe-based electroplated steel sheet is adjusted to 0.10 mass % or less. This may further improve the resistance to cracking in resistance welding. The present inventors found that when an Fe-based electroplating layer is formed before annealing, the C concentration in the range of 10 μm to 20 μm in the thickness direction from the surface of the Fe-based electroplating layer can be reduced more, and the effect of improving the resistance to cracking in resistance welding can be obtained more effectively.

In the heating process followed by the annealing (soaking) process, by setting the average heating rate of the Fe-based electroplated steel sheet in a temperature range of 400° C. to 650° C. at or above 10° C./s, the growth of crystal grains in the Fe-based electroplating layer is suppressed as much as possible during the heating process, and the number of crystal grain boundaries of the Fe-based electroplating layer that are in contact with the cold-rolled steel sheet at the interface between the Fe-based electroplating layer and the cold-rolled steel sheet is adjusted to 10 or more per 10 μm in a sheet transverse direction of the cold-rolled steel sheet. This may further improve the resistance to cracking in resistance welding. When the average heating rate in the temperature range of 400° C. to 650° C. in the heating process is set at or above 10° C./s, those crystal grains in the Fe-based electroplating layer that are in contact with the interface between the Fe-based electroplating layer and the cold-rolled steel sheet are refined, resulting in dispersion of penetration paths of molten zinc into the Fe-based electroplating layer. In other words, the time for the molten zinc to reach the crystal grain boundaries of the cold-rolled steel sheet during welding can be delayed, and the resistance to cracking in resistance welding can be further improved.

Next, GA case will be described in detail below. In the case of GAs, the stress-relaxing effect of the Fe-based electroplating layer cannot be expected because the Fe-based electroplating layer is incorporated into the hot-dip galvanized layer and disappears during the alloying process. In order to satisfy a high level of resistance to cracking in resistance welding at a welded portion even when the Fe-based electroplating layer disappears, it is important to form internal oxides inside the Fe-based electroplating layer by forming the Fe-based electroplating layer on the cold-rolled steel sheet with a coating weight A and then performing an annealing process under the conditions satisfying the relation of A+B≥5.0, and to reduce the amount of internal oxides that are in contact with the galvannealed layer by causing Si internal oxides to be partially incorporated into the galvannealed layer during the alloying process. When the relation of A+B≥5.0 is satisfied, Si that diffuses from the cold-rolled steel sheet into the Fe-based electroplating layer during annealing can form oxides inside the Fe-based electroplating layer. By forming oxides inside the Fe-based electroplating layer partially in this way, the amount of internal oxides that are in contact with the galvannealed layer can be reduced. Therefore, the penetration of zinc from the grain boundaries of the internal oxidation layer that are in contact with the galvannealed layer can be suppressed. The present inventors found that this may delay the time for the molten zinc to reach the crystal grain boundaries of the cold-rolled steel sheet during welding, thereby improving the resistance to cracking in resistance welding at a welded portion.

Furthermore, in the annealing process, the average value of C concentration in the range of 10 μm to 20 μm in the thickness direction from the surface of the cold-rolled steel sheet of the galvannealed steel sheet is adjusted to 0.10 mass % or less. This may further improve the resistance to cracking in resistance welding. The present inventors found that when an Fe-based electroplating layer is formed before annealing, the C concentration in the range of 10 μm to 20 μm in the thickness direction from the surface of the cold-rolled steel sheet can be reduced more, and the effect of improving the resistance to cracking in resistance welding can be obtained more effectively.

The present disclosure was completed based on these discoveries, and primary features thereof are as described below.

[1] An Fe-based electroplated steel sheet comprising:
 a cold-rolled steel sheet having a chemical composition containing Si in an amount of 0.1 mass % or more and 3.0 mass % or less; and
 an Fe-based electroplating layer formed on one or both surfaces of the cold-rolled steel sheet with a coating weight per surface of 1.0 g/m² or more, wherein
 in an emission intensity profile at a wavelength indicating Si measured in a depth direction from a surface of the Fe-based electroplating layer by glow discharge optical emission spectrometry, (i) there exists a peak with an emission intensity higher than an average Si intensity ($I_{Si}$) in a depth range of 10.0±0.1 μm from an interface between the Fe-based electroplating layer and the cold-rolled steel sheet, (ii) a peak maximum of the peak is located deeper than 0.10 μm below the surface of the Fe-based electroplating layer, and (iii) a depth at which the emission intensity first becomes equal to the average Si intensity ($I_{Si}$) after gradually decreasing in the depth direction from the peak maximum of the peak is within 2.00 μm from 0.10 μm below the surface of the Fe-based electroplating layer, and an average value of C concentration in a range of 10 μm to 20 μm in a thickness direction from the surface of the Fe-based electroplating layer is 0.10 mass % or less.

[2] The Fe-based electroplated steel sheet according to aspect [1], comprising an unalloyed hot-dip galvanized layer formed in contact with the Fe-based electroplating layer.

[3] The Fe-based electroplated steel sheet according to aspect [1] or [2], wherein the average value of C concentration in the range of 10 μm to 20 μm in the thickness direction from the surface of the Fe-based electroplating layer is 0.04 mass % or less.

[4] The Fe-based electroplated steel sheet according to any one of aspects [1] to [3], wherein the Fe-based electroplated steel sheet has a surface layer in which a decarburized layer is formed.

[5] The Fe-based electroplated steel sheet according to aspect [4], wherein the decarburized layer has a thickness of 30 μm or more.

[6] The Fe-based electroplated steel sheet according to aspect [4], wherein the decarburized layer has a thickness of 80 μm or more.

[7] The Fe-based electroplated steel sheet according to any one of aspects [1] to [6], wherein the number of crystal grain boundaries of the Fe-based electroplating layer that are in contact with the cold-rolled steel sheet at the interface between the Fe-based electroplating layer and the cold-rolled steel sheet is 10 or more per 10 μm in a sheet transverse direction in an observation field of view of the cold-rolled steel sheet.

[8] The Fe-based electroplated steel sheet according to any one of aspects [1] to [7], wherein the chemical composition of the cold-rolled steel sheet contains (consisting of), in mass %,
C: 0.8% or less,
Si: 0.1% or more and 3.0% or less,
Mn: 1.0% or more and 12.0% or less,
P: 0.1% or less, S: 0.03% or less,
N: 0.010% or less, and
Al: 1.0% or less,
with the balance being Fe and inevitable impurities.

[9] The Fe-based electroplated steel sheet according to aspect [8], wherein the chemical composition further contains, in mass %, at least one element selected from the group consisting of
B: 0.005% or less,
Ti: 0.2% or less,
Cr: 1.0% or less,
Cu: 1.0% or less,
Ni: 1.0% or less,
Mo: 1.0% or less,
Nb: 0.20% or less,
V: 0.5% or less,
Sb: 0.020% or less,
Ta: 0.1% or less,
W: 0.5% or less,
Zr: 0.1% or less,
Sn: 0.20% or less,
Ca: 0.005% or less,
Mg: 0.005% or less, and
REM: 0.005% or less.

[10] The Fe-based electroplated steel sheet according to any one of aspects [1] to [9], wherein in the chemical composition the amount of Si is 0.9 mass % or more and 1.7 mass % or less.

[11] The Fe-based electroplated steel sheet according to any one of aspects [1] to [10], wherein the Fe-based electroplating layer has a chemical composition containing (consisting of) at least one element selected from the group consisting of B, C, P, N, O, Ni, Mn, Mo, Zn, W, Pb, Sn, Cr, V, and Co, in a total amount of 10 mass % or less, with the balance being Fe and inevitable impurities.

[12] A galvannealed steel sheet comprising:
a cold-rolled steel sheet having a chemical composition containing Si in an amount of 0.1 mass % or more and 3.0 mass % or less; and
a galvannealed layer formed on one or both surfaces of the cold-rolled steel sheet, wherein
an Fe-based electroplating layer is absent between the galvannealed layer and the cold-rolled steel sheet,
in an emission intensity profile at a wavelength indicating Si measured in a depth direction from a surface of the galvannealed layer by glow discharge optical emission spectrometry, a value of $(I_{Si,Fe})/(I_{Si,bulk})$ is 0.90 or less, where $(I_{Si,Fe})$ denotes an average Si intensity in a range from an interface between the galvannealed layer and the cold-rolled steel sheet to +0.5 μm towards the cold-rolled steel sheet, and $(I_{Si,bulk})$ denotes an average Si intensity in the cold-rolled steel sheet, and
an average value of C concentration in a range of 10 μm to 20 μm in a thickness direction from the interface between the galvannealed layer and the cold-rolled steel sheet is 0.10 mass % or less.

[13] The galvannealed steel sheet according to aspect [12], wherein the average value of C concentration in the range of 10 μm to 20 μm in the thickness direction from the interface between the galvannealed layer and the cold-rolled steel sheet is 0.04 mass % or less.

[14] The galvannealed steel sheet according to aspect [12] or [13], wherein the cold-rolled steel sheet has a surface layer in which a decarburized layer is formed.

[15] The galvannealed steel sheet according to aspect [14], wherein the decarburized layer has a thickness of 30 μm or more.

[16] The galvannealed steel sheet according to aspect [14], wherein the decarburized layer has a thickness of 80 μm or more.

[17] The galvannealed steel sheet according to any one of aspects [12] to [16], wherein the chemical composition of the cold-rolled steel sheet contains (consisting of), in mass %,
C: 0.8% or less,
Si: 0.1% or more and 3.0% or less,
Mn: 1.0% or more and 12.0% or less,
P: 0.1% or less,
S: 0.03% or less,
N: 0.010% or less, and
Al: 1.0% or less,
with the balance being Fe and inevitable impurities.

[18] The galvannealed steel sheet according to aspect [17], wherein the chemical composition further contains, in mass %, at least one element selected from the group consisting of
B: 0.005% or less,
Ti: 0.2% or less,
Cr: 1.0% or less,
Cu: 1.0% or less,
Ni: 1.0% or less,
Mo: 1.0% or less,
Nb: 0.20% or less,
V: 0.5% or less,
Sb: 0.020% or less, Ta: 0.1% or less,
W: 0.5% or less,
Zr: 0.1% or less,
Sn: 0.20% or less,
Ca: 0.005% or less,
Mg: 0.005% or less, and
REM: 0.005% or less.

[19] The galvannealed steel sheet according to any one of aspects [12] to [18], wherein in the chemical composition the amount of Si is 0.9 mass % or more and 1.7 mass % or less.

[20] The galvannealed steel sheet according to any one of aspects [12] to [19], wherein the galvannealed layer contains at least one element selected from the group consisting of B, C, P, N, O, Ni, Mn, Mo, Zn, W, Pb, Sn, Cr, V, and Co, in a total amount of 1 mass % or less.

[21] A chemical-conversion-treated steel sheet comprising a chemical conversion layer formed on a surface of the Fe-based electroplated steel sheet as recited in any one of aspects [1] to [11], or on a surface of the galvannealed layer of the galvannealed steel sheet as recited in any one of aspects [12] to [19].

[22] An electrodeposition-coated steel sheet comprising an electrodeposition coating layer formed in contact with the chemical conversion layer of the chemical-conversion-treated steel sheet as recited in aspect [21].

[23] An automotive part at least partially made from the electrodeposition-coated steel sheet as recited in aspect [22].

[24] A method of producing an Fe-based electroplated steel sheet, comprising:
  subjecting a cold-rolled steel sheet having a chemical composition containing Si in an amount of 0.1 mass % or more and 3.0 mass % or less to Fe-based electroplating to obtain an Fe-based electroplated steel sheet with an Fe-based electroplating layer formed on one or both surfaces of the cold-rolled steel sheet with a coating weight A (g/m$^2$) per surface of 1.0 g/m$^2$ or more; and
  then subjecting the Fe-based electroplated steel sheet to an annealing process in which the Fe-based electroplated steel sheet is held in a temperature range of 650° C. to 900° C. in an atmosphere with a dew point B (° C.) satisfying the following formula (1):

$$A+B \geq 3.0 \tag{1}.$$

[25] The method of producing an Fe-based electroplated steel sheet according to aspect [24], further comprising, after the annealing process, subjecting the Fe-based electroplated steel sheet to hot-dip galvanizing to form an unalloyed hot-dip galvanized layer on a surface of the Fe-based electroplating layer.

[26] The method of producing an Fe-based electroplated steel sheet according to aspect [24] or [25], wherein the annealing process is performed in the atmosphere with the dew point B (° C.) satisfying the following formula (1)':

$$A+B \geq 8.0 \tag{1)'}.$$

[27] The method of producing an Fe-based electroplated steel sheet according to any one of aspects [24] to [26], comprising, before the annealing process, heating the Fe-based electroplated steel sheet with an average heating rate of 10° C./s or higher in a temperature range of 400° C. to 650° C.

[28] The method of producing an Fe-based electroplated steel sheet according to any one of aspects [24] to [27], wherein the coating weight A is less than 5.0 g/m$^2$.

[29] The method of producing an Fe-based electroplated steel sheet according to any one of aspects [24] to [28], wherein the chemical composition of the cold-rolled steel sheet contains (consisting of), in mass %,
C: 0.8% or less,
Si: 0.1% or more and 3.0% or less,
Mn: 1.0% or more and 12.0% or less,
P: 0.1% or less,
S: 0.03% or less,
N: 0.010% or less, and
Al: 1.0% or less,
with the balance being Fe and inevitable impurities.

[30] The method of producing an Fe-based electroplated steel sheet according to aspect [29], wherein the chemical composition further contains, in mass %, at least one element selected from the group consisting of
B: 0.005% or less,
Ti: 0.2% or less,
Cr: 1.0% or less,
Cu: 1.0% or less,
Ni: 1.0% or less,
Mo: 1.0% or less,
Nb: 0.20% or less,
V: 0.5% or less,
Sb: 0.020% or less,
Ta: 0.1% or less,
W: 0.5% or less,
Zr: 0.1% or less,
Sn: 0.20% or less,
Ca: 0.005% or less,
Mg: 0.005% or less, and
REM: 0.005% or less.

[31] The method of producing an Fe-based electroplated steel sheet according to any one of aspects [24] to [30], wherein in the chemical composition the amount of Si is 0.9 mass % or more and 1.7 mass % or less.

[32] The method of producing an Fe-based electroplated steel sheet according to any one of aspects [24] to [31], wherein the Fe-based electroplating is performed in a plating bath containing at least one element selected from the group consisting of B, C, P, N, O, Ni, Mn, Mo, Zn, W, Pb, Sn, Cr, V, and Co, so that the at least one element is contained in the Fe-based electroplating layer in a total amount of 10 mass % or less.

[33] The method of producing an Fe-based electroplated steel sheet according to any one of aspects [24] to [32], further comprising changing at least one of the coating weight A (g/m$^2$) or the dew point B (° C.) to satisfy the formula (1) or (1)' in a case where the formula (1) or (1)' is not satisfied.

[34] A method of producing a galvannealed steel sheet, comprising:
  subjecting a cold-rolled steel sheet having a chemical composition containing Si in an amount of 0.1 mass % or more and 3.0 mass % or less to Fe-based electroplating to obtain an Fe-based electroplated steel sheet with an Fe-based electroplating layer formed on one or both surfaces of the cold-rolled steel sheet with a coating weight A (g/m$^2$) per surface of 1.0 g/m$^2$ or more; and
  then subjecting the Fe-based electroplated steel sheet to an annealing process in which the Fe-based electroplated steel sheet is held in a temperature range of 650° C. to 900° C. in an atmosphere with a dew point B (° C.) satisfying the following formula (2);

then subjecting the Fe-based electroplated steel sheet to hot-dip galvanizing to form an unalloyed hot-dip galvanized layer on a surface of the Fe-based electroplating layer; and then heating and alloying the hot-dip galvanized layer to obtain a galvannealed steel sheet with a galvannealed layer formed on one or both surfaces of the cold-rolled steel sheet, $$A+B \geq 5.0 \quad (2).$$

[35] The method of producing a galvannealed steel sheet according to aspect [34], wherein the annealing process is performed in the atmosphere with the dew point B (° C.) satisfying the following formula (2)':

$$A+B \geq 10.0 \quad (2)'.$$

[36] The method of producing a galvannealed steel sheet according to aspect [34] or [35], comprising, before the annealing process, heating the Fe-based electroplated steel sheet with an average heating rate of 10° C./s or higher in a temperature range of 400° C. to 650° C.

[37] The method of producing a galvannealed steel sheet according to any one of aspects [34] to [36], wherein the coating weight A is less than 5.0 g/m².

[38] The method of producing a galvannealed steel sheet according to any one of aspects [34] to [37], wherein the chemical composition of the cold-rolled steel sheet contains (consisting of), in mass %,
C: 0.8% or less,
Si: 0.1% or more and 3.0% or less,
Mn: 1.0% or more and 12.0% or less,
P: 0.1% or less,
S: 0.03% or less,
N: 0.010% or less, and
Al: 1.0% or less,
with the balance being Fe and inevitable impurities.

[39] The method of producing a galvannealed steel sheet according to aspect [38], wherein the chemical composition further contains, in mass %, at least one element selected from the group consisting of
B: 0.005% or less,
Ti: 0.2% or less,
Cr: 1.0% or less,
Cu: 1.0% or less,
Ni: 1.0% or less,
Mo: 1.0% or less,
Nb: 0.20% or less,
V: 0.5% or less,
Sb: 0.020% or less,
Ta: 0.1% or less,
W: 0.5% or less,
Zr: 0.1% or less,
Sn: 0.20% or less,
Ca: 0.005% or less,
Mg: 0.005% or less, and
REM: 0.005% or less.

[40] The method of producing a galvannealed steel sheet according to any one of aspects [24] to [39], wherein in the chemical composition the amount of Si is 0.9 mass % or more and 1.7 mass % or less.

[41] The method of producing a galvannealed steel sheet according to any one of aspects [34] to [40], wherein the Fe-based electroplating is performed in a plating bath containing at least one element selected from the group consisting of B, C, P, N, O, Ni, Mn, Mo, Zn, W, Pb, Sn, Cr, V, and Co, so that the at least one element is contained in the galvannealed layer in a total amount of 1 mass % or less.

[42] The method of producing a galvannealed steel sheet according to any one of aspects [34] to [41], further comprising changing at least one of the coating weight A (g/m²) or the dew point B (° C.) to satisfy the formula (2) or (2)' in a case where the formula (2) or (2)' is not satisfied.

[43] A method of producing a chemical-conversion-treated steel sheet, comprising:
the method of producing an Fe-based electroplated steel sheet as recited in any one of aspects [24] to [33], or the method of producing a galvannealed steel sheet as recited in any one of aspects [34] to [42]; and
then subjecting the Fe-based electroplated steel sheet or the galvannealed steel sheet to a chemical conversion treatment to obtain a chemical-conversion-treated steel sheet with a chemical conversion layer formed in contact with the Fe-based electroplated steel sheet or the galvannealed steel sheet.

[44] A method of producing an electrodeposition-coated steel sheet, comprising:
the method of producing a chemical-conversion-treated steel sheet as recited in aspect [43]; and
subjecting the chemical-conversion-treated steel sheet to electrodeposition coating to obtain an electrodeposition-coated steel sheet with an electrodeposition coating layer formed in contact with the chemical conversion layer.

[45] A method of producing an automotive part, comprising:
the method of producing an electrodeposition-coated steel sheet as recited in aspect [44]; and
producing an automotive part using at least in part the electrodeposition-coated steel sheet.

Advantageous Effect

The Fe-based electroplated steel sheet disclosed herein not only has excellent chemical convertibility or excellent coating appearance when subjected to hot-dip galvanizing, but also has excellent resistance to cracking in resistance welding. In addition, the galvannealed steel sheet disclosed herein not only has excellent coating appearance, but also has excellent resistance to cracking in resistance welding.

BRIEF DESCRIPTION OF THE DRAWINGS

In the accompanying drawings:

FIG. 9 illustrates the raw data of emission intensity profiles at wavelengths indicating Si and Zn by glow discharge optical emission spectrometry for some of the galvannealed steel sheets (GAs) in Example 1;

FIG. 10A illustrates the raw data of profiles of C concentration at depths in the thickness direction when analyzed by an electron beam microanalyzer for some of the Fe-based electroplated steel sheets (CRs) without subjection to hot dip galvanization in Example 1;

FIG. 10B illustrates the data after smoothing of the profiles in FIG. 10A;

Figure 1:
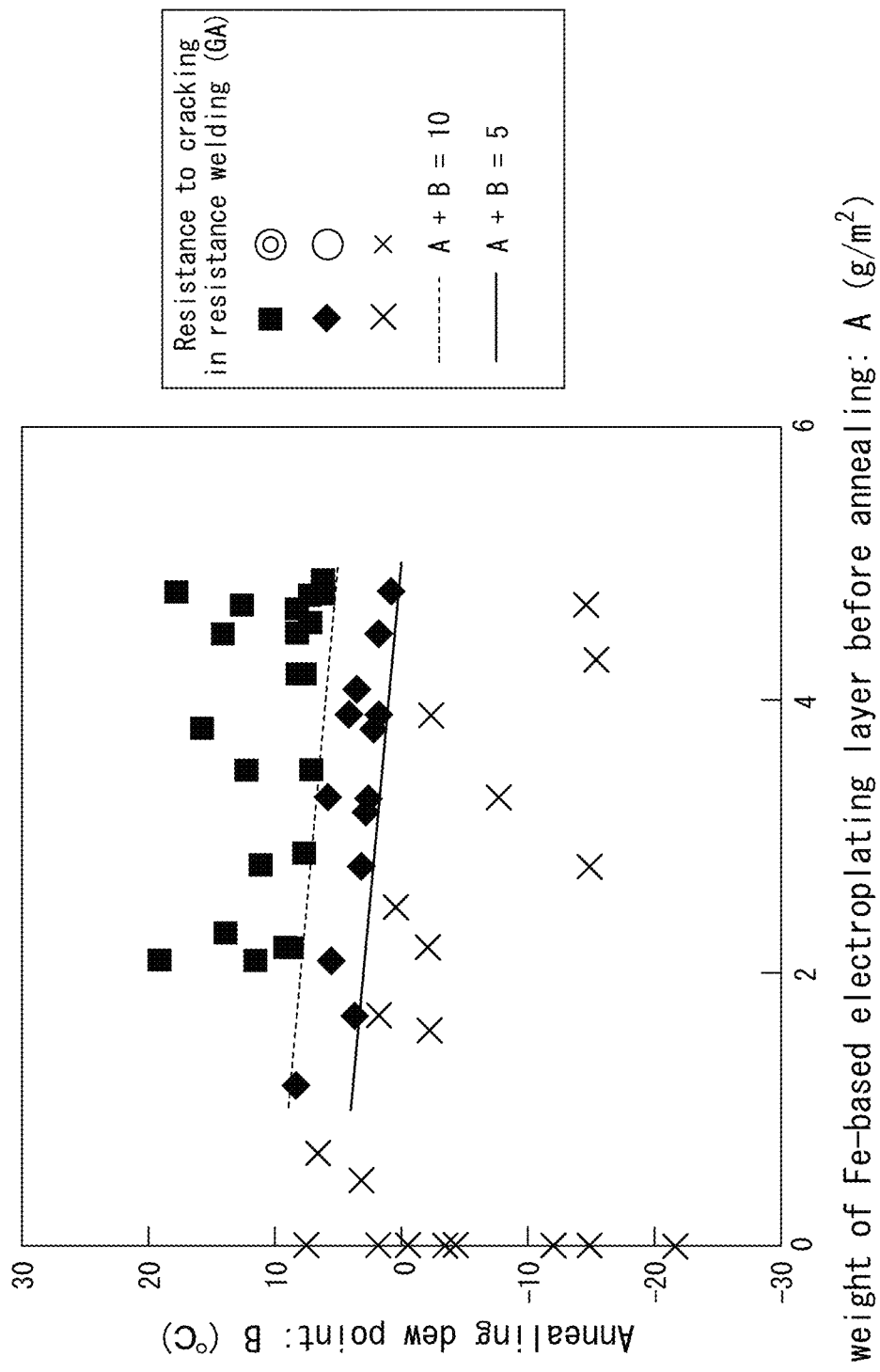
FIG. 1 is a graph illustrating the relationship between the coating weight A and annealing dew point B of the Fe-based electroplating layer and the evaluation results of the resistance to cracking in resistance welding for galvannealed steel sheets (GAs) in Example 1.

DETAILED DESCRIPTION (Fe-Based Electroplated Steel Sheet and Method of Producing Same)

A method of producing an Fe-based electroplated steel sheet according to one embodiment of the present disclosure comprises: subjecting a cold-rolled steel sheet having a chemical composition containing Si in an amount of 0.1 mass % or more and 3.0 mass % or less to Fe-based electroplating to obtain an Fe-based electroplated steel sheet with an Fe-based electroplating layer formed on one or both surfaces of the cold-rolled steel sheet; and then subjecting the Fe-based electroplated steel sheet to an annealing process. In the case of not performing a hot-dip galvanizing process afterwards, a simple Fe-based plated steel sheet (CR) can be obtained. It is preferable to subject the cold-rolled steel sheet to the Fe-based electroplating without annealing. That is, an Fe-based electroplated steel sheet (CR) according to one embodiment of the present disclosure comprises a cold-rolled steel sheet having a chemical composition containing Si in an amount of 0.1 mass % or more and 3.0 mass % or less, and an Fe-based electroplating layer formed on one or both surfaces of the cold-rolled steel sheet, and does not comprise an unalloyed hot-dip galvanized layer and a galvannealed layer.

The method of producing an Fe-based plated steel sheet according to another embodiment of the present disclosure may further comprise, after the annealing process, subjecting the Fe-based electroplated steel sheet to hot-dip galvanizing to form an unalloyed hot-dip galvanized layer on a surface of the Fe-based electroplating layer. In the case of not performing a process of heating and alloying the hot-dip galvanized layer afterwards, a hot-dip galvanized steel sheet (GI) in which the hot-dip galvanized layer is not alloyed can be obtained. That is, an Fe-based electroplated steel sheet (GI) according to the other embodiment of the present disclosure comprises: a cold-rolled steel sheet having a chemical composition containing Si in an amount of 0.1 mass % or more and 3.0 mass % or less; an Fe-based electroplating layer formed on one or both surfaces of the cold-rolled steel sheet; and an unalloyed hot-dip galvanized layer formed in contact with the Fe-based electroplating layer.

(Galvannealed Steel Sheet and Method of Producing Same)

A method of producing an galvannealed steel sheet according to one embodiment of the present disclosure comprises: subjecting a cold-rolled steel sheet having a chemical composition containing Si in an amount of 0.1 mass % or more and 3.0 mass % or less to Fe-based electroplating to obtain an Fe-based electroplated steel sheet with an Fe-based electroplating layer formed on one or both surfaces of the cold-rolled steel sheet; then subjecting the Fe-based electroplated steel sheet to an annealing process; then subjecting the Fe-based electroplated steel sheet to hot-dip galvanizing to form an unalloyed hot-dip galvanized layer on a surface of the Fe-based electroplating layer; and then heating and alloying the hot-dip galvanized layer to obtain a galvannealed steel sheet (GA) with a galvannealed layer formed on one or both surfaces of the cold-rolled steel sheet. In this case, the Fe-based electroplating layer is incorporated into the hot-dip galvanized layer and disappears during the alloying process. That is, an galvannealed steel sheet (GA) according to one embodiment of the present disclosure comprises a cold-rolled steel sheet having a chemical composition containing Si in an amount of 0.1 mass % or more and 3.0 mass % or less, and a galvannealed layer formed on one or both surfaces of the cold-rolled steel sheet, and does not comprise an Fe-based electroplating layer between the galvannealed layer and the cold-rolled steel sheet.

[Cold-Rolled Steel Sheet]

The process of obtaining a cold-rolled steel sheet is not particularly limited, and publicly known or arbitrary processes and conditions may be followed. For example, the process may include: hot rolling a slab with the desired chemical composition to obtain a hot-rolled steel sheet; subjecting the hot-rolled steel sheet to degreasing and subsequent pickling; and then cold rolling the hot-rolled steel sheet to obtain a cold-rolled steel sheet.

[Chemical Composition of Cold-Rolled Steel Sheet]

The following provides a description of the chemical composition of a cold-rolled steel sheet. Hereinafter, "mass %" is simply noted as "%".

Si: 0.1% or More and 3.0% or Less

Si is an effective element in increasing the strength of a steel sheet because it has a large effect of increasing the strength of steel by solid dissolution (solid solution strengthening capability) without significantly impairing formability. However, Si is also an element that adversely affects the resistance to cracking in resistance welding at a welded portion. If the Si content is less than 0.1%, it is not possible to increase the strength of the steel sheet and no particular problem arises in the resistance to cracking in resistance welding at a welded portion, in which case there is little need to apply the present disclosure. The problem of reduction in the resistance to cracking in resistance welding at a welded portion is especially apparent when the Si content is 0.5% or more. However, the tact time during spot welding in the assembly process of automotive parts has become an issue from the viewpoint of production cost, and when measures are taken to reduce the hold time, the problem of reduction in the resistance to cracking in resistance welding at a welded portion may arise even if the Si content is 0.1% or more and less than 0.5%. Therefore, in the present disclosure, the Si content is 0.1% or more, preferably 0.5% or more, more preferably 0.7% or more, and even more preferably 0.9% or more. On the other hand, an excessively high Si content can significantly reduce hot rolling manufacturability and cold rolling manufacturability, adversely affecting productivity and reducing the ductility of the steel sheet itself. Therefore, the Si content is 3.0% or less, preferably 2.5% or less, more preferably 2.0% or less, and most preferably 1.7% or less.

The cold-rolled steel sheet in this embodiment is required to contain Si in the above range, yet may contain other components within a range allowable for ordinary cold-rolled steel sheets. The other components are not restricted in any particular way. However, if the cold-rolled steel sheet is to be made to have high strength with a tensile strength (TS) of 590 MPa or higher as measured in accordance with JIS Z 2241 (2011), the following chemical composition is preferred.

C: 0.8% or Less (Exclusive of 0%)

C is an effective element in ensuring proper mechanical properties and strength by forming martensite and other phases as steel microstructures. From this perspective, the C content is preferably more than 0%, more preferably 0.03% or more, even more preferably 0.05% or more, and still more preferably 0.08% or more. On the other hand, from the viewpoint of obtaining good weldability, the C content is preferably 0.8% or less, and more preferably 0.3% or less.

Mn: 1.0% or More and 12.0% or Less

Mn is an effective element in increasing the strength of steel by solid solution strengthening, improving quench hardenability, and promoting the formation of retained austenite, bainite, and martensite. From this viewpoint, the Mn content is preferably 1.0% or more, more preferably 1.3% or more, even more preferably 1.5% or more, and most preferably 1.8% or more. On the other hand, from the viewpoint of obtaining the above effects without increasing costs, the Mn content is preferably 12.0% or less, more preferably 3.5% or less, and even more preferably 3.3% or less.

P: 0.1% or Less (Exclusive of 0%)

Suppressing the P content can contribute to preventing deterioration of weldability. It can also prevent P from segregating at grain boundaries, thus preventing degradation of ductility, bendability, and toughness. In addition, adding a large amount of P promotes ferrite transformation, causing an increase in the crystal grain size. Therefore, the P content is preferably 0.1% or less. The lower limit of the P content is not particularly limited, yet may be more than 0% or 0.001% or more, in terms of production technology constraints.

S: 0.03% or Less (Exclusive of 0%)

The S content is preferably 0.03% or less, and more preferably 0.02% or less. Suppressing the S content can prevent deterioration of weldability as well as deterioration of ductility during hot working, suppress hot cracking, and significantly improve surface characteristics. Furthermore, suppressing the S content can prevent formation of coarse sulfides as impurity elements and deterioration of ductility, bendability, and stretch flangeability of the steel sheet. The lower limit of the S content is not particularly limited, yet may be more than 0% or 0.0001% or more, in terms of production technology constraints.

N: 0.010% or Less (Exclusive of 0%)

N forms coarse nitrides with Ti, Nb, and V at high temperatures and does not contribute much to strength. Accordingly, N not only reduces the effect of increasing strength obtained by the addition of Ti, Nb, and V, but also leads to reduced toughness. Furthermore, an excessively high N content may cause slab cracking during hot rolling, resulting in surface defects. Therefore, the N content is preferably 0.010% or less. The N content is preferably 0.005% or less, more preferably 0.003% or less, and even more preferably 0.002% or less. The lower limit of the N content is not particularly limited, yet may be more than 0% or 0.0005% or more, in terms of production technology constraints.

Al: 1.0% or Less (Exclusive of 0%)

Since Al is thermodynamically most oxidizable, it oxidizes prior to Si and Mn, and is effective for suppressing oxidation of Si and Mn on the outermost surface of the steel sheet and promoting oxidation of Si and Mn inside the steel sheet. On the other hand, an Al content exceeding 1.0% increases the cost. Therefore, when added, the Al content is preferably 1.0% or less. The lower limit of Al is not particularly limited, and the Al content may be more than 0% or 0.001% or more. However, from the viewpoint of obtaining the above effect, the Al content is preferably 0.01% or more.

The balance other than the above components is Fe and inevitable impurities. However, the chemical composition may optionally contain at least one element selected from the following.

B: 0.005% or Less

B is an effective element in improving the quench hardenability of steel. To improve the quench hardenability, the B content is preferably 0.0003% or more, and more preferably 0.0005% or more. In addition, the B content is preferably 0.005% or less in order not to impair formability.

Ti: 0.2% or Less

Ti is effective for strengthening of steel by precipitation. Therefore, the Ti content is preferably 0.005% or more. In addition, the Ti content is preferably 0.2% or less, and more preferably 0.05% or less, in order not to impair formability.

Cr: 1.0% or Less

The Cr content is preferably 0.005% or more. Setting the Cr content to 0.005% or more can improve the quench hardenability and the balance between strength and ductility. When added, the Cr content is preferably 1.0% or less from the viewpoint of preventing cost increase.

Cu: 1.0% or Less

The Cu content is preferably 0.005% or more Setting the Cu content to 0.005% or more can promote formation of retained y phase. When added, the Cu content is preferably 1.0% or less from the viewpoint of preventing cost increase.

Ni: 1.0% or Less

The Ni content is preferably 0.005% or more. Setting the Ni content to 0.005% or more can promote formation of retained y phase. When added, the Ni content is preferably 1.0% or less from the viewpoint of preventing cost increase.

Mo: 1.0% or Less

The Mo content is preferably 0.005% or more. Setting the Mo content to 0.005% or more can yield a strength adjustment effect. The Mo content is more preferably 0.05% or more. When added, the Mo content is preferably 1.0% or less from the viewpoint of preventing cost increase.

Nb: 0.20% or Less

From the viewpoint of obtaining the strength increasing effect, the Nb content is preferably 0.005% or more. When added, the Nb content is preferably 0.20% or less from the viewpoint of preventing cost increase.

V: 0.5% or Less

From the viewpoint of obtaining the strength increasing effect, the V content is preferably 0.005% or more. When added, the V content is preferably 0.5% or less from the viewpoint of preventing cost increase.

Sb: 0.020% or Less

Sb can be contained from the viewpoint of suppressing oxidation on the steel sheet surface. Sb improves the wettability of plating and the chemical convertibility of a cold-rolled steel sheet by suppressing oxidation of the steel sheet. To obtain this effect, the Sb content is preferably 0.001% or more. On the other hand, Sb suppresses the formation of a decarburized layer. To obtain good resistance to cracking in resistance welding, the Sb content is preferably 0.020% or less, more preferably 0.015% or less, and even more preferably 0.012% or less.

Ta: 0.1% or Less

From the viewpoint of obtaining the strength increasing effect, the Ta content is preferably 0.001% or more. When added, the Ta content is preferably 0.1% or less from the viewpoint of preventing cost increase.

W: 0.5% or Less

From the viewpoint of obtaining the strength increasing effect, the W content is preferably 0.005% or more. When added, the W content is preferably 0.5% or less from the viewpoint of preventing cost increase.

Zr: 0.1% or Less

From the viewpoint of obtaining the strength increasing effect, the Zr content is preferably 0.0005% or more. When added, the Zr content is preferably 0.1% or less from the viewpoint of preventing cost increase.

Sn: 0.20% or Less

Sn is an effective element in suppressing, for example, denitrification and deboronization, thereby reducing the strength loss of steel. To obtain these effects, the Sn content is preferably 0.002% or more. To ensure proper impact resistance, when added, the Sn content is preferably 0.20% or less.

Ca: 0.005% or Less

Setting the Ca content to 0.0005% or more makes it possible to control sulfide morphology and improve ductility and toughness. From the viewpoint of obtaining good ductility, when added, the Ca content is preferably 0.005% or less.

Mg: 0.005% or Less

Setting the Mg content to 0.0005% or more makes it possible to control sulfide morphology and improve ductility and toughness. When added, the Mg content is preferably 0.005% or less from the viewpoint of preventing cost increase.

REM: 0.005% or Less

Setting the REM content to 0.0005% or more makes it possible to control sulfide morphology and improve ductility and toughness. When added, the REM content is preferably 0.005% or less from the viewpoint of obtaining good toughness.

[Thickness of Cold-Rolled Steel Sheet]

The thickness of the cold-rolled steel sheet in this embodiment is not particularly limited. However, the thickness may usually be 0.5 mm or more. It may usually be 3.2 mm or less.

[Degreasing and Pickling]

In this embodiment, the cold-rolled steel sheet is preferably subjected to degreasing and subsequent pickling as a pretreatment for Fe-based electroplating. Specifically, it is preferable that degreasing and water washing be performed to clean the steel sheet surface, and then pickling and water washing be performed to activate the steel sheet surface. The degreasing and water washing are not particularly limited, and publicly known or arbitrary methods and conditions may be followed. Various acids such as sulfuric acid, hydrochloric acid, nitric acid, and mixtures of these acids can be used in the pickling. Among these preferred are sulfuric acid, hydrochloric acid, and a mixture of these. Although the concentration of acid is not specified, approximately 1 mass % to 20 mass % is desirable considering the ability to remove oxide coating and the prevention of rough skin due to over pickling. The pickling solution may also contain, for example, a defoamer, a pickling promoter, or a pickling inhibitor.

[Fe-Based Electroplating]

Then, the cold-rolled steel sheet is subjected to Fe-based electroplating to obtain an Fe-based electroplated steel sheet with an Fe-based plating layer formed on one or both surfaces of the cold-rolled steel sheet with a predetermined coating weight. The presence of the Fe-based electroplating layer makes it possible to obtain excellent chemical convertibility in a simple Fe-based plated steel sheet (CR) and good coating appearance in a hot-dip galvanized steel sheet (GI). In the case of a galvannealed steel sheet (GA), although the Fe-based electroplating layer will disappear, performing Fe-based electroplating in the production of a GA is a necessary condition for obtaining good coating appearance. Specific methods and conditions for Fe-based electroplating treatment are not limited. For example, the plating bath may be a sulfuric acid bath, a hydrochloric acid bath, or a mixture thereof.

From the viewpoint of forming an Fe-based electroplating layer with a sufficient coating weight, the Fe ion content in the plating bath before the start of current passage is preferably 0.5 mol/L or more as $Fe^{2+}$. The Fe ion content in the plating bath before the start of current passage is preferably 2.0 mol/L or less as $Fe^{2+}$. Other conditions related to the Fe-based electroplating are not also limited. From the perspective of achieving holding at a constant temperature, the temperature of the plating solution is desirably 30° C. or higher. From the same perspective, the temperature of the plating solution is desirably 85° C. or lower. Although the pH of the plating solution is not particularly limited, it is preferably 1.0 or higher from the viewpoint of preventing a decrease in current efficiency due to hydrogen generation, and 3.0 or lower from the viewpoint of ensuring conductivity. The current density is preferably 10 $A/dm^2$ or higher for productivity. It is preferably 150 $A/dm^2$ or lower for ease of control of coating weight of the Fe-based electroplating layer. The sheet passing speed is preferably 5 mpm or higher for productivity. It is preferably 150 mpm or lower for stable control of coating weight.

The Fe-based electroplating layer may be an Fe (pure Fe) plating layer, or an alloy plating layer such as the one formed from Fe—B alloy, Fe—C alloy, Fe—P alloy, Fe—N alloy, Fe—O alloy, Fe—Ni alloy, Fe—Mn alloy, Fe—Mo alloy, Fe—W alloy, or other alloy. The plating bath may contain at least one element selected from the group consisting of B, C, P, N, O, Ni, Mn, Mo, Zn, W, Pb, Sn, Cr, V, and Co. In the case of CRs and GIs, the total content of these elements in the plating bath is preferably 10 mass % or less in the Fe-based plating layer. In the case of GAs, the total content of these elements in the plating bath is preferably 1 mass % or less in the galvannealed layer because no Fe-based plating layer is considered to remain. In the case of CRs or GIs and when the Fe-based electroplating layer is an Fe—C alloy, the C content is preferably 0.08 mass % or less. Metallic elements may be contained as metal ions, while non-metallic elements may be contained as part of, for example, boric acid, phosphoric acid, nitric acid, or organic acid. The iron sulfate plating solution may also contain conductivity aids such as sodium sulfate and potassium sulfate, chelating agents, or pH buffers.

Coating Weight a Per Surface of Fe-Based Electroplating Layer: 1.0 g/m² or More

In any of the production processes of CRs, GIs, and GAs, if the coating weight A per surface of the Fe-based plating layer is less than 1.0 g/m², the coating weight of the Fe-based electroplating layer is not sufficient, and chemical convertibility or the coating appearance when hot-dip galvanizing is applied is insufficient. Therefore, the coating weight A per surface of the Fe-based electroplating layer is 1.0 g/m² or more, and preferably more than 2.0 g/m². Although the upper limit of the coating weight A is not particularly limited, from the viewpoint of reducing the length of the production line and suppressing the increase in power cost, it is preferable that the coating weight A per surface of the Fe-based electroplating layer be less than 5.0 g/m², and more preferably 4.5 g/m² or less. For CRs and GIs in this embodiment, the coating weight per surface of the Fe-based electroplating layer is maintained at the coating weight A immediately after Fe-based electroplating. On the other hand, for GAs, the Fe-based electroplating layer disappears.

The Fe-based electroplating layer also contributes to the resistance to cracking in resistance welding at a welded portion. Although the mechanism for this is not clear, it is considered that during the annealing process described below, the Fe-based electroplating layer promotes decarburization from the surface layer of the steel sheet, and the softening layer in the surface layer formed by the decarburization relieves residual stresses during welding, thereby suppressing cracking in a welded portion.

Compared to cold-rolled steel sheets without an Fe-based electroplating layer, the formation of a decarburized layer is further promoted by annealing in the Fe-based electroplated steel sheet with an Fe-based electroplating layer formed thereon at or above 1.0 g/m², resulting in improved resistance to cracking in resistance welding at a welded portion. Although the mechanism is not clear, it is assumed that in the case of the steel sheet having no Fe-based electroplating layer formed thereon, decarburization proceeds as a result of solute C reacting with $H_2O$ in the surface layer of the steel sheet in the furnace during annealing to form CO and $CO_2$, whereas in the case of the steel sheet having an Fe-based electroplating layer formed thereon, the rate-determining process is different since solute C in the steel sheet is allowed to diffuse into the Fe-based electroplating layer as it is, and the decarburization rate is faster. In the case of electroplating with a single metallic element, for example, Ni, Co, or Sn, the solubility of C in these metallic elements is extremely low, and the effect of promoting decarburization cannot be obtained since C is not solidly soluble.

The coating weight of the Fe-based electroplating layer is measured as follows. A sample of 10 mm×15 mm in size is taken from a Fe-based electroplated steel sheet and embedded in resin to make a cross-sectional embedded sample. Three arbitrary locations on the cross-section are observed using a scanning electron microscope (SEM) at an accelerating voltage of 15 kV and a magnification of 2,000× to 10,000× depending on the thickness of the Fe-based electroplating layer. Then, the average thickness in the three fields of view is multiplied by the density of iron to convert the result of observation to the coating weight per surface of the Fe-based electroplating layer.

[Heating Process]

In any of the production processes of CRs, GIs, and GAs, it is preferable that the Fe-based electroplated steel sheet be heated with an average heating rate of 10° C./s or higher in a temperature range of 400° C. to 650° C. during a heating process before annealing (soaking). By setting the average heating rate to 10° C./s or higher, the growth of crystal grains in the Fe-based electroplating layer is reduced as much as possible during the heating process. This is because Si internal oxidation hardly proceeds at the crystal grain boundaries of the Fe-based electroplating layer during the heating process, as described below, and if the average heating rate is lower than 10° C./s, the growth of crystal grains cannot be suppressed. In contrast, crystals in the Fe-based electroplating layer can be refined if annealing is performed so that the dew point B (° C.) of the atmosphere during the annealing satisfies the specified conditions in relation to the coating weight A (g/m²) per surface of the Fe-based electroplating layer, as described below, while suppressing the growth of crystal grains in the Fe-based electroplating layer as much as possible during the heating process. For example, a Direct Fired Furnace (DFF) or Non Oxidizing Furnace (NOF) can be used for the heating zone in the heating process. In the case of a radiant-tube heating furnace, a preliminary heating zone such as an induction heater (IH) may be installed in the preceding stage.

[Annealing]

Then, the Fe-based electroplated steel sheet is subjected to an annealing process. The annealing process is performed to adjust the strength of the steel sheet by relieving the stress in the cold-rolled steel sheet caused by the rolling process and recrystallizing the microstructure of the cold-rolled steel sheet.

Hydrogen Concentration: 1.0 Vol. % or More and 30.0 Vol. % or Less

The annealing process can be performed, for example, in a reducing atmosphere with a hydrogen concentration of 1.0 vol. % or more and 30.0 vol. % or less. Hydrogen plays a role in suppressing the oxidation of Fe on the surface of the Fe-based electroplated steel sheet during the annealing process and activating the steel sheet surface. If the hydrogen concentration is 1.0 vol. % or more, the oxidation of Fe on the steel sheet surface can be suppressed and proper coating adhesion can be ensured in hot-dip galvanizing. Therefore, the annealing process is performed in a reducing atmosphere with a hydrogen concentration of preferably 1.0 vol. % or more, and more preferably 2.0 vol. % or more. Although the upper limit of the hydrogen concentration in the annealing process is not particularly limited, from the cost perspective, the hydrogen concentration is preferably 30.0 vol. % or less, and more preferably 20.0 vol. % or less. The balance of the annealing atmosphere other than hydrogen is preferably nitrogen.

In this embodiment, it is important that the dew point B (° C.) of the atmosphere during the annealing meet the specified conditions in relation to the coating weight A (g/m²) per surface of the Fe-based electroplating layer, making it possible to improve the resistance to cracking in resistance welding at a welded portion. This is considered to be because decarburization is promoted during annealing of the Fe-based electroplated steel sheet, and the softening layer in the surface layer formed by the decarburization relieves residual stresses during welding, thereby suppressing cracking in a welded portion.

Specifically, in the case of producing a simple Fe-based plated steel sheet (CR) or a hot-dip galvanized steel sheet (GI) in which the hot-dip galvanized layer is not alloyed, it is important that the following formula (1), preferably formula (1)', be satisfied.

$$A+B \geq 3.0 \tag{1}$$

$$A+B \geq 8.0 \tag{1)'}$$

In the case of producing a galvannealed steel sheet (GA) in which the hot-dip galvanized layer is alloyed, it is important that the following formula (2), preferably formula (2)', be satisfied.

$$A+B \geq 5.0 \tag{2}$$

$$A+B \geq 10.0 \tag{2)'}$$

The LME cracking described above can be broadly classified into cracking that occurs on the surface in contact with the electrode (hereinafter referred to as "surface cracking") and cracking that occurs near the corona bond between steel sheets (hereinafter referred to as "internal cracking"). It is known that surface cracking is likely to occur in resistance welding at high currents where spatter is generated, and surface cracking can be suppressed by keeping the current within an appropriate range where spatter is not generated. On the other hand, internal cracking occurs even when the current during resistance welding is kept within an appropriate range where spatter is not generated. Surface cracking is easily detected by visual inspection during the manufacturing process, whereas internal cracking is difficult to detect by visual inspection. For these reasons, among LME cracking, internal cracking is a particularly significant issue. If resistance welding is performed with the welding electrode at an angle to the steel sheet, residual stresses may increase and internal cracks may form. Since residual stresses are expected to increase as the steel sheet has higher strength, there is concern about internal cracking associated with higher strength of the steel sheet. According to the present disclosure, among the resistance to cracking in resistance welding, the property of preventing such internal cracking can be improved.

As mentioned above, if the formula (1) or (2) is consequently satisfied, the resistance to cracking in resistance welding at a welded portion is improved. In another embodiment of the present disclosure, an additional process may be further performed to change at least one of the coating weight A (g/m$^2$) or the dew point B (° C.) to satisfy the formula (1) or (1)' in a case where the formula (1) or (1)' is not satisfied in the production processes of CRs and GIs, or to satisfy the formula (2) or formula (2)' in a case where the formula (2) or (2)' is not satisfied in the production process of a GA. This may more reliably improve the resistance to cracking in resistance welding at a welded portion. As an example of carrying out this additional process during operation, it is conceivable to change the dew point B in the annealing process to satisfy the formula (1) or (1)', or the formula (2) or (2)', depending on the value of the coating weight A of the Fe-based electroplating layer obtained in the Fe-based electroplating, so that the dew point of the atmosphere is set to the changed dew point B in the annealing process. Specifically, the value of the coating weight A of the Fe-based electroplating layer obtained in the Fe-based electroplating is substituted into the formula (1) or (1)', or into the formula (2) or (2)', and the dew point B in the annealing process is determined to satisfy the substituted formula. As used herein, the phrase "the value of the coating weight A of the Fe-based electroplating layer is substituted into the formula (1) or (1)', or into the formula (2) or (2)" is not strictly limited to substituting the value into the formula exactly the same as the formula (1) or (1)', or the formula (2) or (2)', but also includes substitutions into a narrower range of inequalities that always satisfy these formulas. Through this control, for example, even in a case where the formula (1) or (1)', or the formula (2) or (2)', is not satisfied as a result of the coating weight A being changed significantly in response to a change in the product specification of a continuously-passed steel sheet (when the formula is actually not satisfied or when a situation arises that prevents the formula from being satisfied), automatic control can be performed so that the formula (1) or (1)', or the formula (2) or (2)', is satisfied.

Since the control response of the dew point B is worse than that of the coating weight A, it is more preferable, in terms of control response, to change the coating weight A to satisfy the formula (1) or (1)', or the formula (2) or (2)', according to the value of the dew point B. In the case of a continuous annealing furnace, the coating weight A in the Fe-based electroplating process upstream of the annealing process is changed according to the value of the dew point B in the annealing process. In this case, the production can be performed under the conditions satisfying the formula (1) or (1)', or the formula (2) or (2)', for the part of a continuously-passed steel sheet where the coating weight A has been changed.

As for the timing to change at least one of the coating weight A or the dew point B to satisfy the formula (1) or (1)', or the formula (2) or (2)', in the case where steel sheets of different product specifications are welded and continuously passed, it is more preferable to change the coating weight A or the dew point B as the welded portion passes. In the case of changing the dew point B, it is more preferable to feed-forward control the amount of humidification in the furnace to satisfy the formula because of the poor response of the dew point B as mentioned above.

As used herein, the "value of the coating weight A" may be a coating weight that would be obtained under the conditions adopted in the Fe-based electroplating (i.e., a target value), or a coating weight of the Fe-based electroplating layer actually obtained (i.e., a measured value). Similarly, the "value of the dew point B" may be either a target value or a measured value.

Some examples have been described above in the context of the methods of producing CRs, GIs, and GAs being performed during operation. However, it is also possible to carry out a method of determining production conditions of CRs, GIs, and GAs, in which it is checked before the start of operation whether or not the target value of the coating weight A and the target value of the dew point B satisfy the formula (1) or (1)', or the formula (2) or (2)', and if they do not satisfy the formula, at least one of the target value of the coating weight A or the target value of the dew point B is changed before the start of operation. This method of determining production conditions may be implemented as part of or separately from the methods of producing CRs, GIs, and GAs.

Although the upper limit of the dew point of the annealing atmosphere is not specified, the dew point of the annealing atmosphere is preferably 20° C. or lower to suitably prevent oxidation on the surface of the Fe-based electroplating layer, to suppress variations in dew point, and to ensure proper chemical convertibility or proper coating adhesion when hot-dip galvanizing is applied. The lower limit of the dew point B of the annealing atmosphere is not particularly limited as long as the formula (1) or (2) is satisfied. However, the dew point B is preferably higher than 0° C., and more preferably higher than 5° C.

Holding Time in Temperature Range of 650° C. to 900° C.: 30 Seconds to 600 Seconds In the annealing process, the holding time in the temperature range of 650° C. to 900° C. is preferably 30 seconds or more. This setup makes it possible to suitably remove the natural oxide film of Fe formed on the surface of the Fe-based electroplating layer and improve chemical convertibility or the coating adhesion when hot-dip galvanizing is applied. The upper limit of the holding time in this temperature range is not specified, yet from the viewpoint of productivity, the holding time in this temperature range is preferably 600 seconds or less.

Maximum Arrival Temperature of Fe-based Electroplated Steel Sheet: 650° C. to 900° C.

The maximum arrival temperature of the Fe-based electroplated steel sheet is not particularly limited. However, it is preferably 650° C. or higher. It is preferably 900° C. or lower. By setting the maximum arrival temperature of the Fe-based electroplated steel sheet to 650° C. or higher, recrystallization of the microstructure of the steel sheet can suitably proceed and the desired strength can be obtained. This setup also makes it possible to suitably reduce the natural oxide film of Fe formed on the surface of the Fe-based electroplating layer and improve chemical convertibility or the coating adhesion when hot-dip galvanizing is applied. In addition, by setting the maximum arrival temperature of the Fe-based electroplated steel sheet to 900° C. or lower, the diffusion rate of Si and Mn in the steel is prevented from increasing too much and the diffusion of Si and Mn to the steel sheet surface can be prevented, making it possible to improve chemical convertibility or the coating adhesion when hot-dip galvanizing is applied. If the maximum arrival temperature is 900° C. or lower, damage to the heat treatment furnace can be prevented and costs can be reduced. The maximum arrival temperature is based on the temperature measured on the surface of the Fe-based electroplated steel sheet.

[Hot-Dip Galvanization]

In the production processes of GIs and GAs, after the annealing process, the Fe-based electroplated steel sheet is further subjected to hot-dip galvanizing to form a hot-dip galvanized layer on a surface thereof. The Fe-based electroplated steel sheet may be cooled after subjection to the annealing process and immersed in a hot-dip galvanizing bath to apply hot-dip galvanizing to the steel sheet surface. The hot-dip galvanizing bath is composed of Al, Zn, and inevitable impurities. The composition of the hot-dip galvanizing bath is not specified. However, in general, the Al concentration in the bath is 0.05 mass % or more and 0.250 mass % or less. If the Al concentration in the bath is 0.05 mass % or more, bottom dross can be prevented, and thus dross can be prevented from causing a defect by adhering to the steel sheet. In addition, setting the Al concentration in the bath to 0.250 mass % or less prevents an increase in top dross and prevents dross from causing a defect by adhering to the steel sheet, while also reducing costs. Other conditions of the hot-dip galvanizing treatment are not restricted. However, for example, the bath temperature of the hot-dip galvanizing bath is normally set in the range of 440° C. to 500° C., and the steel sheet is immersed in the hot-dip galvanizing bath with the sheet temperature adjusted in the range of 440° C. to 550° C.

The coating weight per surface of the hot-dip galvanized layer is controlled in the range of 25 g/m$^2$ to 80 g/m$^2$. By setting the coating weight to 25 g/m$^2$ or more, corrosion resistance can be further improved and the coating weight can be easily controlled. By setting the coating weight to 80 g/m$^2$ or less, good coating adhesion is obtained. Adjustment of the coating weight can be done by general gas wiping.

[Heating and Alloying]

In the production process of a GA, after the hot-dip galvanizing, the hot-dip galvanized layer is heated and alloyed to form a galvannealed steel sheet (GA). The method of alloying treatment is not limited, yet may be performed using IH, gas furnace, or the like. The peak metal temperature during the alloying treatment is preferably 460° C. or higher. It is preferably 600° C. or lower. If the peak metal temperature is 460° C. or higher, alloying is sufficient. If the peak metal temperature is 600° C. or lower, alloying is not excessive, without impairing the coating adhesion.

The Fe % in the galvannealed layer of the galvannealed steel sheet is preferably in the range of 7 mass % to 15 mass %. If it is 7 mass % or more, deterioration of press formability due to residual η-phase can be suppressed, and if it is 15 mass % or less, the coating adhesion is not impaired. When controlled within this range, the Fe-based electroplating layer is fully alloyed with zinc and disappears. Even in this case, the galvannealed steel sheet has excellent resistance to cracking in resistance welding.

The following provides a description of how to calculate the coating weight and Fe % of the galvanized layer in the cases of GIs and GAs.

The coating weight of the galvanized layer is measured according to JIS H 0401 or ISO 17925. First, two samples of 20 mm×25 mm in size are taken from a GI or GA. After the weight of each sample is measured, one-sided coating exfoliation is performed with a test solution as specified in JIS H 0401 or ISO 17925, and the weight is measured again. The coating weight can be calculated by subtracting the weight after the coating exfoliation from the weight before the coating exfoliation, and dividing the result by the surface area over which the coating has been exfoliated. In this case, the average value of the two locations is taken as the coating weight.

The measurement of Fe % is performed in accordance with ISO 17925. The test solution after the coating exfoliation is analyzed using an inductively coupled plasma (ICP) emission analyzer to determine the content of each component in the test solution. Then, the Fe % can be calculated by dividing the Fe content in the test solution by the total amount of Fe, Zn, and Al in the test solution. In this case, the average value of the two locations is taken as the Fe %.

[Internal Oxidation Layer in CR and GI]

For CRs and GIs in this embodiment, it is important that the depth of the internal oxidation layer from 0.10 μm below the surface of the Fe-based electroplating layer towards the cold-rolled steel sheet be within 2.00 μm. This can be achieved by performing annealing so that the formula (1), A+B≥3.0, is satisfied. If the depth of the internal oxidation layer from 0.10 μm below the surface of the Fe-based electroplating layer towards the cold-rolled steel sheet exceeds 2.00 μm, the resistance to cracking in resistance welding deteriorates. Although the mechanism is not clear, it is considered that by keeping the depth of the internal oxidation layer within 2.00 μm in this way, the penetration of zinc in the depth direction of the cold-rolled steel sheet when it reaches crystal grain boundaries of the cold-rolled steel sheet can be minimized, and the resistance to cracking in resistance welding at a welded portion can be improved. On the other hand, the formation of internal oxides can suppress the formation of oxides on the surface during the annealing, which serves to improve the chemical convertibility in CRs or the coating appearance in GIs. To achieve this effect, the depth of the internal oxidation layer is preferably 0.10 μm or more.

The fact that the depth of the internal oxidation layer from 0.10 μm below the surface of the Fe-based electroplating layer towards the cold-rolled steel sheet is within 2.00 μm is defined as the following conditions being met. Specifically, in an emission intensity profile at a wavelength indicating Si measured in a depth direction from a surface of the Fe-based electroplating layer by glow discharge optical emission spectrometry (GD-OES), (i) there exists a peak with an emission intensity higher than an average Si intensity ($I_{Si}$) in a depth range of 10.0±0.1 μm from an interface between the Fe-based electroplating layer and the cold-rolled steel sheet, (ii) a peak maximum of the peak is located deeper than 0.10 μm below the surface of the Fe-based electroplating layer, and (iii) a depth at which the emission intensity first becomes equal to the average Si intensity ($I_{Si}$) after gradually decreasing in the depth direction from the peak maximum of the peak is within 2.00 μm from 0.10 μm below the surface of the Fe-based electroplating layer. The measurement conditions are as follows: Ar gas pressure 600 Pa, high frequency output 35 W, measurement diameter 4 mmϕ, and sampling interval 0.1 seconds. The sputtering rate is calculated by measuring the depth of spatter traces after analyzing a cold-rolled steel sheet without Fe-based electroplating by glow discharge optical emission spectrometry under the same conditions, and the values shown in the horizontal axis of the intensity profile at the wavelength indicating Si are converted to the depth values at the corresponding time. A non-contact surface profilometer (NewView 7300 available from Zygo) was used to measure the depth of the spatter traces.

Figure 5:
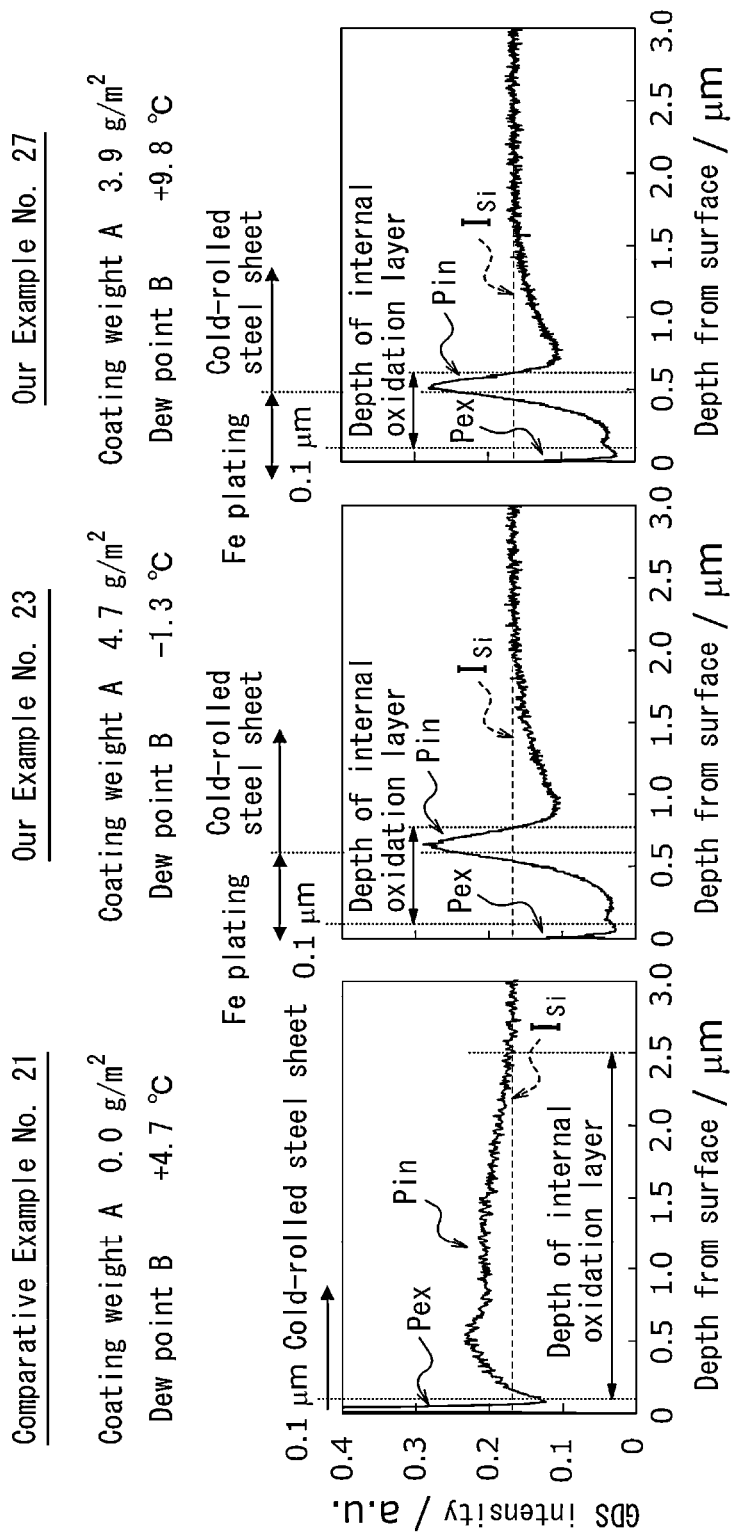
FIG. 5 illustrates the raw data of emission intensity profiles at a wavelength indicating Si by glow discharge optical emission spectrometry for some of the Fe-based electroplated steel sheets (CRs) without subjection to hot dip galvanization in Example 1.

FIG. 5 is used to illustrate representative Si peaks analyzed for the emission intensity at a wavelength indicating Si observed in this embodiment. FIG. 5 illustrates the raw data of emission intensity profiles at a wavelength indicating Si for Comparative Example No. 21 (without Fe-based electroplating, in an annealing atmosphere with a dew point B of +4.7° C.), our Example No. 23 (with Fe-based electroplating, with a coating weight A of 4.7 g/m² and a dew point B of −1.3° C.), and our Example No. 27 (with Fe-based electroplating, with a coating weight A of 3.9 g/m² and a dew point B of +9.8° C.), as described in the Example 1 section below (Table 4). In each of our Examples No. 23 and No. 27, an Fe-based electroplating layer (labeled as "Fe plating" for convenience in FIG. 5) having a thickness of about 0.50 μm to 0.60 μm is formed on the surface of the cold-rolled steel sheet. In Comparative Example No. 21, a peak Pex originating from Si external oxides is observed within 0.10 μm below the surface of the cold-rolled steel sheet. A peak Pin originating from Si internal oxides is also observed at a depth of more than 0.10 μm below the surface. In each of our Examples No. 23 and No. 27, a peak Pex originating from Si external oxides is also observed within 0.10 μm below the surface of the Fe-based electroplating layer, and a peak Pin originating from Si internal oxides at a depth of more than 0.10 μm below the surface. Pin is observed across the Fe-based electroplating layer and the cold-rolled steel sheet, which means that Si internal oxides are also formed in the Fe-based electroplating layer. The range of the internal oxidation layer is defined as up to a depth at which the emission intensity first becomes equal to the average Si intensity ($I_{Si}$) after gradually decreasing in the depth direction from the peak maximum of the peak Pin. Since Pex appears in the depth range of 0.10 μm from the surface (the surface of the cold-rolled steel sheet in Comparative Example No. 21 and the surface of the Fe-based electroplating layer in our Examples No. 23 and No. 27), the "thickness of the internal oxidation layer" is defined by excluding this depth range and as the thickness from 0.10 μm below the surface to a depth at which the emission intensity first becomes equal to the average Si intensity ($I_{Si}$) after gradually decreasing in the depth direction from the peak maximum of the peak Pin. In Comparative Example No. 21, the thickness of the internal oxidation layer was 2.39 μm. In our Examples No. 23 and No. 27, the thickness of the internal oxidation layer was 0.56 μm and 0.52 μm, respectively.

In this case, the thickness of the Fe-based electroplating layer is the value measured by the cross-sectional observation described above. For steel sheets with oxides formed partially inside the Fe-based electroplating layer, the growth of crystal grains in the Fe-based electroplating layer is suppressed by the internal oxides. Accordingly, even if annealing is performed after the Fe-based electroplating, the crystal grains in the Fe-based electroplating layer can be prevented from becoming coarse. This causes many crystal grain boundaries to be formed in the Fe-based electroplating layer, resulting in dispersion of penetration paths of molten zinc, delaying the time for the molten zinc to reach the crystal grain boundaries of the cold-rolled steel sheet during resistance welding, and providing excellent resistance to cracking in resistance welding. Furthermore, by forming oxides partially inside the Fe-based electroplating layer, the depth of the internal oxidation layer from 0.10 μm below the surface of the Fe-based electroplating layer towards the cold-rolled steel sheet can be kept within 2.00 μm, minimizing the penetration of zinc in the depth direction of the cold-rolled steel sheet when it reaches crystal grain boundaries of the cold-rolled steel sheet. As a result, even better resistance to cracking in resistance welding can be obtained.

When analyzed by glow discharge optical emission spectrometry in the depth direction from the surface, a peak of emission intensity at wavelength indicating Si may be present within both the range from the surface of the Fe-based electroplating layer to more than 0.10 μm and the range of 0.00 μm to 0.10 μm from the surface. In any of No. 21, No. 23, and No. 27 as described above with reference to FIG. 5, peaks of emission intensity at a wavelength indicating Si are observed within both the range from the surface to more than 0.10 μm and the range of 0.00 μm to 0.10 μm from the surface. This indicates the presence of Si external oxides on the surface layer as well as the presence of Si internal oxides.

[Amount of Internal Oxides in GA]

For GAs in this embodiment, it is important to reduce the amount of internal oxides that are in contact with the galvannealed layer. Specifically, it is important that in an emission intensity profile at a wavelength indicating Si measured in a depth direction (thickness direction) from a surface of the galvannealed layer by glow discharge optical emission spectrometry (GD-OES), a value of $(I_{Si,Fe})/(I_{Si,bulk})$ be 0.90 or less, where ($I_{Si,Fe}$) denotes an average Si intensity in a range from an interface between the galvannealed layer and the cold-rolled steel sheet to +0.5 μm towards the cold-rolled steel sheet, and ($I_{Si,bulk}$) denotes an average Si intensity in the cold-rolled steel sheet. This can be achieved by performing annealing so that the formula (2), A+B≥5.0, is satisfied.

The fact that the value of $(I_{Si,Fe})/(I_{Si,bulk})$ is 0.90 or less means that Si diffusing from the cold-rolled steel sheet to the Fe-based electroplating layer during annealing can form oxides inside the Fe-based electroplating layer, and by forming oxides partially inside the Fe-based electroplating layer in this way, the amount of internal oxides that are in contact with the galvannealed layer can be reduced. Therefore, the penetration of zinc from the grain boundaries of the internal oxidation layer that are in contact with the galvannealed layer can be suppressed. This may delay the time for the molten zinc to reach the crystal grain boundaries of the cold-rolled steel sheet during welding, thereby improving the resistance to cracking in resistance welding at a welded portion. The value of $(I_{Si,Fe})/(I_{Si,bulk})$ is preferably 0.85 or less, and more preferably 0.80 or less. In addition, the value of $(I_{Si,Fe})/(I_{Si,bulk})$ is preferably 0.50 or more, and more preferably 0.60 or more.

The measurement conditions are as follows: Ar gas pressure 600 Pa, high frequency output 35 W, measurement diameter 4 mmϕ, and sampling interval 0.1 seconds. The average Si intensities are both obtained by averaging all Si intensities sampled in the respective ranges. The sputtering rate is calculated by measuring the depth of spatter traces after analyzing a cold-rolled steel sheet without Fe-based electroplating and hot-dip galvanizing by glow discharge optical emission spectrometry under the same conditions, and the values shown in the horizontal axis of the intensity profile at the wavelength indicating Si are converted to the depth values at the corresponding time. A non-contact surface profilometer (NewView 7300 available from Zygo) is used to measure the depth of the spatter traces. The sputtering rate in the galvannealed layer is different from those in the Fe-based electroplating layer and the cold-rolled steel sheet. In other words, the criteria for depth conversion differ due to elemental differences. Accordingly, the interface between the galvannealed layer and the cold-rolled steel sheet is determined as follows. FIG. 9 is used to explain how the interface between the galvannealed layer and the cold-rolled steel sheet is identified. First, the average Zn intensity $(I_{Zn})$ in the range of 0.5±0.1 μm in the thickness direction from the surface of the galvannealed layer is divided by 2. Then, the depth in the thickness direction at which the Zn intensity first reaches the value of $I_{Zn}/2$ is defined as the depth of the interface between the galvannealed layer and the cold-rolled steel sheet. Then, a position that is shifted from the interface between the galvannealed layer and the cold-rolled steel sheet towards the cold-rolled steel sheet by a distance of +0.5 μm in the thickness direction is identified. An average Si intensity $(I_{Si,Fe})$ in the range from the interface L1 between the galvannealed layer and the cold-rolled steel sheet to the position L2 shifted by +0.5 μm is calculated. Since the sputtering rate in the galvannealed layer is different from those in the Fe-based electroplating layer and the cold-rolled steel sheet, the horizontal axis of the intensity profile does not correspond exactly to the position of the interface between the galvannealed layer and the cold-rolled steel sheet, which is visible by cross-sectional observation. In addition, it is generally known that measurement by glow discharge optical emission spectrometry results in a broad profile at interfaces formed from two or more materials due to unevenness, non-uniformity of sputtering, and other reasons. Therefore, in this case, the depth in the thickness direction at which the Zn intensity first reaches $I_{Zn}/2$, which is the value obtained by dividing the average Zn intensity $(I_{Zn})$ in the range of 0.5±0.1 μm in the thickness direction from the surface of the galvannealed layer by 2, is defined as the depth of the interface between the galvannealed layer and the cold-rolled steel sheet.

FIG. 9 is used to illustrate representative cases analyzed for the emission intensity at wavelengths indicating Si and Zn observed in this embodiment. FIG. 9 illustrates the raw data of emission intensity profiles at wavelengths indicating Si and Zn for Comparative Example No. 36 (without Fe-based electroplating, in an annealing atmosphere with a dew point B of +7.4° C.), our Example No. 41 (with Fe-based electroplating, with a coating weight A of 3.5 g/m² and a dew point B of +7.1° C.), and our Example No. 45 (with Fe-based electroplating, with a coating weight of 4.2 g/m² and a dew point B of +7.6° C.), as described in the Example 1 section below (Table 2). In Comparative Example No. 36, the value of $(I_{Si,Fe})/(I_{Si,bulk})$ was 0.99. On the other hand, in our Examples No. 41 and No. 45, the values of $(I_{Si,Fe})/(I_{Si,bulk})$ were 0.80 and 0.77, respectively.

[C Concentration in CR, GI, and GA]

For CRs and GIs in this embodiment, from the viewpoint of further improving the resistance to cracking in resistance welding, it is important to adjust, through the annealing, the average value of C concentration in the range of 10 μm to 20 μm in the thickness direction from the surface of the Fe-based electroplating layer to 0.10 mass % or less, preferably 0.06 mass % or less, and more preferably 0.04 mass % or less. Similarly, for GAs in this embodiment, it is important to adjust, through the annealing, the average value of C concentration in the range of 10 μm to 20 μm in the thickness direction from the interface between the galvannealed layer and the cold-rolled steel sheet to 0.10 mass % or less, preferably 0.06 mass % or less, and more preferably 0.04 mass % or less. On the other hand, if the C concentration is too low, fatigue strength may decrease. Therefore, for CRs and GIs in this embodiment, the average value of C concentration in the range of 10 μm to 20 μm in the thickness direction from the surface of the Fe-based electroplating layer is preferably 0.01 mass % or more. Similarly, for GAs in this embodiment, the average value of C concentration in the range of 10 μm to 20 μm in the thickness direction from the interface between the galvannealed layer and the cold-rolled steel sheet is preferably 0.01 mass % or more.

During the annealing, a decarburization layer is formed in the surface layer of the steel sheet subjected to Fe-based electroplating. A decarburized layer is a region near the surface of the steel sheet where the C concentration is lower than the concentration in the steel, and can be formed due to desorption of C from the steel sheet surface during the annealing. For CRs and GIs in this embodiment, this region becomes soft if the average value of C concentration in the range of 10 μm to 20 μm in the thickness direction from the surface of the Fe-based electroplating layer is 0.10 mass % or less as described above. Similarly, for GAs in this embodiment, this region becomes soft if the average value of C concentration in the range of 10 μm to 20 μm in the thickness direction from the interface between the galvannealed layer and the cold-rolled steel sheet is 0.10 mass % or less. This reduces the stress applied by the welding electrode during resistance welding and improves the resistance to cracking in resistance welding.

For CRs and GIs in this embodiment, by performing annealing after the formation of the Fe-based electroplating layer, the average value of C concentration in the range of 10 μm to 20 μm in the thickness direction from the surface of the Fe-based electroplating layer can be reduced more than when no Fe-based electroplating layer is formed. Similarly, for GAs in this embodiment, by performing annealing after the formation of the Fe-based electroplating layer, the average value of C concentration in the range of 10 μm to 20 μm in the thickness direction from the interface between the galvannealed layer and the cold-rolled steel sheet can be reduced more than when no Fe-based electroplating layer is formed. In the case of electroplating with a single metallic element, for example, Ni, Co, or Sn, the solubility of C in these metallic elements is extremely low, and the effect of promoting decarburization cannot be obtained since C is not solidly soluble.

Although the reason why the formation of the Fe-based electroplating layer causes a reduction in the C concentration in the range of 10 μm to 20 μm in the thickness direction from the surface of the Fe-based electroplating layer and in the range of 10 μm to 20 μm in the thickness direction from the interface between the galvannealed layer and the cold-rolled steel sheet is not clear, the present inventors speculate as follows. Specifically, this is considered to be because the Fe-based electroplating layer contains little C, which induces diffusion of C from the cold-rolled steel sheet.

As a result of the softening achieved by reducing the C concentration in the range of 10 μm to 20 μm in the thickness direction from the surface of the Fe-based electroplating layer or the interface between the galvannealed layer and the cold-rolled steel sheet, the C concentration in the range of 1 μm to 20 μm in the thickness direction from the surface of the Fe-based electroplating layer or the interface between the galvannealed layer and the cold-rolled steel sheet is saturated below a certain level. Therefore, there is a limit to the improvement of resistance to cracking in resistance welding by means of softening. In this embodiment, by lowering the C concentration in the range of 10 μm to 20 μm in the thickness direction from the surface of the Fe-based electroplating layer or the interface between the galvannealed layer and the cold-rolled steel sheet, the resistance to cracking in resistance welding is effectively improved even when the decarburized layer is shallow. This suggests that not only softening but also other effects such as an increase in melting point due to the reduction in C concentration may be expressed.

For CRs, GIs, and GAs in this embodiment, the depth of the decarburized layer from the surface of the Fe-based electroplating layer in the case of CRs and GIs, or from the interface between the galvannealed layer and the cold-rolled steel sheet in the case of GAs, i.e., the thickness of the decarburized layer, is preferably 30 μm or more, and more preferably 80 μm or more. The upper limit of the thickness of the decarburized layer is not particularly limited, yet the thickness of the decarburized layer is preferably 130 μm or less in order to keep the tensile strength within a good range. The thickness of the decarburized layer is defined as, in the case of CRs and GIs, the thickness of a region in the surface layer of the Fe-based electroplated steel sheet where the C concentration is determined to be 80% or less of that in the steel when analyzing the C concentration in the thickness direction from the surface of the Fe-based electroplating layer. In the case of GAs, the thickness of the decarburized layer is defined as the thickness of a region in the surface layer of the cold-rolled steel sheet where the C concentration is determined to be 80% or less of that in the steel when analyzing the C concentration from the interface between the galvannealed layer and the cold-rolled steel sheet (i.e., from the surface of the cold-rolled steel sheet).

The average value of C concentration in the range of 10 μm to 20 μm in the thickness direction from the surface of Fe-based electroplating layer in the case of CRs and GIs, or from the interface between the galvannealed layer and the cold-rolled steel sheet in the case of GAs, and the thickness of the decarburized layer in the vicinity of the surface of the Fe-based electroplating layer in the case of CRs and GIs, or in the vicinity of the interface between the galvannealed layer and the cold-rolled steel sheet in the case of GAs, are measured by performing surface analysis or line analysis of the elemental distribution near the surface layer using an electron probe micro analyzer (EPMA) on a cross-sectioned sample. First, a resin-embedded steel sheet is polished and a vertical section in the rolling direction is finished for observation, and then the steel sheet is removed from the resin to be used as a sample for measurement. The accelerating voltage is 7 kV and the irradiation current is 50 nA. Surface analysis or line analysis is performed on a cross-section of the sample in 1 μm steps over a 300 μm×300 μm area including the outermost surface layer of the Fe-based electroplating layer in the case of CRs and GIs, or the outermost surface layer of the cold-rolled steel sheet in the case of GAs, to measure the C intensity. In order to suppress contamination, hydrocarbons on and around the sample surface are removed by a plasma cleaner in the measurement room and sample preparation room before the start of measurement. To suppress the accumulation of hydrocarbons during the measurement, the measurement is performed while the sample is heated to and held at a sample temperature of 100° C. on the stage. The C intensity is converted to a C concentration (in mass %) using a calibration curve prepared by performing measurements on a standard sample separately. The next step is to confirm that the lower limit of C detection is lower than 0.04 mass % due to the effect of contamination control. The details of the equipment used and the method of contamination control are described in Reference 1 below.

Reference 1: Yamashita et al., "Distribution of Carbon in Low-Carbon Steel in the Early Phase of Proeutectoid Ferrite by High Precision FE-EPMA," Iron and Steel, Vol. 103 (2017) No. 11, pp. 14

However, the above configuration is not necessarily required because the necessity of contamination countermeasures during measurement depends on the machine model used and conditions. In other words, the measurement conditions are only required to confirm that sufficient accuracy has been obtained, and the measurement conditions are not intrinsically related to the effect of the present disclosure.

In the C concentration map obtained, a line profile is extracted in the thickness direction from the surface of the Fe-based electroplating layer in the case of CRs and GIs, or from the interface between the galvannealed layer and the cold-rolled steel sheet in the case of GAs, and averaged for 300 points in the direction parallel to the surface of the cold-rolled steel sheet to obtain a profile of C concentration in the thickness direction. The position of the surface of the cold-rolled steel sheet can be determined from the secondary electron image or reflected electron image obtained simultaneously. The obtained profile of C concentration in the thickness direction is smoothed by a simple moving average method. In this case, the number of smoothing points is preferably about 21. If the number of smoothing points in the vicinity of the surface layer of the sample is less than 10 points on one surface, the surface is preferably smoothed for the available measurement points. Then, in the intensity profile after the smoothing, the range in the thickness direction in which the C concentration is determined to be 80% or less of that in the steel in the surface layer of the Fe-based electroplated steel sheet including the Fe-based electroplating layer and the cold-rolled steel sheet in the case of CRs and GIs, or in the surface layer of the cold-rolled steel sheet in the case of GAs, is identified. The identified range is used as the thickness of the decarburized layer. The C concentration in the range of 10 μm to 20 μm in the thickness direction from the surface of the Fe-based electroplating layer in the case of CRs and GIs, or from the interface between the galvannealed layer and the cold-rolled steel sheet in the case of GAs, is determined by averaging the C concentration values at a total of 11 points at a pitch of 1 μm. The above evaluation is applied to the measurement results of two fields of view for each sample, and the average of the results is used as the average value of C concentration in the range of 10 μm to 20 μm in the thickness direction and the evaluation value of the thickness of the decarburized layer.

Figure 11A:
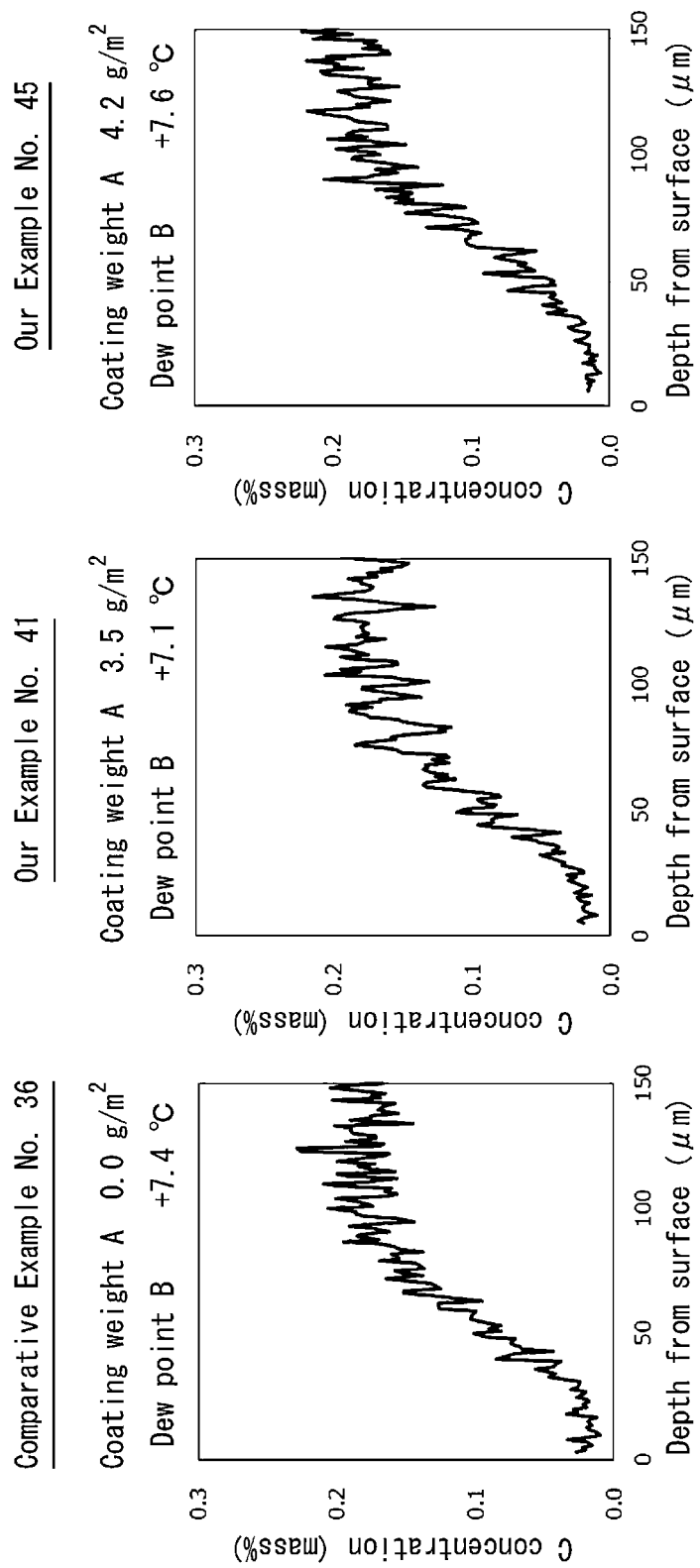
FIG. 11A illustrates the raw data of profiles of C concentration at depths in the thickness direction when analyzed by an electron beam microanalyzer for some of the galvannealed steel sheets (GAs) in Example 1.
Figure 11B:
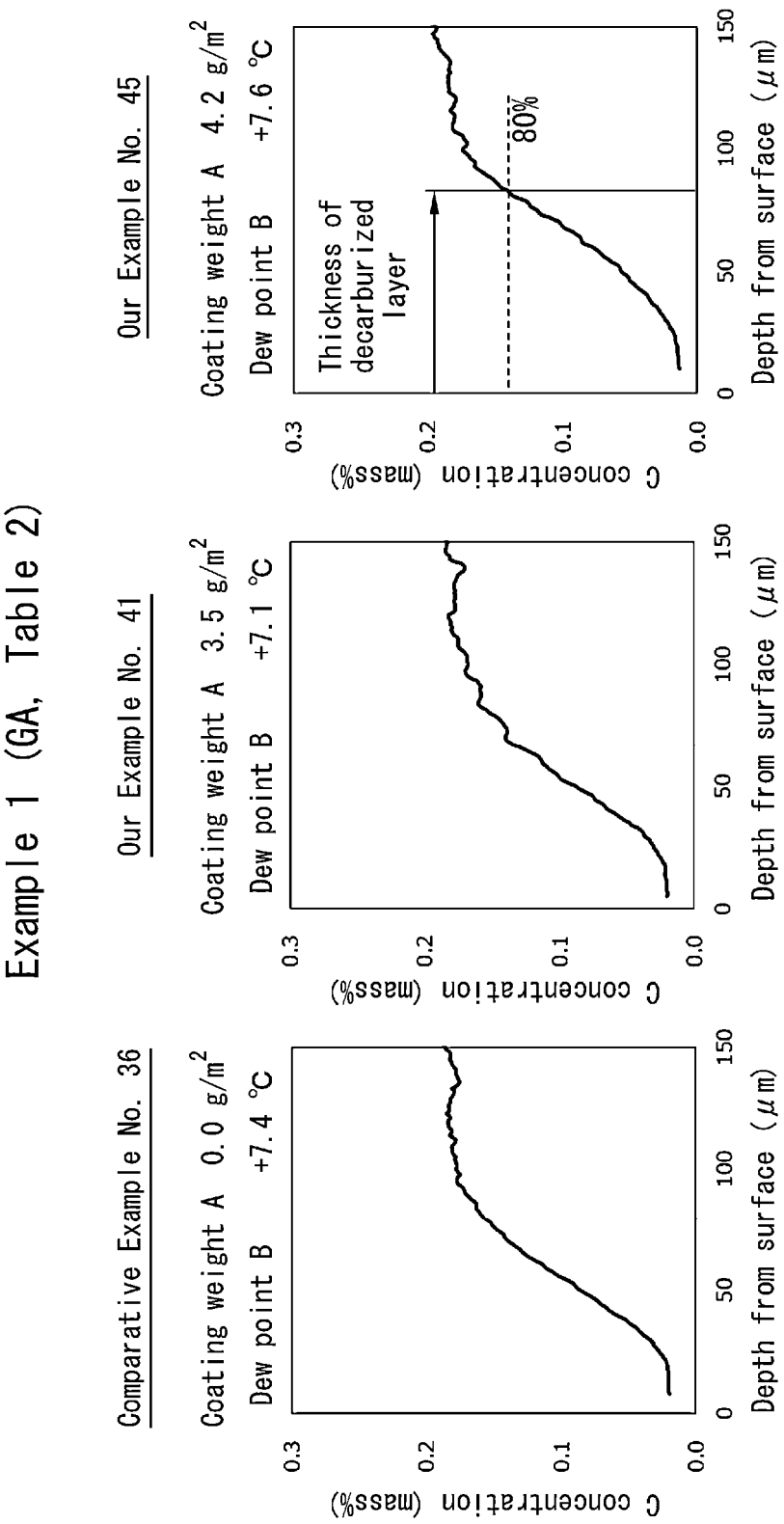
FIG. 11B illustrates the data after smoothing of the profiles in FIG. 11A.

FIGS. 10A and 10B and FIGS. 11A and 11B are used to illustrate typical examples of the profiles of C concentration in the thickness direction when analyzed by an electron beam microanalyzer. FIG. 10A illustrates the raw data of profiles of C concentration in the thickness direction obtained by analyzing the Fe-based electroplated steel sheets of No. 21, No. 23, and No. 27, as described in the Example 1 section below (Table 4). FIG. 11A illustrates the raw data of profiles of C concentration in the thickness direction obtained by analyzing the galvannealed steel sheets of No. 36, No. 41, and No. 45, as described in the Example 1 section below (Table 2). In the case of galvannealed steel sheets, the galvannealed layers were peeled off before the measurement. FIGS. 10B and 11B, respectively, illustrate the raw data from FIGS. 10A and 11A after smoothing using the simple moving average method with 21 smoothing points (m=21). As can be seen from FIGS. 10B and 11B, in No. 27 of Table 4 and No. 45 of Table 2, there were decarburized layers in which the C concentration was 80% or less of that in the steel, and the thickness of the decarburized layers was 77 μm and 81 μm, respectively.

[Crystal Grains in CR and GI]

For CRs and GIs in this embodiment, the number of crystal grain boundaries of the Fe-based electroplating layer that are in contact with the cold-rolled steel sheet at the interface between the Fe-based electroplating layer and the cold-rolled steel sheet is preferably 10 or more per 10 μm in the sheet transverse direction in an observation field of view of the cold-rolled steel sheet. In this case, the crystals in the Fe-based electroplating layer are sufficiently refined. The refinement of crystal grains is considered to cause many crystal grain boundaries to be formed in the Fe-based electroplating layer, resulting in dispersion of penetration of molten zinc, delaying the time for the molten zinc to reach the crystal grain boundaries of the cold-rolled steel sheet during welding, and improving the resistance to cracking in resistance welding, especially internal cracking, at a welded portion. The aforementioned number of crystal grain boundaries per 10 μm is more preferably 20 or more, and even more preferably 25 or more. On the other hand, if the number of crystal grain boundaries is too large, fatigue strength may decrease. Therefore, the number of crystal grain boundaries per 10 μm is preferably 40 or less.

Figure 6A:
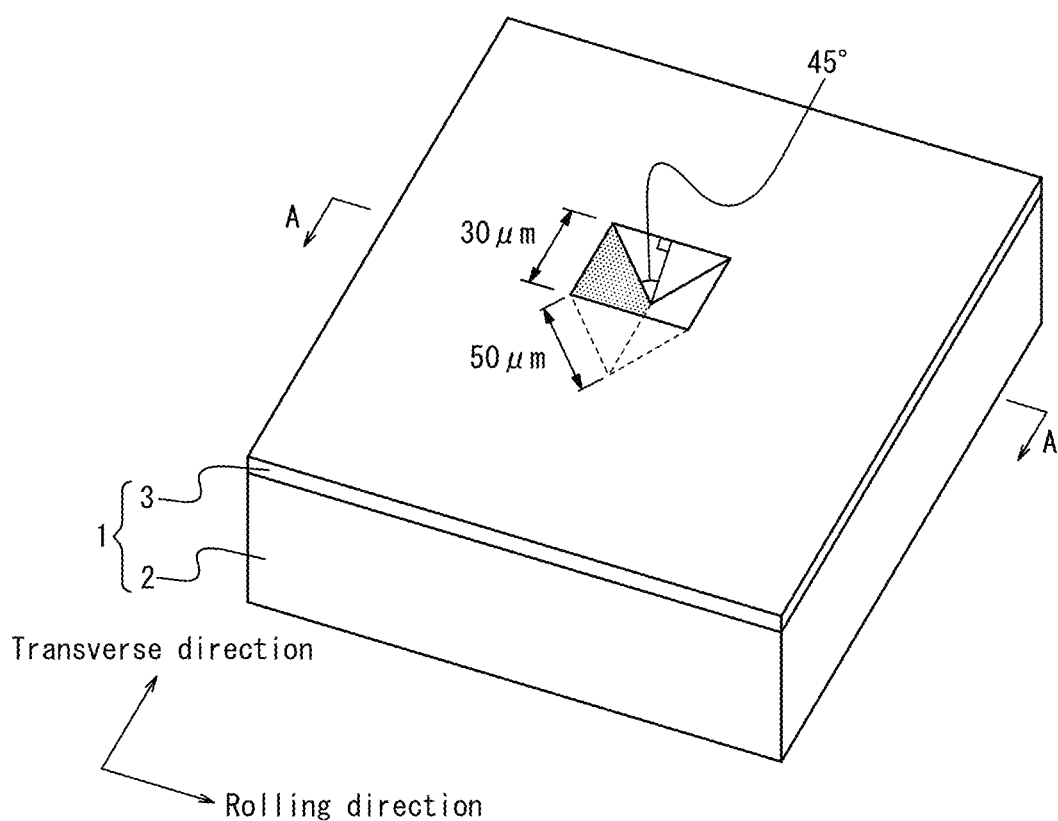
FIG. 6A is an oblique overview of a sample for observation to count the number of crystal grain boundaries of an Fe-based electroplating layer that are in contact with a cold-rolled steel sheet at the interface between the Fe-based electroplating layer and the cold-rolled steel sheet.
Figure 6B:
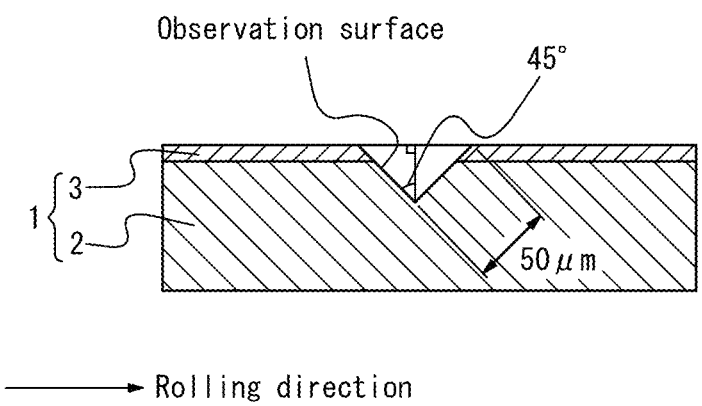
FIG. 6B is an A-A cross-sectional view of the sample for observation.
Figure 7:
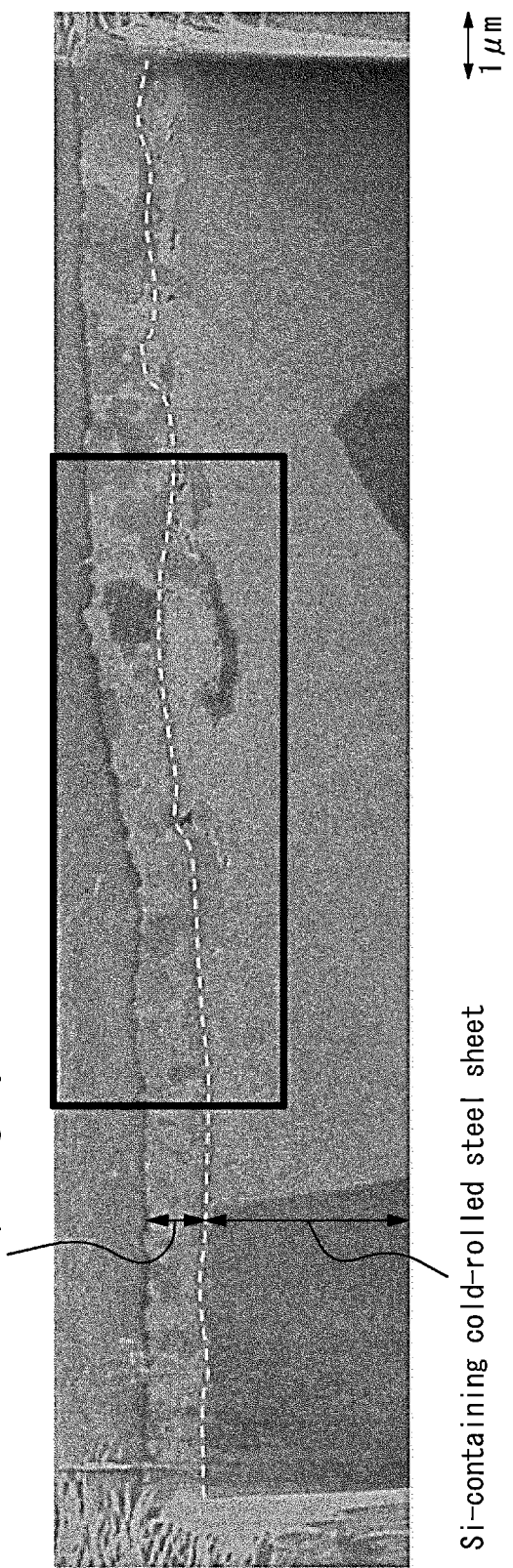
FIG. 7 illustrates a method of counting the number of crystal grain boundaries of the Fe-based electroplating layer that are in contact with the cold-rolled steel sheet at the interface between the Fe-based electroplating layer and the cold-rolled steel sheet.
Figure 8:
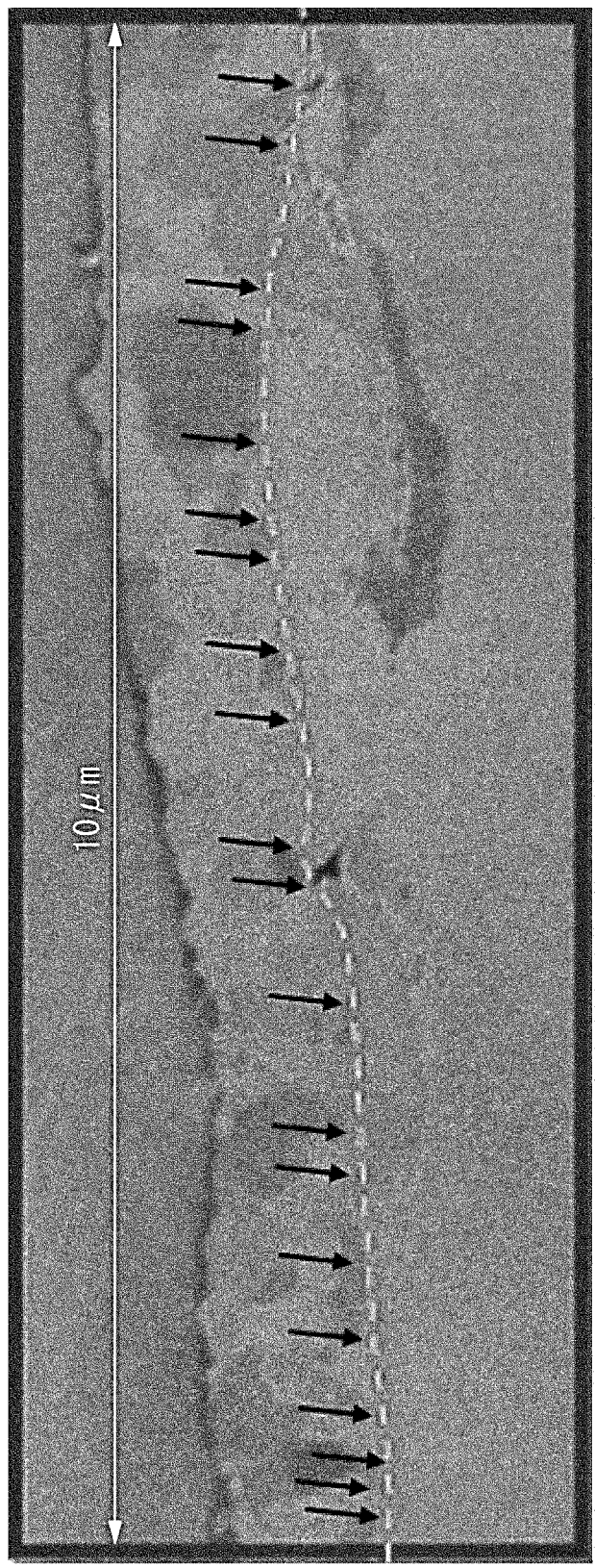
FIG. 8 is an enlarged view of the area enclosed by a square in FIG. 7.

In this case, the number of crystal grain boundaries of the Fe-based electroplating layer that are in contact with the cold-rolled steel sheet at the interface between the Fe-based electroplating layer and the cold-rolled steel sheet is measured as follows. First, a sample of 10 mm×10 mm in size is taken from a Fe-based electroplated steel sheet. Any part of the sample is processed with a focused ion beam (FIB) device to form, at the processed part, a 45° cross-section at an angle of 45° relative to the direction of a T-section (i.e., a cross-section parallel to a transverse direction of the steel sheet (direction orthogonal to the rolling direction) and perpendicular to the steel sheet surface) with a width of 30 μm in the transverse direction and a length of 50 μm in a direction 45° relative to the T-section direction. The sample with the 45° cross-section thus formed is used as a sample for observation. FIGS. 6A and 6B schematically illustrate the sample for observation. FIG. 6A is an oblique view of the sample for observation. FIG. 6B is an A-A cross-section of the sample for observation illustrated in FIG. 6A. Then, using a scanning ion microscope (SIM), the center of the 45° cross-section of the sample for observation in the width and longitudinal directions of the sample is observed at 4,000× magnification to capture a SIM image. An example of such SIM image is illustrated in FIG. 7. FIG. 7 is a SIM image taken as described above for No. 11 as described in the Example 3 section (Table 11). From the SIM image, a region of 10 μm in the sheet transverse direction of the cold-rolled steel sheet (enclosed by a square in FIG. 7) is extracted. For explanation, FIG. 8 illustrates an enlarged view of the area enclosed by the square in FIG. 7. As can be seen from FIG. 8, in the SIM image, a boundary line (dashed line in FIG. 8) is depicted at the interface between the Fe-based electroplating layer and the cold-rolled steel sheet in the region of 10 μm in the sheet transverse direction of the cold-rolled steel sheet. The number of crystal grain boundaries of the Fe-based electroplating layer on the boundary line is counted, and the result is used as "the number of crystal grain boundaries of the Fe-based electroplating layer that are in contact with the cold-rolled steel sheet at the interface between the Fe-based electroplating layer and the cold-rolled steel sheet". In our Example No. 11, the number of crystal grain boundaries of the Fe-based electroplating layer that were in contact with the cold-rolled steel sheet at the interface between the Fe-based electroplating layer and the cold-rolled steel sheet was 20 per 10 μm in the sheet transverse direction of the cold-rolled steel sheet.

(Chemical-Conversion-Treated Steel Sheet and Method of Producing Same)

The Fe-based electroplated steel sheet (in the case of CRs or GIs) or the galvannealed steel sheet (in the case of GAs) may be subjected to a chemical conversion treatment to obtain a chemical-conversion-treated steel sheet with a chemical conversion layer formed on the surface of the Fe-based electroplated steel sheet or the galvannealed steel sheet. At this point, as pretreatments for the chemical conversion treatment, degreasing treatment, water washing, and in necessary, surface conditioning treatment may be performed to clean the surface of the Fe-based electroplated steel sheet or the galvannealed steel sheet. These pretreatments are followed by the chemical conversion treatment. The methods of degreasing treatment and water washing are not limited, and conventional methods may be followed. In the surface conditioning treatment, surface conditioners containing Ti colloids or zinc phosphate colloids can be used. Regarding the application of these surface conditioners, no special process is required and conventional methods may be followed. For example, the desired surface conditioner is dissolved in a certain deionized water and stirred thoroughly to obtain a treatment solution at a predetermined temperature (usually room temperature, i.e., 25° C. to 30° C.). Then, the steel sheet is immersed in the obtained treatment solution for a predetermined time (e.g., 20 seconds to 30 seconds). The steel sheet is then subjected to the subsequent chemical conversion treatment without being dried. Regarding the chemical conversion treatment, conventional methods may be followed. For example, the desired chemical conversion treatment agent is dissolved in a certain deionized water and stirred thoroughly to obtain a treatment solution at a predetermined temperature (usually 35° C. to 45° C.). Then, the steel sheet is immersed in the obtained treatment solution for a predetermined time (e.g., 60 seconds to 120 seconds). As the chemical conversion treatment agent, for example, a zinc phosphate treatment agent for steel, a zinc phosphate treatment agent for combined use of steel and aluminum, or a zirconium treatment agent may be used.

(Electrodeposition-Coated Steel Sheet and Method of Producing Same)

Subsequently, the chemical-conversion-treated steel sheet may be subjected to electrodeposition coating to obtain an electrodeposition-coated steel sheet with an electrodeposition coating layer formed in contact with the chemical conversion layer. Regarding the electrodeposition coating, conventional methods may be followed. After pretreatment such as water washing, if necessary, the steel sheet is immersed in an electrodeposition coating material that has been thoroughly stirred to obtain an electrodeposition coating layer with the desired thickness through electrodeposition treatment. As the electrodeposition coating, anionic electrodeposition coating as well as cationic electrodeposition coating can be used. Furthermore, for example, top coating may be applied after the electrodeposition coating, depending on the application. The thickness of the electrodeposition coating layer varies depending on the application. However, it is preferably about 10 μm or more in the dry state. It is preferably about 30 μm or less in the dry state.

(Automotive Part and Method of Producing Same)

An automotive part may be produced using at least in part the electrodeposition-coated steel sheet. Since the Fe-based electroplated steel sheet and galvannealed steel sheet in this embodiment have excellent resistance to cracking in resistance welding at a welded portion, the electrodeposition-coated steel sheet using these Fe-based electroplated steel sheet and galvannealed steel sheet are particularly suitable for application to automotive parts. The types of the automotive part are not limited. However, the automotive part may be, for example, a side sill part, a pillar part, or an automotive body.

EXAMPLES

Example 1

Cast steel samples were prepared by smelting steel with the chemical compositions listed in Table 1 (with the balance being Fe and inevitable impurities), and subjected to hot rolling to obtain hot-rolled steel sheets. The hot-rolled steel sheets were then subjected to pickling and cold rolling to obtain cold-rolled steel sheets with a thickness of 1.6 mm.

TABLE 1

| Steel sample ID | C | Si | Mn | P | S | N | Al | B | Ti | Nb | Mo | Cu | Ni | |
|---|---|---|---|---|---|---|---|---|---|---|---|---|---|---|
| A | 0.18 | 0.41 | 1.55 | 0.02 | 0.002 | 0.004 | 0.039 | 0.001 | 0.01 | — | — | — | — | Conforming steel |
| B | 0.15 | 0.91 | 2.16 | 0.02 | 0.002 | 0.004 | 0.036 | — | — | — | — | — | — | Conforming steel |
| C | 0.18 | 1.02 | 3.08 | 0.02 | 0.002 | 0.006 | 0.038 | 0.001 | 0.01 | 0.018 | — | — | — | Conforming steel |
| D | 0.12 | 1.20 | 1.85 | 0.01 | 0.001 | 0.004 | 0.032 | 0.001 | 0.01 | — | — | — | — | Conforming steel |
| E | 0.24 | 1.41 | 1.33 | 0.01 | 0.001 | 0.003 | 0.034 | 0.001 | 0.01 | — | — | — | — | Conforming steel |
| F | 0.13 | 1.39 | 1.94 | 0.01 | 0.001 | 0.007 | 0.033 | 0.001 | 0.01 | — | — | — | — | Conforming steel |
| G | 0.08 | 1.49 | 1.52 | 0.01 | 0.001 | 0.003 | 0.035 | 0.001 | 0.01 | — | — | — | — | Conforming steel |
| H | 0.17 | 1.53 | 2.31 | 0.01 | 0.001 | 0.004 | 0.037 | — | — | — | 0.11 | — | — | Conforming steel |
| I | 0.19 | 1.51 | 2.72 | 0.01 | 0.001 | 0.004 | 0.034 | 0.001 | 0.01 | — | — | 0.12 | — | Conforming steel |
| J | 0.15 | 1.65 | 1.33 | 0.02 | 0.002 | 0.005 | 0.036 | 0.001 | 0.01 | — | — | — | 0.14 | Conforming steel |
| K | 0.17 | 1.68 | 2.51 | 0.03 | 0.002 | 0.004 | 0.036 | 0.001 | 0.01 | — | — | — | — | Conforming steel |

"—" indicates a content at inevitable impurity level.

Various GAs as listed in Table 2, various GIs in Table 3, and various CRs in Table 4 were produced using these cold-rolled steel sheets.

First, each cold-rolled steel sheet was subjected to degreasing treatment with alkali, followed by electrolytic treatment with the cold-rolled steel sheet as the cathode under the conditions descried below to produce an Fe-based electroplated steel sheet. The coating weight A of the Fe-based electroplating layers listed in Tables 2 to 4 were calculated by the aforementioned method and controlled by welding time.

[Electrolytic Conditions]
Bath temperature: 50° C.
pH: 2.0
Current density: 45 A/dm$^2$
Plating bath: a sulfuric acid bath containing 1.5 mol/L of Fe$^{2+}$ ions
Anode: iridium oxide electrode Subsequently, each Fe-based electroplated steel sheet was heated at the average heating rate in the temperature range of 400° C. to 650° C. as listed in Tables 2 to 4, and then subjected to annealing in which the steel sheet was heated with a soaking zone temperature of 800° C. in a reducing atmosphere with a dew point B as listed in Tables 2 to 4 and containing 15 vol. % hydrogen, with the balance being N$_2$ and inevitable impurities. The holding time of each steel sheet at the maximum arrival temperature (800° C.) was set at 100 seconds. In the examples listed in Table 4, Fe-based electroplated steel sheets (CRs) were obtained in this way.

In the examples listed in Tables 2 and 3, each of the Fe-based electroplated steel sheets thus obtained was cooled to 440° C. to 550° C., and then hot-dip galvanized using a hot-dip galvanizing bath at 460° C., where the effective Al concentration in the bath was 0.132 mass %, with the balance being Zn and inevitable impurities. Subsequently, the coating weight per surface of the hot-dip galvanized layer was adjusted by gas wiping. In the examples listed in Table 3, hot-dip galvanized steel sheets (GIs) were obtained in this way.

In the examples listed in Table 2, galvannealed steel sheets (GAs) were produced by further performing the process of heating and alloying the hot-dip galvanized layers through alloying treatment at 510° C. The Fe % in the galvannealed layers was controlled by varying the time of the alloying treatment.

Tables 2 and 3 list the coating weight and Fe % of the hot-dip galvanized layer or galvannealed layer in each steel sheet as determined by the aforementioned method.

Table 2 lists the values of $(I_{Si,Fe})/(I_{Si,bulk})$, the average value of C concentration, and the thickness of the decarburized layer obtained by the aforementioned method. Tables 3 and 4 list the thickness of the internal oxidation layer, the average value of C concentration, the thickness of the decarburized layer, and the number of crystal grain boundaries per 10 μm in the sheet transverse direction for each steel sheet, as determined by the aforementioned method.

In the examples of GAs and GIs, the appearance of the galvanized layer (Rating 1) and the resistance to cracking in resistance welding at a welded portion (Rating 3) were evaluated, and the results are listed in Tables 2 and 3. In the examples of CRs, the chemical convertibility and post-coating corrosion resistance (Rating 2) as well as the resistance to cracking in resistance welding at a welded portion (Rating 3) were evaluated, and the results are listed in Table 4.

[Rating 1: Evaluation of the Appearance of Galvanized Layer (Hot-Dip Galvanized Layer or Galvannealed Layer)] The presence or absence of parts with poor appearance (such as non-coated parts or parts with uneven appearance) was visually determined and evaluated based on the following criteria.

O: no parts with poor appearance.

Δ: some parts with poor appearance, but no exposure of the Fe-based electroplating layer or cold-rolled steel sheet was observed under SEM at 3,000× magnification.

x: some parts with poor appearance, and non-coated parts were included where exposure of the Fe-based electroplating layer or cold-rolled steel sheet was observed under SEM at 3,000× magnification.

The presence or absence of exposure of the Fe-based electroplating layer or cold-rolled steel sheet can be ascertained from the difference in contrast between Zn and Fe in the SEM. Further details can be ascertained by whether or not Fe is detected when analyzed by the energy dispersive X-ray spectroscopy (EDX).

[Rating 2: Evaluation of Chemical Convertibility and Post-Coating Corrosion Resistance]

(1) Chemical Conversion Treatment

A test specimen taken from each Fe-based electroplated steel sheet was subjected to degreasing treatment, surface conditioning treatment, and chemical conversion treatment to produce a chemical-conversion-treated specimen with a chemical conversion treatment layer formed on the front and back surfaces thereof. First, each test specimen taken from the corresponding Fe-based electroplated steel sheet was immersed in a degreaser and subjected to degreasing treatment under the following standard conditions.

[Degreasing Treatment]

Degreaser: FC-E2011 (manufactured by Nihon Parkerizing Co., Ltd.)

Processing temperature: 43° C.

Processing time: 120 seconds

Each degreased specimen was then sprayed with a surface conditioner and subjected to surface conditioning treatment under the following standard conditions.

[Surface Conditioning Treatment]

Surface conditioner: PREPALENE XG (PL-XG; manufactured by Nihon Parkerizing Co., Ltd.)

pH: 9.5

Processing temperature: room temperature

Processing time: 20 seconds

Each surface-conditioned specimen was then immersed in a chemical conversion treatment agent and subjected to chemical conversion treatment under the following standard conditions.

[Chemical Conversion Treatment]

Chemical conversion treatment agent: PALBOND PB-SX35

(manufactured by Nihon Parkerizing Co., Ltd.)

Temperature of the chemical conversion treatment liquid: 35° C.

Processing time: 90 seconds

Each chemical-conversion-treated specimen thus prepared was used to measure chemical convertibility as described below.

(2) Electrodeposition Coating Treatment

The surface of each chemical-conversion-treated specimen was subjected to electrodeposition coating to have a thickness of 15 μm using an electrodeposition paint, GT-100 manufactured by Kansai Paint Co., Ltd., to obtain an electrodeposition-coated specimen. Each electrodeposition-coated specimen was subjected to the salt dip test as described below.

<Chemical Convertibility>

The surface of each chemical-conversion-treated specimen (n=1) was observed under SEM at 1,000× magnification and evaluated based on the following criteria. The result of ⊚ or O indicates that the specimen was judged to have superior chemical convertibility.

⊚: grain size of crystals after chemical conversion treatment was 5 μm or less, and no unprecipitated parts were observed.

O: grain size of crystals after chemical conversion treatment was greater than 5 μm, but no unprecipitated parts were observed.

x: grain size of crystals after chemical conversion treatment was greater than 5 μm, and some unprecipitated parts were observed.

<Salt Dip Test>

After a 45 mm-long crosscut defect was made on the surface using a cutter, each electrodeposition-coated specimen (n=1) was dipped in a 5 mass % NaCl solution (at 60° C.) for 360 hours, and then subjected to water washing and drying. Then, a tape peeling test was performed by applying a cellophane tape to the crosscut defect on each specimen and then pulling it off, and the total of maximum peeling widths on both sides of the crosscut defect was measured for the electrodeposition coating. For each electrodeposition coating, the total of maximum peeling widths was evaluated based on the following criteria. The result of ⊚ or O indicates that the specimen was judged to have superior post-coating corrosion resistance.

⊚: the total of maximum peeling widths was 3.0 mm or less.

○: the total of maximum peeling widths was 5.0 mm or less.

the total of maximum peeling widths was more than 5.0 mm.

[Rating 3: Evaluation of Resistance to Cracking in Resistance Welding at Welded Portion]

Figure 4A:
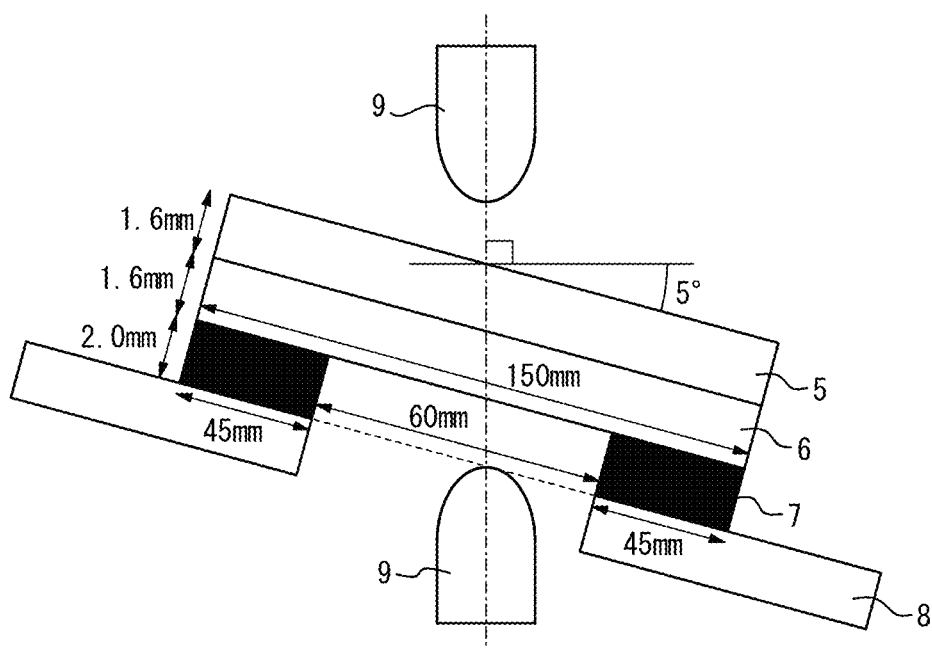
FIG. 4A illustrates evaluation of the resistance to cracking in resistance welding at a welded portion.

Referring to FIG. 4A, as a sheet combination, a test specimen 6 that was cut from each of the steel sheets (CRs, GIs, and GAs) in our examples and comparative examples to a size of 150 mm in the lengthwise direction×50 mm in the widthwise direction, with the transverse direction (TD) as the lengthwise direction and the rolling direction as the widthwise direction, was overlapped with a test galvannealed steel sheet 5 (thickness: 1.6 mm, TS: 980 MPa grade) that was cut to the same size having a galvanized layer with a coating weight per surface of 50 g/m². The sheet combination was assembled so that the surface to be evaluated (i.e., the Fe-based electroplating layer in the case of CRs, or the galvanized layer in the case of GIs and GAs) of the test specimen 6 and the galvanized layer of the test galvannealed steel sheet 5 faced each other. The sheet combination was fixed to a fixing stand 8 via spacers 7 of 2.0 mm thick. The spacers 7 were a pair of steel sheets, each measuring 50 mm long (lengthwise direction)×45 mm wide (widthwise direction)×2.0 mm thick (thickness direction). As illustrated in FIG. 4A, the lengthwise end faces of the pair of steel sheets were aligned with the widthwise end faces of the sheet combination. Thus, the distance between the pair of steel sheets was 60 mm. The fixing stand 8 was a single plate with a hole in the center.

Then, using a single-phase AC (50 Hz) resistance welding machine of servomotor pressure type, the sheet combination was subjected to resistance welding at a welding current that resulted in a nugget diameter r of 5.9 mm while being deflected by applying pressure with a pair of electrodes 9 (tip diameter: 6 mm) under the conditions of an electrode force of 3.5 kN, a holding time of 0.18 seconds or 0.24 seconds, and a welding time of 0.36 seconds, to form a sheet combination with a welded portion. The pair of electrodes 9 pressurized the sheet combination from above and below in the vertical direction, with the lower electrode pressurizing the test specimen 6 through the hole in the fixing stand 8. In applying pressure, the lower electrode of the pair of electrodes 9 and the fixing stand 8 were fixed, and the upper electrode was movable so that the lower electrode was in contact with a plane that was an extension of a plane where the spacer 7 touched the fixing stand 8. The upper electrode was in contact with the center of the test galvannealed steel sheet 5. The sheet combination was welded with an inclination of 5° lengthwise with respect to the horizontal direction. The holding time refers to the time between the end of passage of the welding current and the beginning of electrode release. As illustrated in the lower part of FIG. 4B, the nugget diameter r means the distance between the ends of a nugget 10 in the lengthwise direction of the sheet combination.

Figure 4B:
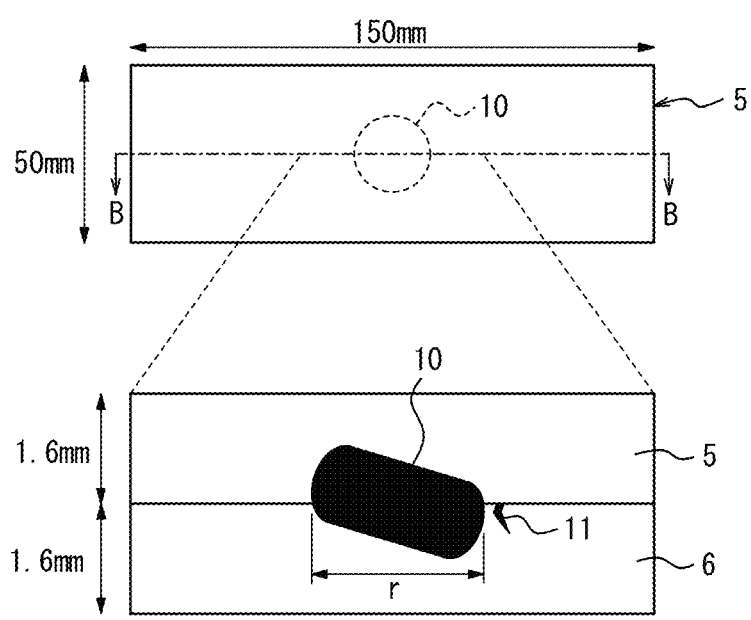
FIG. 4B illustrates a top view of a sheet combination after welding in the evaluation in the upper part, and an enlarged B-B section of the top view in the lower part.

Then, each sheet combination with a welded portion was cut along the B-B line shown in the upper part of FIG. 4B to include the center of the welded portion including a nugget 10, and the cross-section of the welded portion was observed under an optical microscopy (200×) to evaluate the resistance to cracking in resistance welding at the welded portion using the following criteria. The result of ⊚ or ○ indicates that the sheet combination was judged to have superior resistance to cracking in resistance welding at the welded portion. The result of x indicates that the sheet combination was judged to have inferior resistance to cracking in resistance welding at the welded portion.

⊚: no cracks as long as 0.1 mm or more were observed at a holding time of 0.18 seconds.

○: cracks as long as 0.1 mm or more were observed at a holding time of 0.18 seconds, but no cracks as long as 0.1 mm or more were observed at a holding time of 0.24 seconds.

x: cracks as long as 0.1 mm or more were observed at a holding time of 0.24 seconds.

A crack in the test specimen 6 is schematically illustrated in the lower part of FIG. 4B, as indicated by reference numeral 11. If a crack forms in the counterpart steel sheet (test galvannealed steel sheet), the stress in the steel sheet to be evaluated (any of the steel sheets in our examples and comparative examples) will be distributed, and the evaluation will not be appropriate. For this reason, the data in which no cracking occurred in the counterpart steel sheet was used.

TABLE 2

| No. | Steel sample ID | Coating weight (A) of Fe-based electroplating layer g/m² | Average heating rate °C./s | Annealing dew point (B) °C. | A + B | Interface between galvannealed layer/cold-rolled steel sheet $I_{Si, Fe}/I_{Si, bulk}$ | C concentration on steel sheet surface Thickness of decarburized layer μm |
|---|---|---|---|---|---|---|---|
| 1 | A | 0.0 | 2.0 | −15.4 | −15.4 | 0.96 | 42 |
| 2 | A | 2.8 | 2.0 | −22.0 | −19.2 | 0.94 | 35 |
| 3 | B | 0.0 | 2.0 | −12.3 | −12.3 | 0.97 | 54 |
| 4 | B | 2.2 | 2.0 | −2.2 | 0.0 | 0.91 | 72 |
| 5 | B | 3.3 | 2.0 | −7.8 | −4.5 | 0.92 | 63 |
| 6 | B | 4.9 | 2.0 | 6.1 | 11.0 | 0.78 | 84 |
| 7 | B | 4.8 | 2.0 | 0.7 | 5.5 | 0.80 | 79 |
| 8 | B | 0.0 | 2.0 | −4.4 | −4.4 | 1.02 | 65 |
| 9 | B | 2.5 | 2.0 | 0.5 | 3.0 | 0.92 | 76 |
| 10 | B | 2.8 | 2.0 | 3.1 | 5.9 | 0.81 | 79 |
| 11 | B | 3.5 | 2.0 | 12.2 | 15.7 | 0.78 | 90 |
| 12 | B | 0.0 | 2.0 | −3.6 | −3.6 | 1.01 | 64 |
| 13 | B | 1.6 | 2.0 | −2.3 | −0.7 | 0.93 | 72 |
| 14 | B | 4.5 | 2.0 | 1.8 | 6.3 | 0.77 | 77 |

TABLE 2-continued

| No. | | | | | | | |
|---|---|---|---|---|---|---|---|
| 15 | B | 4.7 | 2.0 | 8.1 | 12.8 | 0.78 | 89 |
| 16 | C | 0.0 | 2.0 | 1.7 | <u>1.7</u> | <u>0.96</u> | 60 |
| 17 | C | <u>2.1</u> | 2.0 | 5.6 | <u>7.7</u> | <u>0.81</u> | 68 |
| 18 | C | 4.8 | 2.0 | 7.4 | 12.2 | 0.75 | 83 |
| 19 | C | 4.1 | 2.0 | 3.5 | 7.6 | 0.79 | 67 |
| 20 | C | 4.2 | 2.0 | 8.1 | 12.3 | 0.77 | 84 |
| 21 | D | 0.0 | 2.0 | −21.8 | <u>−21.8</u> | <u>0.96</u> | 30 |
| 22 | D | <u>4.3</u> | 2.0 | −15.5 | <u>−11.2</u> | <u>0.91</u> | 54 |
| 23 | D | 4.8 | 2.0 | 5.7 | 10.5 | 0.78 | 96 |
| 24 | D | 3.9 | 2.0 | 1.8 | 5.7 | 0.82 | 78 |
| 25 | E | 2.8 | 2.0 | 11.1 | 13.9 | 0.77 | 82 |
| 26 | E | 2.1 | 2.0 | 11.6 | 13.7 | 0.79 | 87 |
| 27 | F | 0.0 | 2.0 | −3.3 | <u>−3.3</u> | <u>1.04</u> | 51 |
| 28 | F | <u>1.7</u> | 2.0 | 1.8 | <u>3.5</u> | <u>0.94</u> | 68 |
| 29 | F | 3.3 | 2.0 | 5.7 | <u>9.0</u> | <u>0.79</u> | 77 |
| 30 | F | 4.5 | 2.0 | 14.1 | 18.6 | 0.73 | 109 |
| 31 | G | 0.0 | 2.0 | −0.7 | <u>−0.7</u> | <u>1.00</u> | 57 |
| 32 | G | <u>0.5</u> | 2.0 | 3.1 | <u>3.6</u> | <u>0.96</u> | 69 |
| 33 | G | <u>3.3</u> | 2.0 | 2.7 | <u>6.0</u> | <u>0.83</u> | 72 |
| 34 | G | 4.5 | 2.0 | 8.3 | 12.8 | 0.76 | 98 |
| 35 | G | 2.1 | 2.0 | 19.1 | 21.2 | 0.80 | 116 |
| 36 | H | 0.0 | 2.0 | 7.4 | 7.4 | <u>0.99</u> | 72 |
| 37 | H | <u>0.7</u> | 2.0 | 6.4 | 7.1 | <u>0.98</u> | 72 |
| 38 | H | <u>1.7</u> | 2.0 | 3.6 | 5.3 | <u>0.88</u> | 73 |
| 39 | H | 2.2 | 2.0 | 8.7 | 10.9 | 0.79 | 83 |
| 40 | H | 3.2 | 2.0 | 2.8 | 6.0 | 0.76 | 68 |
| 41 | H | 3.5 | 2.0 | 7.1 | 10.6 | 0.80 | 82 |
| 42 | H | 4.7 | 2.0 | −14.6 | <u>−9.9</u> | <u>0.92</u> | 49 |
| 43 | H | 3.8 | 2.0 | 2.3 | <u>6.1</u> | <u>0.78</u> | 70 |
| 44 | H | 2.9 | 2.0 | 7.8 | 10.7 | 0.81 | 84 |
| 45 | H | 4.2 | 2.0 | 7.6 | 11.8 | 0.77 | 85 |
| 46 | H | 3.8 | 2.0 | 15.7 | 19.5 | 0.76 | 91 |
| 47 | I | 0.0 | 2.0 | 7.5 | 7.5 | <u>0.99</u> | 64 |
| 48 | I | <u>2.8</u> | 2.0 | −14.9 | <u>−12.1</u> | <u>0.94</u> | 43 |
| 49 | I | 2.3 | 2.0 | 13.9 | <u>16.2</u> | <u>0.77</u> | 88 |
| 50 | J | 0.0 | 2.0 | −14.7 | <u>−14.7</u> | <u>0.96</u> | 52 |
| 51 | J | <u>2.1</u> | 2.0 | 19.1 | <u>21.2</u> | <u>0.80</u> | 99 |
| 52 | J | 1.2 | 2.0 | 8.2 | 9.4 | 0.83 | 78 |
| 53 | J | 4.8 | 2.0 | 17.8 | 22.6 | 0.74 | 97 |
| 54 | K | 0.0 | 2.0 | −3.5 | <u>−3.5</u> | <u>1.06</u> | 59 |
| 55 | K | <u>3.9</u> | 2.0 | −2.3 | <u>1.6</u> | <u>0.92</u> | 68 |
| 56 | K | 4.7 | 2.0 | 12.6 | <u>17.3</u> | <u>0.79</u> | 83 |
| 57 | K | 3.9 | 2.0 | 4.1 | 8.0 | 0.77 | 73 |
| 58 | K | 4.6 | 2.0 | 7.0 | 11.6 | 0.76 | 81 |

| No. | C concentration on steel sheet surface Average value mass % | Galvannealed layer Coating weight g/m² | Fe % mass % | Appearance of galvannealed layer | Resistance to cracking in resistance welding | Remarks |
|---|---|---|---|---|---|---|
| 1 | <u>0.12</u> | 47.9 | 10.4 | X | ⊚ | Reference example |
| 2 | <u>0.13</u> | 52.0 | 11.3 | ○ | ⊚ | Reference example |
| 3 | <u>0.11</u> | 52.8 | 10.8 | X | X | Comparative example |
| 4 | <u>0.07</u> | 53.2 | 9.8 | ○ | X | Comparative example |
| 5 | 0.08 | 40.9 | 9.0 | ○ | X | Comparative example |
| 6 | 0.04 | 51.3 | 11.0 | ○ | ⊚ | Example |
| 7 | 0.05 | 60.8 | 11.5 | ○ | ○ | Example |
| 8 | 0.08 | 38.2 | 10.1 | Δ | X | Comparative example |
| 9 | 0.06 | 57.1 | 14.1 | ○ | X | Comparative example |
| 10 | 0.05 | 74.1 | 10.5 | ○ | ○ | Example |
| 11 | 0.03 | 50.4 | 11.5 | ○ | ⊚ | Example |
| 12 | 0.08 | 51.1 | 11.0 | Δ | X | Comparative example |
| 13 | 0.07 | 39.4 | 11.2 | ○ | X | Comparative example |
| 14 | 0.05 | 54.4 | 9.9 | ○ | ○ | Example |
| 15 | 0.04 | 51.0 | 10.4 | ○ | ⊚ | Example |
| 16 | 0.06 | 38.2 | 10.1 | Δ | X | Comparative example |
| 17 | 0.05 | 40.9 | 9.7 | ○ | ○ | Example |
| 18 | 0.04 | 53.2 | 12.3 | ○ | ⊚ | Example |
| 19 | 0.05 | 60.8 | 10.9 | ○ | ○ | Example |
| 20 | 0.04 | 50.6 | 11.5 | ○ | ⊚ | Example |
| 21 | 0.13 | 52.3 | 12.2 | X | X | Comparative example |
| 22 | <u>0.10</u> | 57.9 | 12.9 | ○ | X | Comparative example |
| 23 | 0.04 | 51.6 | 11.5 | ○ | ⊚ | Example |
| 24 | 0.05 | 46.2 | 9.8 | ○ | ○ | Example |
| 25 | 0.03 | 57.1 | 11.0 | ○ | ⊚ | Example |
| 26 | 0.03 | 27.3 | 8.1 | ○ | ⊚ | Example |

TABLE 2-continued

| | | | | | | |
|---|---|---|---|---|---|---|
| 27 | 0.08 | 50.0 | 14.1 | Δ | X | Comparative example |
| 28 | 0.06 | 51.9 | 9.0 | ○ | X | Comparative example |
| 29 | 0.05 | 74.0 | 13.1 | ○ | ○ | Example |
| 30 | 0.02 | 60.8 | 8.9 | ○ | ◎ | Example |
| 31 | 0.07 | 50.0 | 12.2 | Δ | X | Comparative example |
| 32 | 0.07 | 61.9 | 11.6 | Δ | X | Comparative example |
| 33 | 0.05 | 52.9 | 10.9 | ○ | ○ | Example |
| 34 | 0.04 | 60.0 | 11.1 | ○ | ◎ | Example |
| 35 | 0.02 | 51.3 | 10.8 | ○ | ◎ | Example |
| 36 | 0.05 | 63.4 | 10.5 | Δ | X | Comparative example |
| 37 | 0.05 | 72.8 | 7.0 | Δ | X | Comparative example |
| 38 | 0.05 | 37.8 | 9.5 | ○ | ○ | Example |
| 39 | 0.04 | 58.1 | 12.3 | ○ | ◎ | Example |
| 40 | 0.05 | 28.1 | 11.8 | ○ | ○ | Example |
| 41 | 0.04 | 68.0 | 7.5 | ○ | ◎ | Example |
| 42 | 0.11 | 71.5 | 9.6 | ○ | X | Comparative example |
| 43 | 0.05 | 57.2 | 13.5 | ○ | ○ | Example |
| 44 | 0.04 | 25.8 | 11.8 | ○ | ◎ | Example |
| 45 | 0.04 | 51.1 | 15.0 | ○ | ◎ | Example |
| 46 | 0.02 | 48.8 | 12.2 | ○ | ◎ | Example |
| 47 | 0.05 | 61.2 | 7.9 | Δ | X | Comparative example |
| 48 | 0.10 | 52.3 | 7.6 | ○ | X | Comparative example |
| 49 | 0.03 | 72.3 | 8.0 | ○ | ◎ | Example |
| 50 | 0.11 | 58.6 | 13.9 | Δ | X | Comparative example |
| 51 | 0.02 | 31.5 | 9.8 | ○ | ◎ | Example |
| 52 | 0.05 | 74.1 | 10.3 | ○ | ○ | Example |
| 53 | 0.02 | 57.0 | 12.0 | ○ | ◎ | Example |
| 54 | 0.08 | 58.7 | 11.3 | Δ | X | Comparative example |
| 55 | 0.06 | 36.1 | 13.1 | ○ | X | Comparative example |
| 56 | 0.03 | 72.3 | 10.5 | ○ | ◎ | Example |
| 57 | 0.05 | 57.0 | 11.6 | ○ | ○ | Example |
| 58 | 0.04 | 57.2 | 11.5 | ○ | ◎ | Example |

Underlined if outside the appropriate range of the present disclosure.

TABLE 3

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet | C concentration on steel sheet surface Thickness of decarburized layer μm |
|---|---|---|---|---|---|---|---|---|
| 1 | B | 0.0 | 2.0 | −3.4 | −3.4 | 2.03 | — | 68 |
| 2 | B | 1.4 | 2.0 | −0.6 | 0.8 | 2.01 | 4 | 71 |
| 3 | B | 4.6 | 2.0 | −0.8 | 3.8 | 0.58 | 4 | 76 |
| 4 | C | 0.0 | 2.0 | −3.0 | −3.0 | 2.36 | — | 55 |
| 5 | C | 1.9 | 2.0 | 1.7 | 3.6 | 1.76 | 5 | 64 |
| 6 | C | 4.5 | 2.0 | 6.8 | 11.3 | 0.61 | 9 | 82 |
| 7 | D | 4.8 | 2.0 | −15.4 | −10.6 | 0.55 | 2 | 28 |
| 8 | D | 4.8 | 2.0 | 3.7 | 8.5 | 0.58 | 5 | 89 |
| 9 | D | 3.4 | 2.0 | 1.1 | 4.5 | 0.53 | 4 | 75 |
| 10 | E | 2.4 | 2.0 | 10.7 | 13.1 | 1.88 | 7 | 80 |
| 11 | E | 4.5 | 2.0 | 12.1 | 16.6 | 1.91 | 9 | 85 |
| 12 | F | 0.0 | 2.0 | −3.1 | −3.1 | 2.28 | — | 79 |
| 13 | F | 1.9 | 2.0 | −4.3 | −2.4 | 2.06 | 3 | 79 |
| 14 | F | 2.5 | 2.0 | 3.6 | 6.1 | 0.54 | 6 | 74 |
| 15 | F | 4.2 | 2.0 | 7.6 | 11.8 | 0.68 | 7 | 97 |
| 16 | G | 0.0 | 2.0 | −1.3 | −1.3 | 2.39 | — | 55 |
| 17 | G | 0.4 | 2.0 | 3.2 | 3.6 | 2.22 | — | 69 |
| 18 | G | 3.8 | 2.0 | 3.4 | 7.2 | 0.86 | 5 | 74 |
| 19 | G | 4.9 | 2.0 | 8.2 | 13.1 | 0.80 | 6 | 108 |
| 20 | H | 0.6 | 2.0 | 5.1 | 5.7 | 2.46 | — | 68 |
| 21 | H | 1.2 | 2.0 | 5.8 | 7.0 | 1.24 | 5 | 72 |
| 22 | H | 2.0 | 2.0 | 7.1 | 9.1 | 0.97 | 8 | 80 |
| 23 | H | 4.8 | 2.0 | −14.9 | −10.1 | 0.51 | 3 | 27 |
| 24 | H | 3.2 | 2.0 | 0.8 | 4.0 | 0.66 | 4 | 68 |
| 25 | H | 3.5 | 2.0 | 7.8 | 11.3 | 0.76 | 7 | 84 |
| 26 | I | 0.0 | 2.0 | 7.8 | 7.8 | 2.70 | — | 65 |
| 27 | I | 2.4 | 2.0 | −15.3 | −12.9 | 0.87 | 2 | 31 |
| 28 | I | 2.9 | 2.0 | 13.7 | 16.6 | 1.88 | 9 | 87 |
| 29 | J | 0.0 | 2.0 | −14.7 | −14.7 | 0.74 | — | 29 |

TABLE 3-continued

| No. | Steel sample ID | | | | | | | |
|---|---|---|---|---|---|---|---|---|
| 30 | J | 1.3 | 2.0 | 19.1 | 20.4 | 1.97 | 8 | 96 |
| 31 | K | 0.0 | 2.0 | -2.9 | -2.9 | 2.57 | — | 58 |
| 32 | K | 3.4 | 2.0 | -2.4 | 1.0 | 2.13 | 4 | 64 |
| 33 | K | 4.6 | 2.0 | 13.4 | 18.0 | 1.64 | 9 | 86 |
| 34 | K | 3.4 | 2.0 | 3.7 | 7.1 | 0.53 | 6 | 69 |

| No. | C concentration on steel sheet surface Average value mass % | Hot-dip galvanized layer Coating weight g/m² | Fe % mass % | Appearance of hot-dip galvanized layer | Resistance to cracking in resistance welding | Remarks |
|---|---|---|---|---|---|---|
| 1 | 0.08 | 51.1 | 0.2 | Δ | X | Comparative example |
| 2 | 0.07 | 39.4 | 0.2 | ○ | X | Comparative example |
| 3 | 0.06 | 54.4 | 0.3 | ○ | ○ | Example |
| 4 | 0.08 | 38.2 | 0.4 | Δ | X | Comparative example |
| 5 | 0.05 | 40.9 | 0.3 | ○ | ○ | Example |
| 6 | 0.04 | 53.2 | 0.2 | ○ | ⊚ | Example |
| 7 | 0.11 | 57.9 | 0.3 | ○ | X | Comparative example |
| 8 | 0.04 | 51.6 | 0.2 | ○ | ⊚ | Example |
| 9 | 0.06 | 46.2 | 0.2 | ○ | ○ | Example |
| 10 | 0.04 | 57.1 | 0.3 | ○ | ⊚ | Example |
| 11 | 0.03 | 27.3 | 0.4 | ○ | ⊚ | Example |
| 12 | 0.08 | 50.0 | 0.3 | Δ | X | Comparative example |
| 13 | 0.07 | 51.9 | 0.2 | ○ | X | Comparative example |
| 14 | 0.05 | 74.0 | 0.1 | ○ | ○ | Example |
| 15 | 0.04 | 60.8 | 0.2 | ○ | ⊚ | Example |
| 16 | 0.04 | 50.0 | 0.3 | Δ | X | Comparative example |
| 17 | 0.06 | 61.9 | 0.4 | Δ | X | Comparative example |
| 18 | 0.05 | 52.9 | 0.2 | ○ | ○ | Example |
| 19 | 0.04 | 60.0 | 0.2 | ○ | ⊚ | Example |
| 20 | 0.05 | 72.8 | 0.3 | Δ | X | Comparative example |
| 21 | 0.05 | 37.8 | 0.4 | ○ | ○ | Example |
| 22 | 0.04 | 58.1 | 0.2 | ○ | ⊚ | Example |
| 23 | 0.12 | 71.5 | 0.3 | ○ | X | Comparative example |
| 24 | 0.06 | 57.2 | 0.4 | ○ | ○ | Example |
| 25 | 0.04 | 25.8 | 0.2 | ○ | ⊚ | Example |
| 26 | 0.05 | 61.2 | 0.3 | Δ | X | Comparative example |
| 27 | 0.12 | 52.3 | 0.2 | ○ | X | Comparative example |
| 28 | 0.03 | 72.3 | 0.5 | ○ | ⊚ | Example |
| 29 | 0.11 | 58.6 | 0.2 | X | X | Comparative example |
| 30 | 0.02 | 31.5 | 0.2 | ○ | ⊚ | Example |
| 31 | 0.08 | 58.7 | 0.3 | Δ | X | Comparative example |
| 32 | 0.07 | 36.1 | 0.2 | ○ | X | Comparative example |
| 33 | 0.03 | 72.3 | 0.4 | ○ | ⊚ | Example |
| 34 | 0.05 | 57.0 | 0.1 | ○ | ○ | Example |

Underlined if outside the appropriate range of the present disclosure.

TABLE 4

| No. | Steel sample ID | Coating weight (A) of Fe-based electroplating layer g/m² | Average heating rate °C./s | Annealing dew point (B) °C. | A + B | Depth of internal oxidation layer μm | Fe-based electroplating layer Number of grain boundaries in contact with cold-rolled steel sheet — |
|---|---|---|---|---|---|---|---|
| 1 | B | 0.0 | 2.0 | -1.3 | -1.3 | 2.18 | — |
| 2 | B | 1.2 | 2.0 | 0.8 | 2.0 | 2.15 | 3 |
| 3 | B | 2.7 | 2.0 | 2.4 | 5.1 | 0.46 | 4 |
| 4 | B | 4.8 | 2.0 | 3.6 | 8.4 | 0.51 | 7 |
| 5 | C | 0.0 | 2.0 | -3.9 | -3.9 | 2.22 | — |
| 6 | C | 2.9 | 2.0 | 1.0 | 3.9 | 0.60 | 3 |
| 7 | C | 3.1 | 2.0 | 7.2 | 10.3 | 0.58 | 7 |
| 8 | D | 3.9 | 2.0 | -15.1 | -11.2 | 0.60 | 4 |
| 9 | D | 4.4 | 2.0 | 6.1 | 10.5 | 0.82 | 9 |
| 10 | D | 1.6 | 2.0 | 4.7 | 6.3 | 0.67 | 6 |
| 11 | E | 2.9 | 2.0 | 7.7 | 10.6 | 0.74 | 8 |
| 12 | E | 1.8 | 2.0 | 11.1 | 12.9 | 1.78 | 8 |
| 13 | F | 0.0 | 2.0 | -4.6 | -4.6 | 2.17 | — |
| 14 | F | 4.3 | 2.0 | -3.3 | 1.0 | 2.03 | 5 |
| 15 | F | 1.3 | 2.0 | 2.8 | 4.1 | 0.55 | 5 |

TABLE 4-continued

| No. | | | | | | | | Thickness of decarburized layer μm | C concentration on steel sheet surface Average value mass % | Chemical convertibility | Post-coating corrosion resistance | Resistance to cracking in resistance welding | Remarks |
|---|---|---|---|---|---|---|---|---|---|---|---|---|---|
| 16 | F | 4.8 | 2.0 | 15.1 | 19.9 | 1.53 | 9 | | | | | | |
| 17 | G | 0.0 | 2.0 | −1.6 | −1.6 | 2.03 | — | | | | | | |
| 18 | G | 0.3 | 2.0 | 7.1 | 7.4 | 2.33 | — | | | | | | |
| 19 | G | 3.8 | 2.0 | 2.6 | 6.4 | 0.81 | 6 | | | | | | |
| 20 | G | 4.9 | 2.0 | 4.8 | 9.7 | 0.70 | 8 | | | | | | |
| 21 | H | 0.0 | 2.0 | 4.7 | 4.7 | 2.39 | — | | | | | | |
| 22 | H | 0.7 | 2.0 | 4.2 | 4.9 | 2.16 | 3 | | | | | | |
| 23 | H | 4.7 | 2.0 | −1.3 | 3.4 | 0.56 | 5 | | | | | | |
| 24 | H | 1.6 | 2.0 | 8.1 | 9.7 | 1.67 | 8 | | | | | | |
| 25 | H | 4.8 | 2.0 | −6.6 | −1.8 | 0.43 | 4 | | | | | | |
| 26 | H | 3.7 | 2.0 | 1.7 | 5.4 | 0.58 | 5 | | | | | | |
| 27 | H | 3.9 | 2.0 | 9.8 | 13.7 | 0.52 | 8 | | | | | | |
| 28 | I | 0.0 | 2.0 | 6.3 | 6.3 | 2.68 | — | | | | | | |
| 29 | I | 1.7 | 2.0 | −10.3 | −8.6 | 1.35 | 3 | | | | | | |
| 30 | I | 3.7 | 2.0 | 12.6 | 16.3 | 1.78 | 8 | | | | | | |
| 31 | J | 0.0 | 2.0 | −12.3 | −12.3 | 1.16 | — | | | | | | |
| 32 | J | 1.6 | 2.0 | 15.3 | 16.9 | 1.92 | 9 | | | | | | |
| 33 | K | 0.0 | 2.0 | −5.4 | −5.4 | 2.51 | — | | | | | | |
| 34 | K | 3.1 | 2.0 | −3.3 | −0.2 | 2.02 | 4 | | | | | | |
| 35 | K | 4.2 | 2.0 | 17.8 | 22.0 | 1.86 | 9 | | | | | | |
| 36 | K | 2.4 | 2.0 | 4.1 | 6.5 | 0.59 | 7 | | | | | | |
| 1 | | | | | | | | 70 | 0.07 | X | X | X | Comparative example |
| 2 | | | | | | | | 74 | 0.06 | ○ | ○ | X | Comparative example |
| 3 | | | | | | | | 78 | 0.05 | ○ | ○ | ○ | Example |
| 4 | | | | | | | | 81 | 0.04 | ⊚ | ⊚ | ⊚ | Example |
| 5 | | | | | | | | 56 | 0.08 | X | X | X | Comparative example |
| 6 | | | | | | | | 63 | 0.06 | ○ | ○ | ○ | Example |
| 7 | | | | | | | | 82 | 0.04 | ○ | ○ | ⊚ | Example |
| 8 | | | | | | | | 27 | 0.11 | ○ | ○ | X | Comparative example |
| 9 | | | | | | | | 98 | 0.04 | ⊚ | ⊚ | ⊚ | Example |
| 10 | | | | | | | | 79 | 0.05 | ○ | ○ | ○ | Example |
| 11 | | | | | | | | 82 | 0.04 | ○ | ○ | ⊚ | Example |
| 12 | | | | | | | | 84 | 0.04 | ○ | ○ | ⊚ | Example |
| 13 | | | | | | | | 70 | 0.08 | X | X | X | Comparative example |
| 14 | | | | | | | | 75 | 0.07 | ⊚ | ⊚ | X | Comparative example |
| 15 | | | | | | | | 79 | 0.06 | ○ | ○ | ○ | Example |
| 16 | | | | | | | | 107 | 0.02 | ⊚ | ⊚ | ⊚ | Example |
| 17 | | | | | | | | 54 | 0.07 | X | X | X | Comparative example |
| 18 | | | | | | | | 74 | 0.05 | X | X | X | Comparative example |
| 19 | | | | | | | | 72 | 0.05 | ○ | ○ | ○ | Example |
| 20 | | | | | | | | 107 | 0.04 | ⊚ | ⊚ | ⊚ | Example |
| 21 | | | | | | | | 69 | 0.05 | X | X | X | Comparative example |
| 22 | | | | | | | | 69 | 0.05 | X | X | X | Comparative example |
| 23 | | | | | | | | 71 | 0.06 | ⊚ | ○ | ○ | Example |
| 24 | | | | | | | | 81 | 0.04 | ○ | ○ | ⊚ | Example |
| 25 | | | | | | | | 59 | 0.11 | ⊚ | ○ | X | Comparative example |
| 26 | | | | | | | | 68 | 0.05 | ○ | ○ | ○ | Example |
| 27 | | | | | | | | 85 | 0.03 | ○ | ○ | ⊚ | Example |
| 28 | | | | | | | | 64 | 0.05 | X | X | X | Comparative example |
| 29 | | | | | | | | 26 | 0.11 | ○ | ○ | X | Comparative example |
| 30 | | | | | | | | 82 | 0.03 | ○ | ○ | ⊚ | Example |
| 31 | | | | | | | | 55 | 0.11 | X | X | X | Comparative example |
| 32 | | | | | | | | 92 | 0.03 | ○ | ○ | ⊚ | Example |
| 33 | | | | | | | | 58 | 0.08 | X | X | X | Comparative example |
| 34 | | | | | | | | 62 | 0.07 | ○ | ○ | X | Comparative example |
| 35 | | | | | | | | 84 | 0.02 | ⊚ | ⊚ | ⊚ | Example |
| 36 | | | | | | | | 70 | 0.05 | ○ | ○ | ○ | Example |

Underlined if outside the appropriate range of the present disclosure.

Figure 2:
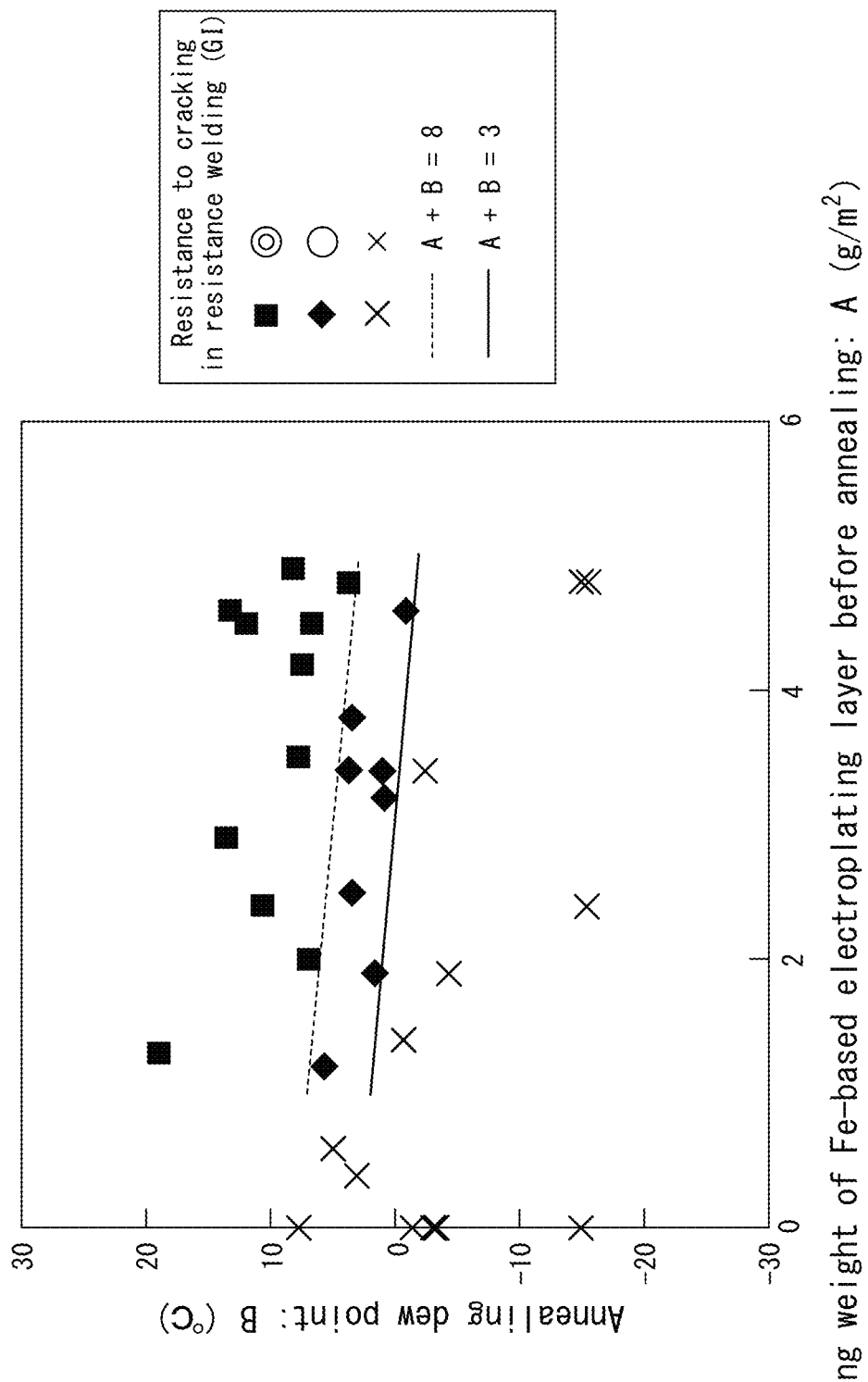
FIG. 2 is a graph illustrating the relationship between the coating weight A and annealing dew point B of the Fe-based electroplating layer and the evaluation results of the resistance to cracking in resistance welding for hot-dip galvanized steel sheets (GIs) in Example 1.
Figure 3:
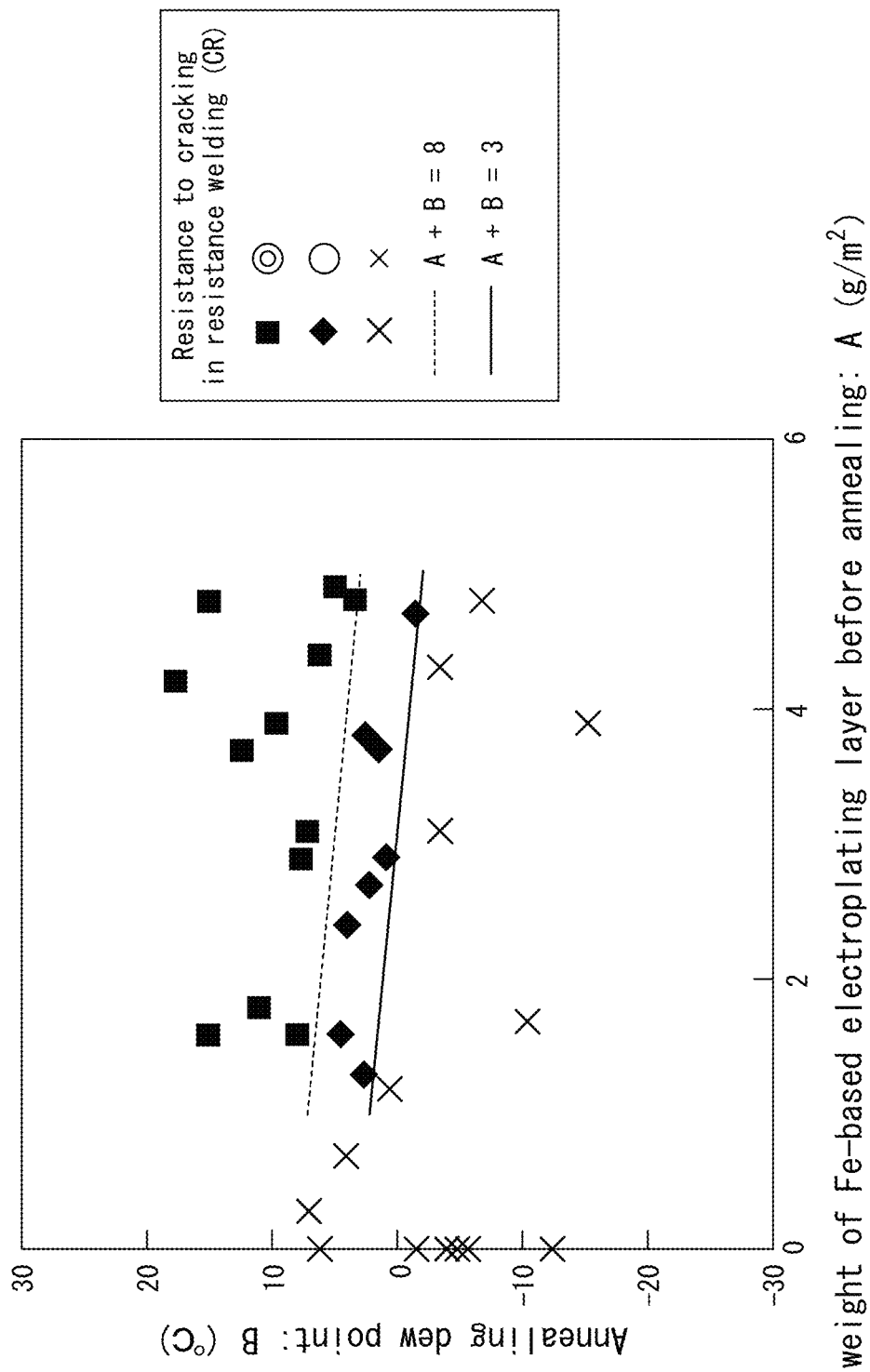
FIG. 3 is a graph illustrating the relationship between the coating weight A and annealing dew point B of the Fe-based electroplating layer and the evaluation results of the resistance to cracking in resistance welding for Fe-based electroplated steel sheets (CRs) without subjection to hot-dip galvanizing in Example 1.

FIG. 1 illustrates the relationship between the coating weight A and the annealing dew point B of the Fe-based electroplating layer and the evaluation results of the resistance to cracking in resistance welding for the GA cases listed in Table 2. FIG. 2 illustrates the relationship between the coating weight A and the annealing dew point B of the Fe-based electroplating layer and the evaluation results of the resistance to cracking in resistance welding for the GI cases listed in Table 3. FIG. 3 illustrates the relationship between the coating weight A and the annealing dew point B of the Fe-based electroplating layer and the evaluation results of the resistance to cracking in resistance welding for the CR cases listed in Table 4.

As can be seen from Tables 2 and 3 and FIGS. 1 and 2, our examples for the GA and GI cases exhibited good appearance of the galvanized layer and excellent resistance to cracking in resistance welding. As can be seen from Table 4 and FIG. 3, our examples for the CR cases exhibited good chemical convertibility and post-coating corrosion resistance, as well as excellent resistance to cracking in resistance welding.

It can be seen from the results in FIG. 1 (for GAs) that when compared at the same dew point, an increase in the coating weight A of the Fe-based electroplating layer before annealing improves the resistance to cracking in resistance welding. It can also be seen that the boundary line (solid line) that separates the improvement or non-improvement of the resistance to cracking in resistance welding shows linearity only in the region where the coating weight A of the Fe-based electroplating layer before annealing is 1.0 g/m² or more, and that the resistance to cracking in resistance welding is improved at lower dew points, especially in the region where the coating weight A of the Fe-based electroplating layer before annealing is 1.0 g/m² or more. In the case of GAs, since the Fe-based electroplating layer is entirely alloyed with the zinc coating and do not remain, it is presumed that the resistance to cracking in resistance welding is improved by the modification of the surface layer of the underlying cold-rolled steel sheet, especially by the promotion of decarburization caused by the combination of the Fe-based electroplating layer with a coating weight at or above a predetermined level and a high dew point.

On the other hand, in the case of GIs and CRs, since the Fe-based electroplating layer remains, it is presumed that the Fe-based electroplating layer further acts as a soft phase on the surface layer, and that the resistance to cracking in resistance welding is improved over the case of GAs when compared for the same dew point and same coating weight of the Fe-based electroplating layer before annealing.

Example 2

Cast steel samples were prepared by smelting steel with the chemical compositions listed in Table 5 (with the balance being Fe and inevitable impurities), and subjected to hot rolling to obtain hot-rolled steel sheets. The hot-rolled steel sheets were then subjected to pickling and cold rolling to obtain cold-rolled steel sheets with a thickness of 1.6 mm.

Various GAs as listed in Table 6, various GIs in Table 7, and various CRs in Table 8 were produced using these cold-rolled steel sheets.

First, each cold-rolled steel sheet was subjected to degreasing treatment with alkali, followed by electrolytic treatment with the cold-rolled steel sheet as the cathode under the conditions descried below to produce an Fe-based electroplated steel sheet. The coating weight A of the Fe-based electroplating layers listed in Tables 6 to 8 were calculated by the aforementioned method and controlled by welding time.

[Electrolytic Conditions]
Bath temperature: 50° C.
pH: 2.0
Current density: 45 A/dm²
Plating bath: a sulfuric acid bath containing 1.5 mol/L of $Fe^{2+}$ ions
Anode: iridium oxide electrode Subsequently, each Fe-based electroplated steel sheet was heated at the average heating rate in the temperature range of 400° C. to 650° C. as listed in Tables 6 to 8, and then subjected to annealing in which the steel sheet was heated with a soaking zone temperature of 800° C. in a reducing atmosphere with a dew point B as listed in Tables 6 to 8 and containing 15 vol. % hydrogen, with the balance being $N_2$ and inevitable impurities. The holding time of each steel sheet at the maximum arrival temperature (800° C.) was set at 100 seconds. In the examples listed in Table 8, Fe-based electroplated steel sheets (CRs) were obtained in this way.

In the examples listed in Tables 6 and 7, each of the Fe-based electroplated steel sheets thus obtained was cooled to 440° C. to 550° C., and then hot-dip galvanized using a hot-dip galvanizing bath at 460° C., where the effective Al concentration in the bath was 0.132 mass %, with the balance being Zn and inevitable impurities. Subsequently, the coating weight per surface of the hot-dip galvanized layer was adjusted by gas wiping. In the examples listed in Table 7, hot-dip galvanized steel sheets (GIs) were obtained in this way.

In the examples listed in Table 6, galvannealed steel sheets (GAs) were produced by further performing the process of heating and alloying the hot-dip galvanized layers through alloying treatment at 510° C. The Fe % in the galvannealed layers was controlled by varying the time of the alloying treatment.

Tables 6 and 7 list the coating weight and Fe % of the hot-dip galvanized layer or galvannealed layer in each steel sheet as determined by the aforementioned method.

Table 6 lists the values of $(I_{Si,Fe})/(I_{Si,bulk})$, the average value of C concentration, and the thickness of the decarburized layer obtained by the aforementioned method. Tables 7 and 8 list the thickness of the internal oxidation layer, the average value of C concentration, the thickness of the decarburized layer, and the number of crystal grain boundaries per 10 μm in the sheet transverse direction for each steel sheet, as determined by the aforementioned method.

In the examples of GAs and GIs, the appearance of the galvanized layer (Rating 1) and the resistance to cracking in resistance welding at a welded portion (Rating 3) were evaluated, and the results are listed in Tables 6 and 7. In the examples of CRs, the chemical convertibility and post-coating corrosion resistance (Rating 2) as well as the resistance to cracking in resistance welding at a welded portion (Rating 3) were evaluated, and the results are listed in Table 8. The evaluation methods and criteria for Ratings 1 to 3 are the same as in Example 1.

TABLE 5

| Steel sample ID | C | Si | Mn | P | S | N | Al | B | Ti | Cr | Nb | Mo | Cu | Ni | |
|---|---|---|---|---|---|---|---|---|---|---|---|---|---|---|---|
| L | 0.11 | 0.52 | 2.56 | 0.01 | 0.001 | 0.003 | 0.033 | 0.001 | 0.01 | 0.59 | — | — | — | — | Conforming steel |
| M | 0.09 | 0.61 | 2.69 | 0.03 | 0.002 | 0.005 | 0.037 | 0.001 | 0.01 | — | — | — | — | — | Conforming steel |

"—" indicates a content at inevitable impurity level.

TABLE 6

| No. | Steel sample ID | Coating weight (A) of Fe-based electroplating layer g/m² | Average heating rate °C./s | Annealing dew point (B) °C. | A + B | Interface between galvannealed layer/ cold-rolled steel sheet $I_{Si, Fe}/I_{Si, bulk}$ — | C concentration on steel sheet surface Thickness of decarburized layer μm |
|---|---|---|---|---|---|---|---|
| 1 | L | 4.4 | 2.0 | 0.8 | 5.2 | 0.88 | 70 |
| 2 | L | 3.6 | 2.0 | 3.7 | 7.3 | 0.85 | 75 |
| 3 | L | 4.7 | 2.0 | 5.4 | 10.1 | 0.77 | 88 |
| 4 | M | 1.8 | 2.0 | 3.4 | 5.2 | 0.88 | 72 |
| 5 | M | 3.3 | 2.0 | 3.3 | 6.6 | 0.78 | 78 |
| 6 | M | 4.7 | 2.0 | 5.5 | 10.2 | 0.76 | 90 |

| No. | C concentration on steel sheet surface Average value mass % | Galvannealed layer Coating weight g/m² | Galvannealed layer Fe % mass % | Appearance of galvannealed layer | Resistance to cracking in resistance welding | Remarks |
|---|---|---|---|---|---|---|
| 1 | 0.06 | 52.0 | 10.5 | ○ | ○ | Example |
| 2 | 0.05 | 51.7 | 10.1 | ○ | ○ | Example |
| 3 | 0.04 | 52.8 | 10.4 | ○ | ⊚ | Example |
| 4 | 0.05 | 48.5 | 11.6 | ○ | ○ | Example |
| 5 | 0.05 | 48.7 | 11.4 | ○ | ○ | Example |
| 6 | 0.03 | 48.2 | 11.5 | ○ | ⊚ | Example |

TABLE 7

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet — |
|---|---|---|---|---|---|---|---|
| 1 | L | 4.2 | 2.0 | −0.5 | 3.7 | 0.68 | 4 |
| 2 | L | 3.4 | 2.0 | 4.0 | 7.4 | 0.71 | 5 |
| 3 | L | 4.8 | 2.0 | 4.9 | 9.7 | 0.51 | 9 |
| 4 | M | 1.6 | 2.0 | 3.5 | 5.1 | 1.31 | 5 |
| 5 | M | 3.4 | 2.0 | 3.1 | 6.5 | 0.99 | 5 |
| 6 | M | 4.6 | 2.0 | 4.5 | 9.1 | 0.46 | 8 |

| No. | Thickness of decarburized layer μm | C concentration on steel sheet surface Average value mass % | Hot-dip galvanized layer Coating weight g/m² | Hot-dip galvanized layer Fe % mass % | Appearance of hot-dip galvanized layer | Resistance to cracking in resistance welding | Remarks |
|---|---|---|---|---|---|---|---|
| 1 | 67 | 0.06 | 52.1 | 0.2 | ○ | ○ | Example |
| 2 | 79 | 0.05 | 51.9 | 0.2 | ○ | ○ | Example |
| 3 | 87 | 0.04 | 52.6 | 0.3 | ○ | ⊚ | Example |
| 4 | 70 | 0.05 | 48.6 | 0.2 | ○ | ○ | Example |
| 5 | 77 | 0.05 | 48.1 | 0.2 | ○ | ○ | Example |
| 6 | 84 | 0.04 | 48.5 | 0.2 | ○ | ⊚ | Example |

TABLE 8

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet |
|---|---|---|---|---|---|---|---|
| 1 | L | 4.1 | 2.0 | −0.3 | 3.8 | 0.67 | 5 |
| 2 | L | 3.3 | 2.0 | 4.2 | 7.5 | 0.75 | 3 |
| 3 | L | 4.9 | 2.0 | 4.2 | 9.1 | 0.51 | 7 |
| 4 | M | 1.5 | 2.0 | 3.6 | 5.1 | 1.78 | 4 |
| 5 | M | 3.6 | 2.0 | 3.5 | 7.1 | 0.97 | 6 |
| 6 | M | 4.4 | 2.0 | 4.7 | 9.1 | 0.43 | 8 |

| No. | C concentration on steel sheet surface Average value mass % | Thickness of decarburized layer μm | Chemical convertibility | Post-coating corrosion resistance | Resistance to cracking in resistance welding | Remarks |
|---|---|---|---|---|---|---|
| 1 | 64 | 0.06 | ○ | ○ | ○ | Example |
| 2 | 77 | 0.05 | ○ | ○ | ○ | Example |
| 3 | 83 | 0.04 | ◎ | ◎ | ◎ | Example |
| 4 | 72 | 0.06 | ○ | ○ | ○ | Example |
| 5 | 78 | 0.05 | ○ | ○ | ○ | Example |
| 6 | 85 | 0.04 | ◎ | ◎ | ◎ | Example |

As can be seen from Tables 6 and 7, our examples for the GA and GI cases exhibited good appearance of the galvanized layer and excellent resistance to cracking in resistance welding. As can be seen from Table 8, our examples for the CR cases exhibited good chemical convertibility and post-coating corrosion resistance, as well as excellent resistance to cracking in resistance welding.

Example 3

Cast steel samples were prepared by smelting steel with the chemical compositions listed in Table 1 (with the balance being Fe and inevitable impurities), and subjected to hot rolling to obtain hot-rolled steel sheets. The hot-rolled steel sheets were then subjected to pickling and cold rolling to obtain cold-rolled steel sheets with a thickness of 1.6 mm.

Various GAs as listed in Table 9, various GIs in Table 10, and various CRs in Table 11 were produced using these cold-rolled steel sheets.

First, each cold-rolled steel sheet was subjected to degreasing treatment with alkali, followed by electrolytic treatment with the cold-rolled steel sheet as the cathode under the conditions descried below to produce an Fe-based electroplated steel sheet. The coating weight A of the Fe-based electroplating layers listed in Tables 9 to 11 were calculated by the aforementioned method and controlled by welding time.

[Electrolytic Conditions]
Bath temperature: 50° C.
pH: 2.0
Current density: 45 A/dm²
Plating bath: a sulfuric acid bath containing 1.5 mol/L of $Fe^{2+}$ ions
Anode: iridium oxide electrode Subsequently, each Fe-based electroplated steel sheet was heated at the average heating rate in the temperature range of 400° C. to 650° C. as listed in Tables 9 to 11, and then subjected to annealing in which the steel sheet was heated with a soaking zone temperature of 800° C. in a reducing atmosphere with a dew point B as listed in Tables 9 to 11 and containing 15 vol. % hydrogen, with the balance being $N_2$ and inevitable impurities. The holding time of each steel sheet at the maximum arrival temperature (800° C.) was set at 100 seconds. In the examples listed in Table 11, Fe-based electroplated steel sheets (CRs) were obtained in this way.

In the examples listed in Tables 9 and 10, each of the Fe-based electroplated steel sheets thus obtained was cooled to 440° C. to 550° C., and then hot-dip galvanized using a hot-dip galvanizing bath at 460° C., where the effective Al concentration in the bath was 0.132 mass %, with the balance being Zn and inevitable impurities. Subsequently, the coating weight per surface of the hot-dip galvanized layer was adjusted by gas wiping. In the examples listed in Table 10, hot-dip galvanized steel sheets (GIs) were obtained in this way.

In the examples listed in Table 9, galvannealed steel sheets (GAs) were produced by further performing the process of heating and alloying the hot-dip galvanized layers through alloying treatment at 510° C. The Fe % in the galvannealed layers was controlled by varying the time of the alloying treatment.

Tables 9 and 10 list the coating weight and Fe % of the hot-dip galvanized layer or galvannealed layer in each steel sheet as determined by the aforementioned method.

Table 9 lists the values of $(I_{Si,Fe})/(I_{Si,bulk})$, the average value of C concentration, and the thickness of the decarburized layer obtained by the aforementioned method. Tables 10 and 11 list the thickness of the internal oxidation layer, the average value of C concentration, the thickness of the decarburized layer, and the number of crystal grain boundaries per 10 μm in the sheet transverse direction for each steel sheet, as determined by the aforementioned method.

In the examples of GAs and GIs, the appearance of the galvanized layer (Rating 1) and the resistance to cracking in resistance welding at a welded portion (Rating 3) were evaluated, and the results are listed in Tables 9 and 10. In the examples of CRs, the chemical convertibility and post-coating corrosion resistance (Rating 2) as well as the resistance to cracking in resistance welding at a welded portion (Rating 3) were evaluated, and the results are listed in Table 11. The evaluation methods and criteria for Ratings 1 to 3 are the same as in Example 1.

TABLE 9

| No. | Steel sample ID | Coating weight (A) of Fe-based electroplating layer g/m² | Average heating rate °C./s | Annealing dew point (B) °C. | A + B | Interface between galvannealed layer/ cold-rolled steel sheet $I_{Si, Fe}/I_{Si, bulk}$ |
|---|---|---|---|---|---|---|
| 1 | B | 4.6 | 2.0 | 0.8 | 5.4 | 0.83 |
| 2 | B | 4.5 | 7.5 | 0.9 | 5.4 | 0.82 |
| 3 | B | 4.7 | 10.0 | 1.0 | 5.7 | 0.85 |
| 4 | D | 3.5 | 2.0 | 1.9 | 5.4 | 0.84 |
| 5 | D | 3.3 | 5.0 | 2.0 | 5.3 | 0.85 |
| 6 | D | 3.6 | 20.0 | 2.1 | 5.7 | 0.83 |
| 7 | H | 3.2 | 2.0 | 2.9 | 6.1 | 0.78 |
| 8 | H | 3.0 | 5.0 | 3.0 | 6.0 | 0.81 |
| 9 | H | 2.9 | 10.0 | 2.8 | 5.7 | 0.80 |
| 10 | H | 3.0 | 7.5 | 3.5 | 6.5 | 0.86 |
| 11 | H | 4.6 | 15.0 | 3.3 | 7.9 | 0.51 |
| 12 | H | 3.5 | 12.5 | 3.2 | 6.7 | 0.82 |

| No. | Thickness of decarburized layer μm | C concentration on steel sheet surface Average value mass % | Galvannealed layer Coating weight g/m² | Galvannealed layer Fe % mass % | Appearance of galvannealed layer | Resistance to cracking in resistance welding | Remarks |
|---|---|---|---|---|---|---|---|
| 1 | 72 | 0.05 | 57.3 | 11.5 | ○ | ○ | Example |
| 2 | 74 | 0.05 | 59.1 | 12.2 | ○ | ○ | Example |
| 3 | 73 | 0.05 | 58.6 | 11.8 | ○ | ◉ | Example |
| 4 | 76 | 0.05 | 50.0 | 10.1 | ○ | ○ | Example |
| 5 | 75 | 0.05 | 49.7 | 10.0 | ○ | ○ | Example |
| 6 | 78 | 0.05 | 50.6 | 10.3 | ○ | ◉ | Example |
| 7 | 69 | 0.05 | 42.4 | 11.1 | ○ | ○ | Example |
| 8 | 68 | 0.05 | 43.5 | 11.4 | ○ | ○ | Example |
| 9 | 65 | 0.05 | 43.1 | 11.3 | ○ | ◉ | Example |
| 10 | 74 | 0.05 | 53.6 | 10.1 | ○ | ○ | Example |
| 11 | 77 | 0.05 | 61.1 | 9.7 | ○ | ◉ | Example |
| 12 | 73 | 0.05 | 50.5 | 11.6 | ○ | ◉ | Example |

TABLE 10

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet |
|---|---|---|---|---|---|---|---|
| 1 | B | 4.5 | 2.0 | −0.7 | 3.8 | 0.61 | 3 |
| 2 | B | 4.4 | 7.5 | −0.6 | 3.8 | 0.64 | 7 |
| 3 | B | 4.4 | 10.0 | −0.8 | 3.6 | 0.67 | 10 |
| 4 | D | 3.3 | 2.0 | 0.9 | 4.2 | 0.62 | 3 |
| 5 | D | 3.4 | 5.0 | 1.0 | 4.4 | 0.56 | 6 |
| 6 | D | 3.5 | 20.0 | 0.8 | 4.3 | 0.60 | 22 |
| 7 | H | 3.0 | 2.0 | 1.1 | 4.1 | 0.67 | 4 |
| 8 | H | 3.1 | 5.0 | 1.2 | 4.3 | 0.61 | 6 |
| 9 | H | 2.8 | 10.0 | 1.5 | 4.3 | 0.76 | 12 |
| 10 | H | 3.0 | 7.5 | 0.9 | 3.9 | 0.70 | 8 |
| 11 | H | 4.4 | 15.0 | 1.3 | 5.7 | 0.55 | 21 |
| 12 | H | 3.5 | 12.5 | 1.0 | 4.5 | 0.58 | 14 |

| No. | Thickness of decarburized layer μm | C concentration on steel sheet surface Average value mass % | Hot-dip galvanized layer Coating weight g/m² | Hot-dip galvanized layer Fe % mass % | Appearance of hot-dip galvanized layer | Resistance to cracking in resistance welding | Remarks |
|---|---|---|---|---|---|---|---|
| 1 | 69 | 0.06 | 58.1 | 0.3 | ○ | ○ | Example |
| 2 | 72 | 0.06 | 57.4 | 0.2 | ○ | ○ | Example |
| 3 | 70 | 0.06 | 56.8 | 0.2 | ○ | ◉ | Example |

TABLE 10-continued

| | 4 | 72 | 0.06 | 50.3 | 0.2 | ○ | ○ | Example |
|---|---|---|---|---|---|---|---|---|
| | 5 | 72 | 0.06 | 50.1 | 0.3 | ○ | ○ | Example |
| | 6 | 73 | 0.06 | 50.4 | 0.2 | ○ | ⊚ | Example |
| | 7 | 67 | 0.06 | 43.5 | 0.4 | ○ | ○ | Example |
| | 8 | 69 | 0.06 | 42.9 | 0.2 | ○ | ○ | Example |
| | 9 | 74 | 0.05 | 44.6 | 0.2 | ○ | ⊚ | Example |
| | 10 | 64 | 0.06 | 53.6 | 0.2 | ○ | ○ | Example |
| | 11 | 70 | 0.05 | 61.1 | 0.3 | ○ | ⊚ | Example |
| | 12 | 65 | 0.05 | 50.5 | 0.4 | ○ | ⊚ | Example |

TABLE 11

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet — |
|---|---|---|---|---|---|---|---|
| 1 | B | 4.2 | 2.0 | −0.5 | 3.7 | 0.60 | 2 |
| 2 | B | 4.3 | 7.5 | −0.6 | 3.7 | 0.64 | 6 |
| 3 | B | 4.1 | 10.0 | −0.3 | 3.8 | 0.71 | 11 |
| 4 | D | 3.5 | 2.0 | 0.7 | 4.2 | 0.67 | 4 |
| 5 | D | 3.2 | 5.0 | 1.2 | 4.4 | 0.59 | 7 |
| 6 | D | 3.4 | 20.0 | 1.1 | 4.5 | 0.61 | 20 |
| 7 | H | 3.1 | 2.0 | 0.9 | 4.0 | 0.74 | 3 |
| 8 | H | 3.0 | 5.0 | 1.1 | 4.1 | 0.68 | 5 |
| 9 | H | 3.2 | 10.0 | 1.3 | 4.5 | 0.61 | 11 |
| 10 | H | 3.1 | 7.5 | 1.0 | 4.1 | 0.70 | 7 |
| 11 | H | 4.7 | 15.0 | 1.8 | 6.5 | 0.54 | 20 |
| 12 | H | 3.3 | 12.5 | 0.9 | 4.2 | 0.65 | 13 |

| No. | Thickness of decarburized layer μm | C concentration on steel sheet surface Average value mass % | Chemical convertibility | Post-coating corrosion resistance | Resistance to cracking in resistance welding | Remarks |
|---|---|---|---|---|---|---|
| 1 | 70 | 0.06 | ⊚ | ⊚ | ○ | Example |
| 2 | 69 | 0.06 | ⊚ | ⊚ | ○ | Example |
| 3 | 71 | 0.06 | ⊚ | ⊚ | ⊚ | Example |
| 4 | 73 | 0.06 | ○ | ○ | ○ | Example |
| 5 | 74 | 0.06 | ○ | ○ | ○ | Example |
| 6 | 74 | 0.06 | ○ | ○ | ⊚ | Example |
| 7 | 64 | 0.06 | ○ | ○ | ○ | Example |
| 8 | 66 | 0.06 | ○ | ○ | ○ | Example |
| 9 | 71 | 0.05 | ○ | ○ | ⊚ | Example |
| 10 | 67 | 0.06 | ○ | ○ | ○ | Example |
| 11 | 69 | 0.05 | ⊚ | ⊚ | ⊚ | Example |
| 12 | 68 | 0.06 | ○ | ○ | ⊚ | Example |

As can be seen from Tables 9 and 10, our examples for the GA and GI cases exhibited good appearance of the galvanized layer and excellent resistance to cracking in resistance welding. As can be seen from Table 11, our examples for the CR cases exhibited good chemical convertibility and post-coating corrosion resistance, as well as excellent resistance to cracking in resistance welding.

Example 4

Cast steel samples were prepared by smelting steel with the chemical compositions listed in Table 5 (with the balance being Fe and inevitable impurities), and subjected to hot rolling to obtain hot-rolled steel sheets. The hot-rolled steel sheets were then subjected to pickling and cold rolling to obtain cold-rolled steel sheets with a thickness of 1.6 mm.

Various GAs as listed in Table 12, various GIs in Table 13, and various CRs in Table 14 were produced using these cold-rolled steel sheets.

First, each cold-rolled steel sheet was subjected to degreasing treatment with alkali, followed by electrolytic treatment with the cold-rolled steel sheet as the cathode under the conditions descried below to produce an Fe-based electroplated steel sheet. The coating weight A of the Fe-based electroplating layers listed in Tables 12 to 14 were calculated by the aforementioned method and controlled by welding time.

[Electrolytic Conditions]
  Bath temperature: 50° C.
  pH: 2.0
  Current density: 45 A/dm²
  Plating bath: a sulfuric acid bath containing 1.5 mol/L of $Fe^{2+}$ ions
  Anode: iridium oxide electrode Subsequently, each Fe-based electroplated steel sheet was heated at the average heating rate in the temperature range of 400° C. to 650° C. as listed in Tables 12 to 14, and then subjected to annealing in which the steel sheet was heated with a soaking zone temperature of 800° C. in a reducing atmosphere with a dew point B as listed in Tables 12 to 14 and containing 15 vol. % hydrogen, with the balance being $N_2$ and inevitable impurities. The holding time of each steel sheet at the maximum arrival temperature (800° C.) was set at 100 seconds. In the examples listed in Table 14, Fe-based electroplated steel sheets (CRs) were obtained in this way.

In the examples listed in Tables 12 and 13, each of the Fe-based electroplated steel sheets thus obtained was cooled to 440° C. to 550° C., and then hot-dip galvanized using a hot-dip galvanizing bath at 460° C., where the effective Al concentration in the bath was 0.132 mass %, with the balance being Zn and inevitable impurities. Subsequently, the coating weight per surface of the hot-dip galvanized layer was adjusted by gas wiping. In the examples listed in Table 13, hot-dip galvanized steel sheets (GIs) were obtained in this way.

In the examples listed in Table 12, galvannealed steel sheets (GAs) were produced by further performing the process of heating and alloying the hot-dip galvanized layers through alloying treatment at 510° C. The Fe % in the galvannealed layers was controlled by varying the time of the alloying treatment.

Tables 12 and 13 list the coating weight and Fe % of the hot-dip galvanized layer or galvannealed layer in each steel sheet as determined by the aforementioned method.

Table 12 lists the values of $(I_{Si,Fe})/(I_{Si,bulk})$, the average value of C concentration, and the thickness of the decarburized layer obtained by the aforementioned method. Tables 13 and 14 list the thickness of the internal oxidation layer, the average value of C concentration, the thickness of the decarburized layer, and the number of crystal grain boundaries per 10 µm in the sheet transverse direction for each steel sheet, as determined by the aforementioned method.

In the examples of GAs and GIs, the appearance of the galvanized layer (Rating 1) and the resistance to cracking in resistance welding at a welded portion (Rating 3) were evaluated, and the results are listed in Tables 12 and 13. In the examples of CRs, the chemical convertibility and post-coating corrosion resistance (Rating 2) as well as the resistance to cracking in resistance welding at a welded portion (Rating 3) were evaluated, and the results are listed in Table 14. The evaluation methods and criteria for Ratings 1 to 3 are the same as in Example 1.

TABLE 12

| No. | Steel sample ID | Coating weight (A) of Fe-based electroplating layer g/m² | Average heating rate ° C./s | Annealing dew point (B) ° C. | A + B | Interface between galvannealed layer/ cold-rolled steel sheet $I_{Si, Fe}/I_{Si, bulk}$ — |
|---|---|---|---|---|---|---|
| 1 | L | 3.5 | 2.0 | 3.5 | 7.0 | 0.86 |
| 2 | L | 3.4 | 7.5 | 3.5 | 6.9 | 0.88 |
| 3 | L | 3.3 | 12.5 | 3.7 | 7.0 | 0.88 |
| 4 | M | 3.4 | 5.0 | 3.4 | 6.8 | 0.80 |
| 5 | M | 3.1 | 10.0 | 3.5 | 6.6 | 0.81 |
| 6 | M | 3.5 | 15.0 | 3.3 | 6.8 | 0.77 |

| No. | Thickness of decarburized layer µm | C concentration on steel sheet surface Average value mass % | Galvannealed layer Coating weight g/m² | Galvannealed layer Fe % mass % | Appearance of galvannealed layer | Resistance to cracking in resistance welding | Remarks |
|---|---|---|---|---|---|---|---|
| 1 | 73 | 0.05 | 51.8 | 10.2 | ○ | ◎ | Example |
| 2 | 74 | 0.06 | 52.0 | 10.5 | ○ | ○ | Example |
| 3 | 72 | 0.05 | 52.5 | 10.3 | ○ | ◎ | Example |
| 4 | 79 | 0.05 | 48.4 | 11.8 | ○ | ○ | Example |
| 5 | 77 | 0.05 | 48.6 | 11.1 | ○ | ◎ | Example |
| 6 | 78 | 0.05 | 48.7 | 11.7 | ○ | ◎ | Example |

TABLE 13

| No. | Steel sample ID | Coating weight (A) of Fe-based electroplating layer g/m² | Average heating rate ° C./s | Annealing dew point (B) ° C. | A + B | Thickness of internal oxidation layer µm | Fe-based electroplating layer Number of grain boundaries in contact with cold-rolled steel sheet — |
|---|---|---|---|---|---|---|---|
| 1 | L | 3.6 | 2.0 | 3.6 | 7.2 | 0.70 | 4 |
| 2 | L | 3.5 | 7.5 | 3.2 | 6.7 | 0.79 | 6 |
| 3 | L | 3.4 | 12.5 | 3.9 | 7.3 | 0.67 | 11 |
| 4 | M | 3.3 | 5.0 | 3.5 | 6.8 | 0.81 | 6 |

TABLE 13-continued

| | | | | | | | |
|---|---|---|---|---|---|---|---|
| 5 | M | 3.1 | 10.0 | 3.8 | 6.9 | 0.86 | 12 |
| 6 | M | 3.4 | 15.0 | 3.4 | 6.8 | 0.80 | 21 |

| | | C concentration on steel sheet surface | | Hot-dip galvanized layer | | Appearance of hot-dip galvanized layer | Resistance to cracking in resistance welding | Remarks |
|---|---|---|---|---|---|---|---|---|
| No. | | Thickness of decarburized layer μm | Average value mass % | Coating weight g/m² | Fe % mass % | | | |
| 1 | | 73 | 0.05 | 51.4 | 0.2 | ○ | ○ | Example |
| 2 | | 71 | 0.06 | 51.0 | 0.2 | ○ | ○ | Example |
| 3 | | 74 | 0.05 | 52.1 | 0.3 | ○ | ◎ | Example |
| 4 | | 77 | 0.05 | 49.2 | 0.2 | ○ | ○ | Example |
| 5 | | 77 | 0.05 | 49.0 | 0.2 | ○ | ◎ | Example |
| 6 | | 76 | 0.05 | 49.1 | 0.2 | ○ | ◎ | Example |

TABLE 14

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet — |
|---|---|---|---|---|---|---|---|
| 1 | L | 3.5 | 2.0 | 3.7 | 7.2 | 0.73 | 5 |
| 2 | L | 3.5 | 7.5 | 3.1 | 6.6 | 0.76 | 5 |
| 3 | L | 3.3 | 12.5 | 3.1 | 6.4 | 0.69 | 10 |
| 4 | M | 3.6 | 5.0 | 3.2 | 6.8 | 0.78 | 7 |
| 5 | M | 3.3 | 10.0 | 3.2 | 6.5 | 0.79 | 11 |
| 6 | M | 3.3 | 15.0 | 3.9 | 7.2 | 0.81 | 22 |

| No. | C concentration on steel sheet surface | | Chemical convertibility | Post-coating corrosion resistance | Resistance to cracking in resistance welding | Remarks |
|---|---|---|---|---|---|---|
| | Thickness of decarburized layer μm | Average value mass % | | | | |
| 1 | 72 | 0.05 | ○ | ○ | ○ | Example |
| 2 | 70 | 0.06 | ○ | ○ | ○ | Example |
| 3 | 68 | 0.06 | ○ | ○ | ◎ | Example |
| 4 | 77 | 0.05 | ○ | ○ | ○ | Example |
| 5 | 75 | 0.05 | ○ | ○ | ◎ | Example |
| 6 | 76 | 0.05 | ○ | ○ | ◎ | Example |

As can be seen from Tables 12 and 13, our examples for the GA and GI cases exhibited good appearance of the galvanized layer and excellent resistance to cracking in resistance welding. As can be seen from Table 14, our examples for the CR cases exhibited good chemical convertibility and post-coating corrosion resistance, as well as excellent resistance to cracking in resistance welding.

Example 5

Cast steel samples were prepared by smelting steel with the chemical compositions listed in Table 15 (with the balance being Fe and inevitable impurities), and subjected to hot rolling to obtain hot-rolled steel sheets. The hot-rolled steel sheets were then subjected to pickling and cold rolling to obtain cold-rolled steel sheets with a thickness of 1.6 mm.

TABLE 15

| Steel sample ID | C | Si | Mn | P | S | N | Al | B | Ti | Cr | Nb | Mo | Cu | Ni | |
|---|---|---|---|---|---|---|---|---|---|---|---|---|---|---|---|
| N | 0.09 | 0.21 | 2.72 | 0.02 | 0.001 | 0.004 | 0.034 | 0.001 | 0.01 | — | 0.014 | — | — | — | Conforming steel |
| O | 0.12 | 0.46 | 2.51 | 0.01 | 0.002 | 0.003 | 0.035 | 0.001 | 0.01 | — | — | — | — | — | Conforming steel |

"—" indicates a content at inevitable impurity level.

Various GAs as listed in Table 16, various GIs in Table 17, and various CRs in Table 18 were produced using these cold-rolled steel sheets.

First, each cold-rolled steel sheet was subjected to degreasing treatment with alkali, followed by electrolytic treatment with the cold-rolled steel sheet as the cathode under the conditions descried below to produce an Fe-based electroplated steel sheet. The coating weight A of the Fe-based electroplating layers listed in Tables 16 to 18 were calculated by the aforementioned method and controlled by welding time.

[Electrolytic Conditions]
- Bath temperature: 50° C.
- pH: 2.0
- Current density: 45 A/dm$^2$
- Plating bath: a sulfuric acid bath containing 1.5 mol/L of $Fe^{2+}$ ions
- Anode: iridium oxide electrode Subsequently, each Fe-based electroplated steel sheet was heated at the average heating rate in the temperature range of 400° C. to 650° C. as listed in Tables 16 to 18, and then subjected to annealing in which the steel sheet was heated with a soaking zone temperature of 800° C. in a reducing atmosphere with a dew point B as listed in Tables 16 to 18 and containing 15 vol. % hydrogen, with the balance being $N_2$ and inevitable impurities. The holding time of each steel sheet at the maximum arrival temperature (800° C.) was set at 100 seconds. In the examples listed in Table 18, Fe-based electroplated steel sheets (CRs) were obtained in this way.

In the examples listed in Tables 16 and 17, each of the Fe-based electroplated steel sheets thus obtained was cooled to 440° C. to 550° C., and then hot-dip galvanized using a hot-dip galvanizing bath at 460° C., where the effective Al concentration in the bath was 0.132 mass %, with the balance being Zn and inevitable impurities. Subsequently, the coating weight per surface of the hot-dip galvanized layer was adjusted by gas wiping. In the examples listed in Table 17, hot-dip galvanized steel sheets (GIs) were obtained in this way.

In the examples listed in Table 16, galvannealed steel sheets (GAs) were produced by further performing the process of heating and alloying the hot-dip galvanized layers through alloying treatment at 510° C. The Fe % in the galvannealed layers was controlled by varying the time of the alloying treatment.

Tables 16 and 17 list the coating weight and Fe % of the hot-dip galvanized layer or galvannealed layer in each steel sheet as determined by the aforementioned method.

Table 16 lists the values of $(I_{Si,Fe})/(I_{Si,bulk})$, the average value of C concentration, and the thickness of the decarburized layer obtained by the aforementioned method. Tables 17 and 18 list the thickness of the internal oxidation layer, the average value of C concentration, the thickness of the decarburized layer, and the number of crystal grain boundaries per 10 μm in the sheet transverse direction for each steel sheet, as determined by the aforementioned method.

In the examples of GAs and GIs, the appearance of the galvanized layer (Rating 1) and the resistance to cracking in resistance welding at a welded portion (Rating 3) were evaluated, and the results are listed in Tables 16 and 17. In the examples of CRs, the chemical convertibility and post-coating corrosion resistance (Rating 2) as well as the resistance to cracking in resistance welding at a welded portion (Rating 3) were evaluated, and the results are listed in Table 18. The evaluation methods and criteria for Ratings 1 and 2 are the same as in Example 1. The evaluation method and criteria for Rating 3 are as follows.

[Rating 3: Evaluation of Resistance to Cracking in Resistance Welding at Welded Portion]

Referring to FIG. 4A, as a sheet combination, a test specimen 6 that was cut from each of the steel sheets (CRs, GIs, and GAs) in our examples and comparative examples to a size of 150 mm in the lengthwise direction×50 mm in the widthwise direction, with the transverse direction (TD) as the lengthwise direction and the rolling direction as the widthwise direction, was overlapped with a test galvannealed steel sheet 5 (thickness: 1.6 mm, TS: 980 MPa grade) that was cut to the same size having a galvanized layer with a coating weight per surface of 50 g/m$^2$. The sheet combination was assembled so that the surface to be evaluated (i.e., the Fe-based electroplating layer in the case of CRs, or the galvanized layer in the case of GIs and GAs) of the test specimen 6 and the galvanized layer of the test galvannealed steel sheet 5 faced each other. The sheet combination was fixed to a fixing stand 8 via spacers 7 of 2.0 mm thick. The spacers 7 were a pair of steel sheets, each measuring 50 mm long (lengthwise direction)×45 mm wide (widthwise direction)×2.0 mm thick (thickness direction). As illustrated in FIG. 4A, the lengthwise end faces of the pair of steel sheets were aligned with the widthwise end faces of the sheet combination. Thus, the distance between the pair of steel sheets was 60 mm. The fixing stand 8 was a single plate with a hole in the center.

Then, using a single-phase AC (50 Hz) resistance welding machine of servomotor pressure type, the sheet combination was subjected to resistance welding at a welding current that resulted in a nugget diameter r of 5.9 mm while being deflected by applying pressure with a pair of electrodes 9 (tip diameter: 6 mm) under the conditions of an electrode force of 3.5 kN, a holding time of 0.14 seconds or 0.16 seconds, and a welding time of 0.36 seconds, to form a sheet combination with a welded portion. The pair of electrodes 9 pressurized the sheet combination from above and below in the vertical direction, with the lower electrode pressurizing the test specimen 6 through the hole in the fixing stand 8. In applying pressure, the lower electrode of the pair of electrodes 9 and the fixing stand 8 were fixed, and the upper electrode was movable so that the lower electrode was in contact with a plane that was an extension of a plane where the spacer 7 touched the fixing stand 8. The upper electrode was in contact with the center of the test galvannealed steel sheet 5. The sheet combination was welded with an inclination of 5° lengthwise with respect to the horizontal direction. The holding time refers to the time between the end of passage of the welding current and the beginning of electrode release. As illustrated in the lower part of FIG. 4B, the nugget diameter r means the distance between the ends of a nugget 10 in the lengthwise direction of the sheet combination.

Then, each sheet combination with a welded portion was cut along the B-B line shown in the upper part of FIG. 4B to include the center of the welded portion including a nugget 10, and the cross-section of the welded portion was observed under an optical microscopy (200×) to evaluate the resistance to cracking in resistance welding at the welded portion using the following criteria. The result of ⊚ or ○ indicates that the sheet combination was judged to have superior resistance to cracking in resistance welding at the welded portion. The result of x indicates that the sheet combination was judged to have inferior resistance to cracking in resistance welding at the welded portion.

⊚: no cracks as long as 0.1 mm or more were observed at a holding time of 0.14 seconds.

○: cracks as long as 0.1 mm or more were observed at a holding time of 0.14 seconds, but no cracks as long as 0.1 mm or more were observed at a holding time of 0.16 seconds.

x: cracks as long as 0.1 mm or more were observed at a holding time of 0.16 seconds.

A crack in the test specimen 6 is schematically illustrated in the lower part of FIG. 4B, as indicated by reference numeral 11. If a crack forms in the counterpart steel sheet (test galvannealed steel sheet), the stress in the steel sheet to be evaluated (any of the steel sheets in our examples and comparative examples) will be distributed, and the evaluation will not be appropriate. For this reason, the data in which no cracking occurred in the counterpart steel sheet was used.

TABLE 16

| No. | Steel sample ID | Coating weight (A) of Fe-based electroplating layer g/m² | Average heating rate °C./s | Annealing dew point (B) °C. | A + B | Interface between galvannealed layer/ cold-rolled steel sheet $I_{Si,\ Fe}/I_{Si,\ bulk}$ |
|---|---|---|---|---|---|---|
| 1 | N | 0.0 | 2.0 | 2.8 | 2.8 | 0.97 |
| 2 | N | 2.2 | 2.0 | 2.9 | 5.1 | 0.84 |
| 3 | N | 2.4 | 2.0 | 5.3 | 7.7 | 0.86 |
| 4 | N | 4.7 | 2.0 | 7.8 | 12.5 | 0.79 |
| 5 | O | 0.0 | 2.0 | −1.6 | −1.6 | 0.99 |
| 6 | O | 1.3 | 2.0 | 0.2 | 1.5 | 0.93 |
| 7 | O | 2.3 | 2.0 | 2.9 | 5.2 | 0.84 |
| 8 | O | 2.1 | 2.0 | 4.6 | 6.7 | 0.89 |
| 9 | O | 4.6 | 2.0 | 7.0 | 11.6 | 0.71 |

| No. | C concentration on steel sheet surface Thickness of decarburized layer μm | C concentration on steel sheet surface Average value mass % | Galvannealed layer Coating weight g/m² | Galvannealed layer Fe % mass % | Appearance of galvannealed layer | Resistance to cracking in resistance welding | Remarks |
|---|---|---|---|---|---|---|---|
| 1 | 68 | 0.06 | 49.4 | 11.2 | Δ | X | Comparative example |
| 2 | 72 | 0.05 | 48.5 | 11.5 | ○ | ○ | Example |
| 3 | 78 | 0.05 | 48.8 | 11.0 | ○ | ○ | Example |
| 4 | 89 | 0.04 | 49.7 | 11.3 | ○ | ⊚ | Example |
| 5 | 59 | 0.07 | 48.5 | 11.6 | Δ | X | Comparative example |
| 6 | 67 | 0.06 | 48.7 | 11.4 | ○ | X | Comparative example |
| 7 | 70 | 0.05 | 48.5 | 11.6 | ○ | ○ | Example |
| 8 | 73 | 0.05 | 48.7 | 11.4 | ○ | ○ | Example |
| 9 | 84 | 0.04 | 48.2 | 11.5 | ○ | ⊚ | Example |

Underlined if outside the appropriate range of the present disclosure.

TABLE 17

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet — |
|---|---|---|---|---|---|---|---|
| 1 | N | 0.0 | 2.0 | 2.7 | 2.7 | 2.03 | — |
| 2 | N | 2.3 | 2.0 | 3.1 | 5.4 | 0.94 | 5 |
| 3 | N | 2.5 | 2.0 | 5.0 | 7.5 | 0.71 | 7 |
| 4 | N | 4.8 | 2.0 | 7.5 | 12.3 | 0.50 | 8 |
| 5 | O | 0.0 | 2.0 | −1.1 | −1.1 | 2.15 | — |
| 6 | O | 1.1 | 2.0 | 0.5 | 1.6 | 2.02 | 5 |
| 7 | O | 2.3 | 2.0 | 2.9 | 5.2 | 0.80 | 8 |
| 8 | O | 2.1 | 2.0 | 4.6 | 6.7 | 0.91 | 5 |
| 9 | O | 4.6 | 2.0 | 7.0 | 11.6 | 0.46 | 8 |

TABLE 17-continued

| | C concentration on steel sheet surface | | Hot-dip galvanized layer | | Appearance of hot-dip galvanized layer | Resistance to cracking in resistance welding | Remarks |
|---|---|---|---|---|---|---|---|
| No. | Thickness of decarburized layer μm | Average value mass % | Coating weight g/m² | Fe % mass % | | | |
| 1 | 67 | 0.08 | 49.4 | 11.2 | Δ | X | Comparative example |
| 2 | 70 | 0.05 | 48.5 | 11.5 | ○ | ○ | Example |
| 3 | 76 | 0.05 | 48.8 | 11.0 | ○ | ○ | Example |
| 4 | 86 | 0.04 | 49.7 | 11.3 | ○ | ◎ | Example |
| 5 | 59 | 0.10 | 48.5 | 11.6 | Δ | X | Comparative example |
| 6 | 66 | 0.06 | 48.7 | 11.4 | ○ | X | Comparative example |
| 7 | 68 | 0.05 | 48.5 | 11.6 | ○ | ○ | Example |
| 8 | 72 | 0.05 | 48.7 | 11.4 | ○ | ○ | Example |
| 9 | 81 | 0.04 | 48.2 | 11.5 | ○ | ◎ | Example |

Underlined if outside the appropriate range of the present disclosure.

TABLE 18

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet — |
|---|---|---|---|---|---|---|---|
| 1 | N | 0.0 | 2.0 | 2.9 | 2.9 | 2.05 | — |
| 2 | N | 2.4 | 2.0 | 2.9 | 5.3 | 0.97 | 5 |
| 3 | N | 2.6 | 2.0 | 5.0 | 7.6 | 0.69 | 8 |
| 4 | N | 4.7 | 2.0 | 7.1 | 11.8 | 0.57 | 8 |
| 5 | O | 0.0 | 2.0 | −1.0 | −1.0 | 2.20 | — |
| 6 | O | 1.0 | 2.0 | 0.4 | 1.4 | 2.06 | 4 |
| 7 | O | 2.4 | 2.0 | 3.0 | 5.4 | 0.82 | 7 |
| 8 | O | 2.3 | 2.0 | 4.9 | 7.2 | 0.89 | 6 |
| 9 | O | 4.8 | 2.0 | 6.8 | 11.6 | 0.53 | 9 |

| No. | C concentration on steel sheet surface | | Chemical convertibility | Post-coating corrosion resistance | Resistance to cracking in resistance welding | Remarks |
|---|---|---|---|---|---|---|
| | Thickness of decarburized layer μm | Average value mass % | | | | |
| 1 | 68 | 0.08 | X | X | X | Comparative example |
| 2 | 71 | 0.05 | ○ | ○ | ○ | Example |
| 3 | 75 | 0.05 | ○ | ○ | ○ | Example |
| 4 | 84 | 0.04 | ◎ | ◎ | ◎ | Example |
| 5 | 58 | 0.10 | X | X | X | Comparative example |
| 6 | 67 | 0.06 | ○ | ○ | X | Comparative example |
| 7 | 70 | 0.05 | ○ | ○ | ○ | Example |
| 8 | 74 | 0.05 | ○ | ○ | ○ | Example |
| 9 | 82 | 0.04 | ◎ | ◎ | ◎ | Example |

Underlined if outside the appropriate range of the present disclosure.

As can be seen from Tables 16 and 17, our examples for the GA and GI cases exhibited good appearance of the galvanized layer and excellent resistance to cracking in resistance welding. As can be seen from Table 18, our examples for the CR cases exhibited good chemical convertibility and post-coating corrosion resistance, as well as excellent resistance to cracking in resistance welding.

Example 6

Cast steel samples were prepared by smelting steel with the chemical compositions listed in Table 15 (with the balance being Fe and inevitable impurities), and subjected to hot rolling to obtain hot-rolled steel sheets. The hot-rolled steel sheets were then subjected to pickling and cold rolling to obtain cold-rolled steel sheets with a thickness of 1.6 mm.

Various GAs as listed in Table 19, various GIs in Table 20, and various CRs in Table 21 were produced using these cold-rolled steel sheets.

First, each cold-rolled steel sheet was subjected to degreasing treatment with alkali, followed by electrolytic treatment with the cold-rolled steel sheet as the cathode under the conditions descried below to produce an Fe-based electroplated steel sheet. The coating weight A of the Fe-based electroplating layers listed in Tables 19 to 21 were calculated by the aforementioned method and controlled by welding time.

[Electrolytic Conditions]
Bath temperature: 50° C.
pH: 2.0
Current density: 45 A/dm$^2$
Plating bath: a sulfuric acid bath containing 1.5 mol/L of $Fe^{2+}$ ions
Anode: iridium oxide electrode Subsequently, each Fe-based electroplated steel sheet was heated at the average heating rate in the temperature range of 400° C. to 650° C. as listed in Tables 19 to 21, and then subjected to annealing in which the steel sheet was heated with a soaking zone temperature of 800° C. in a reducing atmosphere with a dew point B as listed in Tables 19 to 21 and containing 15 vol. % hydrogen, with the balance being $N_2$ and inevitable impurities. The holding time of each steel sheet at the maximum arrival temperature (800° C.) was set at 100 seconds. In the examples listed in Table 21, Fe-based electroplated steel sheets (CRs) were obtained in this way.

In the examples listed in Tables 19 and 20, each of the Fe-based electroplated steel sheets thus obtained was cooled to 440° C. to 550° C., and then hot-dip galvanized using a hot-dip galvanizing bath at 460° C., where the effective Al concentration in the bath was 0.132 mass %, with the balance being Zn and inevitable impurities. Subsequently, the coating weight per surface of the hot-dip galvanized layer was adjusted by gas wiping. In the examples listed in Table 20, hot-dip galvanized steel sheets (GIs) were obtained in this way.

In the examples listed in Table 19, galvannealed steel sheets (GAs) were produced by further performing the process of heating and alloying the hot-dip galvanized layers through alloying treatment at 510° C. The Fe % in the galvannealed layers was controlled by varying the time of the alloying treatment.

Tables 19 and 20 list the coating weight and Fe % of the hot-dip galvanized layer or galvannealed layer in each steel sheet as determined by the aforementioned method.

Table 19 lists the values of $(I_{Si,Fe})/(I_{Si,bulk})$, the average value of C concentration, and the thickness of the decarburized layer obtained by the aforementioned method. Tables 20 and 21 list the thickness of the internal oxidation layer, the average value of C concentration, the thickness of the decarburized layer, and the number of crystal grain boundaries per 10 μm in the sheet transverse direction for each steel sheet, as determined by the aforementioned method.

In the examples of GAs and GIs, the appearance of the galvanized layer (Rating 1) and the resistance to cracking in resistance welding at a welded portion (Rating 3) were evaluated, and the results are listed in Tables 19 and 20. In the examples of CRs, the chemical convertibility and post-coating corrosion resistance (Rating 2) as well as the resistance to cracking in resistance welding at a welded portion (Rating 3) were evaluated, and the results are listed in Table 21. The evaluation methods and criteria for Ratings 1 to 3 are the same as in Example 5.

TABLE 19

| No. | Steel sample ID | Coating weight (A) of Fe-based electroplating layer g/m$^2$ | Average heating rate ° C./s | Annealing dew point (B) ° C. | A + B | Interface between galvannealed layer/ cold-rolled steel sheet $I_{Si,Fe}/I_{Si,bulk}$ — |
|---|---|---|---|---|---|---|
| 1 | N | 3.4 | 2.0 | 3.5 | 6.9 | 0.81 |
| 2 | N | 3.6 | 7.5 | 3.5 | 7.1 | 0.82 |
| 3 | N | 3.3 | 12.5 | 3.7 | 7.0 | 0.76 |
| 4 | O | 3.7 | 5.0 | 3.4 | 7.1 | 0.76 |
| 5 | O | 3.9 | 10.0 | 3.6 | 7.5 | 0.77 |
| 6 | O | 3.8 | 15.0 | 3.6 | 7.4 | 0.75 |

| No. | Thickness of decarburized layer μm | C concentration on steel sheet surface Average value mass % | Galvannealed layer Coating weight g/m$^2$ | Galvannealed layer Fe % mass % | Appearance of galvannealed layer | Resistance to cracking in resistance welding | Remarks |
|---|---|---|---|---|---|---|---|
| 1 | 76 | 0.05 | 48.1 | 10.4 | ○ | ○ | Example |
| 2 | 77 | 0.05 | 48.3 | 10.5 | ○ | ○ | Example |
| 3 | 77 | 0.05 | 48.0 | 10.4 | ○ | ◎ | Example |
| 4 | 79 | 0.05 | 52.3 | 11.1 | ○ | ○ | Example |
| 5 | 78 | 0.05 | 51.6 | 10.9 | ○ | ◎ | Example |
| 6 | 75 | 0.05 | 51.9 | 11.0 | ○ | ◎ | Example |

TABLE 20

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet — |
|---|---|---|---|---|---|---|---|
| 1 | N | 3.3 | 2.0 | 3.6 | 6.9 | 0.89 | — |
| 2 | N | 3.4 | 7.5 | 3.7 | 7.1 | 0.84 | 4 |
| 3 | N | 3.5 | 12.5 | 3.7 | 7.2 | 0.86 | 11 |
| 4 | O | 3.5 | 5.0 | 3.3 | 6.8 | 0.75 | — |
| 5 | O | 3.4 | 10.0 | 3.3 | 6.7 | 0.77 | 12 |
| 6 | O | 3.6 | 15.0 | 3.7 | 7.3 | 0.80 | 14 |

| No. | C concentration on steel sheet surface Thickness of decarburized layer μm | C concentration on steel sheet surface Average value mass % | Hot-dip galvanized layer Coating weight g/m² | Hot-dip galvanized layer Fe % mass % | Appearance of hot-dip galvanized layer | Resistance to cracking in resistance welding | Remarks |
|---|---|---|---|---|---|---|---|
| 1 | 74 | 0.05 | 48.3 | 0.3 | ○ | ○ | Example |
| 2 | 74 | 0.05 | 48.3 | 0.2 | ○ | ○ | Example |
| 3 | 73 | 0.05 | 48.0 | 0.2 | ○ | ◎ | Example |
| 4 | 75 | 0.05 | 52.3 | 0.2 | ○ | ○ | Example |
| 5 | 77 | 0.05 | 51.6 | 0.4 | ○ | ◎ | Example |
| 6 | 76 | 0.05 | 51.9 | 0.2 | ○ | ◎ | Example |

TABLE 21

| No. | Steel sample ID | Coating weight (A) of Fe-based electroplating layer g/m² | Average heating rate °C./s | Annealing dew point (B) °C. | A + B | Thickness of internal oxidation layer μm | Fe-based electroplating layer Number of grain boundaries in contact with cold-rolled steel sheet — |
|---|---|---|---|---|---|---|---|
| 1 | N | 3.5 | 2.0 | 3.7 | 7.2 | 0.86 | — |
| 2 | N | 3.3 | 7.5 | 3.7 | 7.0 | 0.87 | 5 |
| 3 | N | 3.4 | 12.5 | 3.6 | 7.0 | 0.85 | 10 |
| 4 | O | 3.4 | 5.0 | 3.4 | 6.8 | 0.76 | — |
| 5 | O | 3.5 | 10.0 | 3.2 | 6.7 | 0.75 | 11 |
| 6 | O | 3.6 | 15.0 | 3.6 | 7.2 | 0.79 | 15 |

| No. | C concentration on steel sheet surface Thickness of decarburized layer μm | C concentration on steel sheet surface Average value mass % | Chemical convertibility | Post-coating corrosion resistance | Resistance to cracking in resistance welding | Remarks |
|---|---|---|---|---|---|---|
| 1 | 76 | 0.05 | ○ | ○ | ○ | Example |
| 2 | 72 | 0.05 | ○ | ○ | ○ | Example |
| 3 | 74 | 0.05 | ○ | ○ | ◎ | Example |
| 4 | 74 | 0.05 | ○ | ○ | ○ | Example |
| 5 | 75 | 0.05 | ○ | ○ | ◎ | Example |
| 6 | 78 | 0.05 | ○ | ○ | ◎ | Example |

As can be seen from Tables 19 and 20, our examples for the GA and GI cases exhibited good appearance of the galvanized layer and excellent resistance to cracking in resistance welding. As can be seen from Table 21, our examples for the CR cases exhibited good chemical convertibility and post-coating corrosion resistance, as well as excellent resistance to cracking in resistance welding.

INDUSTRIAL APPLICABILITY

The Fe-based electroplated steel sheet disclosed herein not only has excellent chemical convertibility or excellent coating appearance when subjected to hot-dip galvanizing, but also has excellent resistance to cracking in resistance welding. In addition, the galvannealed steel sheet disclosed herein not only has excellent coating appearance, but also has excellent resistance to cracking in resistance welding. Therefore, the Fe-based electroplated steel sheet or galvannealed steel sheet can be applied, for example, to automotive structural members to improve fuel efficiency by reducing the weight of automotive bodies, and can also be applied to home appliances and construction members.

REFERENCE SIGNS LIST

1 Fe-based electroplated steel sheet
2 Cold-rolled steel sheet
3 Fe-based electroplating layer
5 Test galvannealed steel sheet
6 Test specimen
7 Spacer
8 Fixing stand
9 Electrode
10 Nugget
11 Cracking

The invention claimed is:

1. A method of producing an Fe-based electroplated steel sheet, comprising:
continuously subjecting a cold-rolled steel sheet having a chemical composition containing Si in an amount of 0.1 mass % or more and 3.0 mass % or less to Fe-based electroplating to obtain an Fe-based electroplated steel sheet with an Fe-based electroplating layer formed on one or both surfaces of the cold-rolled steel sheet with a coating weight A (g/m$^2$) per surface of 1.0 g/m$^2$ or more; and
then continuously subjecting the Fe-based electroplated steel sheet to an annealing process in which the Fe-based electroplated steel sheet is held in a temperature range of 650° C. to 900° C. in an atmosphere having a dew point B (° C.), wherein the method further comprises, during the annealing process:
(i) acquiring a value of the coating weight A for the Fe-based electroplating layer on the steel sheet undergoing the annealing process;
(ii) substituting the acquired value of the coating weight A into the following formula (1):

$$A+B \geq 3.0 \qquad (1),$$

to calculate whether the formula (1) is satisfied by a sum of said acquired value of coating weight A and the dew point B of the annealing atmosphere; and
(iii) if the formula (1) is calculated not to be satisfied, actively adjusting at least one of the dew point B of the annealing atmosphere for the steel sheet currently undergoing the annealing process, or the coating weight A for a subsequent portion of the continuously subjected cold-rolled steel sheet upstream of the annealing process, to satisfy the formula (1).

2. The method of producing an Fe-based electroplated steel sheet according to claim 1, further comprising, after the annealing process, subjecting the Fe-based electroplated steel sheet to hot-dip galvanizing to form an unalloyed hot-dip galvanized layer on a surface of the Fe-based electroplating layer.

3. The method of producing an Fe-based electroplated steel sheet according to claim 1, wherein
in step (ii), the calculation is performed to determine whether or not the sum of the acquired value of coating weight A and the dew point B of the annealing atmosphere satisfy the following formula (1)':

$$A+B \geq 8.0 \qquad (1)', \text{ and}$$

in step (iii), if formula (1)' is calculated not to be satisfied, actively adjusting at least one of the dew point B of the annealing atmosphere for the steel sheet currently undergoing the annealing process, or the coating weight A for a subsequent portion of the continuously subjected cold-rolled steel sheet upstream of the annealing process, to satisfy the formula (1)'.

4. The method of producing an Fe-based electroplated steel sheet according to claim 1, comprising, before the annealing process, heating the Fe-based electroplated steel sheet with an average heating rate of 10° C./s or higher in a temperature range of 400° C. to 650° C.

5. The method of producing an Fe-based electroplated steel sheet according to claim 1, wherein the coating weight A is less than 5.0 g/m$^2$.

6. The method of producing an Fe-based electroplated steel sheet according to claim 1, wherein the chemical composition of the cold-rolled steel sheet contains, in mass %,
C: 0.8% or less,
Si: 0.1% or more and 3.0% or less,
Mn: 1.0% or more and 12.0% or less,
P: 0.1% or less,
S: 0.03% or less,
N: 0.010% or less, and
Al: 1.0% or less,
optionally at least one element selected from the group consisting of
B: 0.005% or less,
Ti: 0.2% or less,
Cr: 1.0% or less,
Cu: 1.0% or less,
Ni: 1.0% or less,
Mo: 1.0% or less,
Nb: 0.20% or less,
V: 0.5% or less,
Sb: 0.020% or less,
Ta: 0.1% or less,
W: 0.5% or less,
Zr: 0.1% or less,
Sn: 0.20% or less,
Ca: 0.005% or less,
Mg: 0.005% or less, and
REM: 0.005% or less,
with the balance being Fe and inevitable impurities.

7. The method of producing an Fe-based electroplated steel sheet according to claim 1, wherein the Fe-based electroplating is performed in a plating bath containing at least one element selected from the group consisting of B, C, P, N, O, Ni, Mn, Mo, Zn, W, Pb, Sn, Cr, V, and Co, so that the at least one element is contained in the Fe-based electroplating layer in a total amount of 10 mass % or less.

8. A method of producing a chemical-conversion-treated steel sheet, comprising:
the method of producing an Fe-based electroplated steel sheet as recited in claim 1; and
then subjecting the Fe-based electroplated steel sheet to a chemical conversion treatment to obtain a chemical-conversion-treated steel sheet with a chemical conversion layer formed in contact with the Fe-based electroplated steel sheet.

9. A method of producing an electrodeposition-coated steel sheet, comprising:
the method of producing a chemical-conversion-treated steel sheet as recited in claim 8; and
subjecting the chemical-conversion-treated steel sheet to electrodeposition coating to obtain an electrodeposition-coated steel sheet with an electrodeposition coating layer formed in contact with the chemical conversion layer.

10. A method of producing an automotive part, comprising:
the method of producing an electrodeposition-coated steel sheet as recited in claim 9; and
producing an automotive part using at least in part the electrodeposition-coated steel sheet.

11. A method of producing a galvannealed steel sheet, comprising:
continuously subjecting a cold-rolled steel sheet having a chemical composition containing Si in an amount of 0.1 mass % or more and 3.0 mass % or less to Fe-based electroplating to obtain an Fe-based electroplated steel sheet with an Fe-based electroplating layer formed on one or both surfaces of the cold-rolled steel sheet with a coating weight A (g/m$^2$) per surface of 1.0 g/m$^2$ or more;
then continuously subjecting the Fe-based electroplated steel sheet to an annealing process in which the Fe-based electroplated steel sheet is held in a temperature range of 650° C. to 900° C. in an atmosphere having a dew point B (° C.);
then continuously subjecting the Fe-based electroplated steel sheet to hot-dip galvanizing to form an unalloyed hot-dip galvanized layer on a surface of the Fe-based electroplating layer; and
then continuously heating and alloying the hot-dip galvanized layer to obtain a galvannealed steel sheet with a galvannealed layer formed on one or both surfaces of the cold-rolled steel sheet, wherein the method further comprises, during the annealing process:
(i) acquiring a value of the coating weight A for the Fe-based electroplating layer on the steel sheet undergoing the annealing process;
(ii) substituting the acquired value of the coating weight A into the following formula (2):

$$A+B \geq 5.0 \tag{2}$$

to calculate whether the formula (2) is satisfied by a sum of said acquired value of coating weight A and the dew point B of the annealing atmosphere; and
(iii) if the formula (2) is calculated not to be satisfied, actively adjusting at least one of the dew point B of the annealing atmosphere for the steel sheet currently undergoing the annealing process, or the coating weight A for a subsequent portion of the continuously subjected cold-rolled steel sheet upstream of the annealing process, to satisfy the formula (2).

12. The method of producing a galvannealed steel sheet according to claim 11, wherein
in step (ii), the calculation is performed to determine whether or not the sum of the acquired value of coating weight A and the dew point B of the annealing atmosphere satisfy the following formula (2)':

$$A+B \geq 10.0 \tag{2}', \text{and}$$

in step (iii), if formula (2)' is calculated not to be satisfied, actively adjusting at least one of the dew point B of the annealing atmosphere for the steel sheet currently undergoing the annealing process, or the coating weight A for a subsequent portion of the continuously subjected cold-rolled steel sheet upstream of the annealing process, to satisfy the formula (2)'.

13. The method of producing a galvannealed steel sheet according to claim 11, comprising, before the annealing process, heating the Fe-based electroplated steel sheet with an average heating rate of 10° C./s or higher in a temperature range of 400° C. to 650° C.

14. The method of producing a galvannealed steel sheet according to claim 11, wherein the coating weight A is less than 5.0 g/m$^2$.

15. The method of producing a galvannealed steel sheet according to claim 11, wherein the chemical composition of the cold-rolled steel sheet contains, in mass %,
C: 0.8% or less,
Si: 0.1% or more and 3.0% or less,
Mn: 1.0% or more and 12.0% or less,
P: 0.1% or less,
S: 0.03% or less,
N: 0.010% or less, and
Al: 1.0% or less,
optionally at least one element selected from the group consisting of
B: 0.005% or less,
Ti: 0.2% or less,
Cr: 1.0% or less,
Cu: 1.0% or less,
Ni: 1.0% or less,
Mo: 1.0% or less,
Nb: 0.20% or less,
V: 0.5% or less,
Sb: 0.020% or less,
Ta: 0.1% or less,
W: 0.5% or less,
Zr: 0.1% or less,
Sn: 0.20% or less,
Ca: 0.005% or less,
Mg: 0.005% or less, and
REM: 0.005% or less,
with the balance being Fe and inevitable impurities.

16. The method of producing a galvannealed steel sheet according to claim 11, wherein the Fe-based electroplating is performed in a plating bath containing at least one element selected from the group consisting of B, C, P, N, O, Ni, Mn, Mo, Zn, W, Pb, Sn, Cr, V, and Co, so that the at least one element is contained in the galvannealed layer in a total amount of 1 mass % or less.

17. A method of producing a chemical-conversion-treated steel sheet, comprising:
the method of producing a galvannealed steel sheet as recited in claim 11; and
then subjecting the galvannealed steel sheet to a chemical conversion treatment to obtain a chemical-conversion-treated steel sheet with a chemical conversion layer formed in contact with the galvannealed steel sheet.

18. A method of producing an electrodeposition-coated steel sheet, comprising:
   the method of producing a chemical-conversion-treated steel sheet as recited in claim 17; and
   subjecting the chemical-conversion-treated steel sheet to electrodeposition coating to obtain an electrodeposition-coated steel sheet with an electrodeposition coating layer formed in contact with the chemical conversion layer.

19. A method of producing an automotive part, comprising:
   the method of producing an electrodeposition-coated steel sheet as recited in claim 18; and
   producing an automotive part using at least in part the electrodeposition-coated steel sheet.

* * * * *